US008076269B2

(12) United States Patent
Polizzotti et al.

(10) Patent No.: US 8,076,269 B2
(45) Date of Patent: *Dec. 13, 2011

(54) COMPRESSIBLE OBJECTS COMBINED WITH A DRILLING FLUID TO FORM A VARIABLE DENSITY DRILLING MUD

(75) Inventors: Richard S. Polizzotti, Milford, NJ (US); Dennis George Peiffer, Annandale, NJ (US); Ramesh Gupta, Berkeley Heights, NJ (US); Norman M. Pokutylowicz, Houston, TX (US); Barbara Carstensen, Annandale, NJ (US); Michael J. Luton, Basking Ridge, NJ (US); Paul Matthew Spiecker, Manvel, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/252,931

(22) Filed: Oct. 16, 2008

(65) Prior Publication Data

US 2009/0090559 A1    Apr. 9, 2009

Related U.S. Application Data

(63) Continuation of application No. PCT/US2007/010821, filed on May 4, 2007, and a continuation-in-part of application No. 11/441,698, filed on May 25, 2006, which is a continuation of application No. PCT/US2005/20320, filed on Jun. 9, 2005.

(60) Provisional application No. 60/811,619, filed on Jun. 7, 2006, provisional application No. 60/580,523, filed on Jun. 17, 2004.

(51) Int. Cl.
*C09K 8/03* (2006.01)
(52) U.S. Cl. ........................................ 507/110; 428/402
(58) Field of Classification Search .................. 507/110; 428/402
See application file for complete search history.

(56) References Cited

U.S. PATENT DOCUMENTS

| 2,512,783 A | 6/1950 | Tucker |
| 2,808,230 A | 10/1957 | McNeill et al. |
| 2,923,531 A | 2/1960 | Bauer et al. |
| 3,003,554 A | 10/1961 | Craig, Jr. et al. |
| 3,111,419 A | 11/1963 | Nahin |
| 3,145,773 A | 8/1964 | Jorda et al. |
| 3,174,561 A | 3/1965 | Sterrett |
| 3,221,825 A | 12/1965 | Henderson |

(Continued)

FOREIGN PATENT DOCUMENTS

CA          2148969          11/1996

(Continued)

OTHER PUBLICATIONS

European Search Report, dated Dec. 15, 2006.

(Continued)

*Primary Examiner* — Alicia Toscano

(57) ABSTRACT

A compressible object is described that may be utilized in drilling mud and with a drilling system to manage the density of the drilling mud. The compressible object includes a shell that encloses an interior region. The shell experiences less strain when the external pressure is about equal to the internal pressure than when the external pressure is above or below a predetermined compression interval of the compressible object includes a shell that encloses an interior region.

14 Claims, 14 Drawing Sheets

U.S. PATENT DOCUMENTS

| | | | |
|---|---|---|---|
| 3,231,030 A | 1/1966 | Blom | |
| 3,256,936 A | 6/1966 | Johnson et al. | |
| 3,434,550 A | 3/1969 | Townsend, Jr. | |
| 3,450,082 A * | 6/1969 | Demarest, Jr | 114/312 |
| 3,465,817 A | 9/1969 | Vincent | |
| 3,603,409 A | 9/1971 | Watkins | |
| 3,625,892 A | 12/1971 | Watanabe | |
| 3,661,208 A | 5/1972 | Scott et al. | |
| 3,815,673 A | 6/1974 | Bruce et al. | |
| 3,833,951 A | 9/1974 | Hurwitz | |
| 3,955,411 A | 5/1976 | Lawson, Jr. | |
| 4,046,191 A | 9/1977 | Neath | |
| 4,063,603 A | 12/1977 | Rayborn | |
| 4,091,881 A | 5/1978 | Maus | |
| 4,099,583 A | 7/1978 | Maus | |
| 4,123,367 A | 10/1978 | Dodd | |
| 4,134,461 A | 1/1979 | Blomsma | |
| 4,192,392 A | 3/1980 | Messines et al. | |
| 4,210,208 A | 7/1980 | Shanks | |
| 4,216,836 A | 8/1980 | Rayborn | |
| 4,217,208 A | 8/1980 | Wentzler | |
| 4,234,344 A | 11/1980 | Tinsley et al. | |
| 4,291,772 A | 9/1981 | Beynet | |
| 4,295,566 A | 10/1981 | Vincek | |
| 4,303,710 A | 12/1981 | Bullard et al. | |
| 4,303,731 A * | 12/1981 | Torobin | 428/333 |
| 4,304,298 A | 12/1981 | Sutton | |
| 4,340,427 A | 7/1982 | Sutton | |
| 4,362,566 A | 12/1982 | Hinterwaldner | |
| 4,367,093 A | 1/1983 | Burkhalter et al. | |
| 4,370,166 A | 1/1983 | Powers et al. | |
| 4,423,791 A | 1/1984 | Moses, Jr. | |
| 4,450,009 A | 5/1984 | Childs et al. | |
| 4,450,010 A | 5/1984 | Burkhalter et al. | |
| 4,460,052 A | 7/1984 | Gockel | |
| 4,498,995 A | 2/1985 | Gockel | |
| 4,565,578 A | 1/1986 | Sutton et al. | |
| 4,571,296 A | 2/1986 | Lott | |
| 4,619,772 A | 10/1986 | Black et al. | |
| 4,676,317 A | 6/1987 | Fry et al. | |
| 4,700,780 A | 10/1987 | Brothers | |
| 4,703,801 A | 11/1987 | Fry et al. | |
| 4,772,019 A | 9/1988 | Morgan | |
| 4,806,164 A | 2/1989 | Brothers | |
| 4,836,940 A | 6/1989 | Alexander | |
| 4,951,271 A | 8/1990 | Garrett et al. | |
| 4,970,706 A | 11/1990 | Tocquet et al. | |
| 5,117,882 A | 6/1992 | Stanford | |
| 5,124,186 A | 6/1992 | Wycech | |
| 5,207,282 A | 5/1993 | Fuh et al. | |
| 5,212,670 A | 5/1993 | Brown | |
| 5,259,453 A | 11/1993 | Johnston | |
| 5,281,483 A | 1/1994 | Hwo | |
| 5,368,412 A | 11/1994 | Johnston et al. | |
| 5,456,721 A | 10/1995 | Legrand | |
| 5,462,273 A | 10/1995 | Spector | |
| 5,487,390 A | 1/1996 | Cohen et al. | |
| 5,620,947 A | 4/1997 | Eldward-Berry | |
| 5,735,977 A | 4/1998 | Cushnie et al. | |
| 5,779,787 A | 7/1998 | Brothers et al. | |
| 5,826,669 A | 10/1998 | Zaleski et al. | |
| 5,837,739 A | 11/1998 | Nowak et al. | |
| 5,839,520 A | 11/1998 | Maillet | |
| 5,861,362 A | 1/1999 | Mayeux et al. | |
| 5,873,420 A | 2/1999 | Gearhart | |
| 5,881,826 A | 3/1999 | Brookey | |
| 5,910,467 A | 6/1999 | Bragg | |
| 5,959,762 A | 9/1999 | Bandettini et al. | |
| 6,059,034 A | 5/2000 | Rickards et al. | |
| 6,065,550 A | 5/2000 | Gardes | |
| 6,123,159 A | 9/2000 | Brookey et al. | |
| 6,138,757 A | 10/2000 | Latos et al. | |
| 6,143,069 A | 11/2000 | Brothers et al. | |
| 6,148,917 A | 11/2000 | Brookey et al. | |
| 6,156,708 A | 12/2000 | Brookey et al. | |
| 6,190,737 B1 | 2/2001 | Roche et al. | |
| 6,197,095 B1 | 3/2001 | Ditria et al. | |
| 6,197,418 B1 | 3/2001 | Cloots et al. | |
| 6,216,799 B1 | 4/2001 | Gonzalez | |
| 6,228,183 B1 | 5/2001 | Bangaru et al. | |
| 6,235,803 B1 | 5/2001 | Weiser et al. | |
| 6,261,679 B1 | 7/2001 | Chen et al. | |
| 6,276,455 B1 | 8/2001 | Gonzalez | |
| 6,277,286 B1 | 8/2001 | Soentvedt et al. | |
| 6,279,652 B1 | 8/2001 | Chatterji et al. | |
| 6,325,159 B1 | 12/2001 | Peterman et al. | |
| 6,328,107 B1 | 12/2001 | Maus | |
| 6,330,916 B1 | 12/2001 | Rickards et al. | |
| 6,354,373 B1 | 3/2002 | Vercaemer et al. | |
| 6,367,549 B1 | 4/2002 | Chatterji et al. | |
| 6,398,866 B1 | 6/2002 | Wombacher et al. | |
| 6,415,877 B1 | 7/2002 | Fincher et al. | |
| 6,422,326 B1 | 7/2002 | Brookey et al. | |
| 6,451,953 B1 | 9/2002 | Albright | |
| 6,454,022 B1 | 9/2002 | Sangesland et al. | |
| 6,457,524 B1 | 10/2002 | Roddy | |
| 6,505,691 B2 | 1/2003 | Judge et al. | |
| 6,508,305 B1 | 1/2003 | Brannon et al. | |
| 6,516,883 B1 | 2/2003 | Chatterji et al. | |
| 6,518,224 B2 | 2/2003 | Wood | |
| 6,527,051 B1 | 3/2003 | Reddy et al. | |
| 6,530,437 B2 | 3/2003 | Maurer et al. | |
| 6,536,540 B2 | 3/2003 | de Boer | |
| 6,554,071 B1 | 4/2003 | Reddy et al. | |
| 6,588,501 B1 | 7/2003 | Boyadjieff | |
| 6,610,798 B1 | 8/2003 | Bleijenberg et al. | |
| 6,626,991 B1 | 9/2003 | Drochon et al. | |
| 6,645,288 B1 | 11/2003 | Dargaud et al. | |
| 6,648,081 B2 | 11/2003 | Fincher et al. | |
| 6,656,265 B1 | 12/2003 | Garnier et al. | |
| 6,689,465 B1 | 2/2004 | Omori et al. | |
| 6,723,800 B2 | 4/2004 | Srienc et al. | |
| 6,739,408 B2 | 5/2004 | Rowden | |
| 6,742,592 B1 | 6/2004 | Le Roy-Delage et al. | |
| 6,745,857 B2 | 6/2004 | Gjedebo | |
| 6,747,107 B2 | 6/2004 | Petela et al. | |
| 6,752,208 B1 | 6/2004 | Nguyen | |
| 6,780,507 B2 | 8/2004 | Toreki et al. | |
| 6,802,379 B2 | 10/2004 | Dawson et al. | |
| 6,843,331 B2 | 1/2005 | de Boer | |
| 6,851,229 B2 | 2/2005 | Inzeo | |
| 6,854,532 B2 | 2/2005 | Fincher et al. | |
| 6,886,635 B2 | 5/2005 | Hossaini et al. | |
| 6,902,001 B2 | 6/2005 | Dargaud et al. | |
| 6,904,971 B2 | 6/2005 | Brothers et al. | |
| 6,904,982 B2 | 6/2005 | Judge et al. | |
| 6,906,009 B2 | 6/2005 | Shinbach et al. | |
| 6,907,929 B2 | 6/2005 | Leroy-Delage et al. | |
| 6,953,097 B2 | 10/2005 | Seyffert | |
| 6,962,201 B2 | 11/2005 | Brothers | |
| 6,983,797 B2 | 1/2006 | Nguyen et al. | |
| 7,004,255 B2 | 2/2006 | Boney | |
| 7,004,333 B2 | 2/2006 | Marcotullio et al. | |
| 7,037,881 B2 | 5/2006 | Growcock et al. | |
| 7,049,272 B2 | 5/2006 | Sinclair et al. | |
| 7,066,258 B2 | 6/2006 | Justus et al. | |
| 7,096,944 B2 | 8/2006 | Vargo, Jr. et al. | |
| 7,108,066 B2 | 9/2006 | Jamison | |
| 7,264,051 B2 | 9/2007 | Nguyen et al. | |
| 7,334,636 B2 | 2/2008 | Nguyen | |
| 7,361,693 B2 | 4/2008 | Albright et al. | |
| 7,494,711 B2 | 2/2009 | Kaufman et al. | |
| 2002/0011338 A1 | 1/2002 | Maurer et al. | |
| 2002/0040079 A1 | 4/2002 | Lee et al. | |
| 2002/0108782 A1 | 8/2002 | Boer | |
| 2002/0108786 A1 | 8/2002 | Rowden | |
| 2003/0162669 A1* | 8/2003 | Benton et al. | 507/100 |
| 2003/0164235 A1 | 9/2003 | Leeson et al. | |
| 2003/0196804 A1 | 10/2003 | Reit | |
| 2004/0007360 A1 | 1/2004 | Leroy-Delage et al. | |
| 2004/0033905 A1 | 2/2004 | Shinbach et al. | |
| 2004/0040706 A1 | 3/2004 | Hossaini et al. | |
| 2004/0065440 A1 | 4/2004 | Farabee et al. | |
| 2004/0067364 A1 | 4/2004 | Ishikawa et al. | |
| 2004/0089591 A1 | 5/2004 | Marcotullio et al. | |
| 2004/0101644 A1 | 5/2004 | Kinoshita et al. | |
| 2004/0142826 A1 | 7/2004 | Nguyen et al. | |

| | | | |
|---|---|---|---|
| 2004/0144537 A1 | 7/2004 | Reddy et al. | |
| 2004/0154963 A1 | 8/2004 | Rayborn | |
| 2004/0163812 A1 | 8/2004 | Brothers | |
| 2004/0171496 A1 | 9/2004 | Growcock et al. | |
| 2004/0171499 A1 | 9/2004 | Ravi et al. | |
| 2004/0194957 A1 | 10/2004 | Jabs | |
| 2004/0211562 A1 | 10/2004 | Brothers et al. | |
| 2004/0211564 A1 | 10/2004 | Brothers et al. | |
| 2004/0238177 A1 | 12/2004 | Fossli | |
| 2004/0244978 A1 | 12/2004 | Shaarpour | |
| 2004/0251026 A1 | 12/2004 | Dargaud et al. | |
| 2005/0006095 A1 | 1/2005 | Justus et al. | |
| 2005/0006144 A1 | 1/2005 | Dawson et al. | |
| 2005/0019574 A1 | 1/2005 | McCrary | |
| 2005/0023038 A1 | 2/2005 | Seyffert | |
| 2005/0061206 A1 | 3/2005 | Reddy et al. | |
| 2005/0098317 A1 | 5/2005 | Reddy et al. | |
| 2005/0098349 A1 | 5/2005 | Krueger et al. | |
| 2005/0113262 A1 | 5/2005 | Ravi et al. | |
| 2005/0124499 A1 | 6/2005 | Shinbach et al. | |
| 2005/0161262 A1* | 7/2005 | Jamison | 175/65 |
| 2005/0170973 A1 | 8/2005 | Verret | |
| 2005/0181688 A1 | 8/2005 | Roberts | |
| 2005/0284641 A1 | 12/2005 | Watkins et al. | |
| 2006/0065402 A9 | 3/2006 | Fontana et al. | |
| 2006/0070772 A1 | 4/2006 | deBoer | |
| 2006/0109746 A1 | 5/2006 | Crickmore et al. | |
| 2006/0213663 A1 | 9/2006 | Vargo, Jr. et al. | |
| 2006/0217270 A1 | 9/2006 | Vargo, Jr. et al. | |
| 2006/0231251 A1 | 10/2006 | Vargo, Jr. et al. | |
| 2006/0254775 A1 | 11/2006 | Jamison | |
| 2007/0027036 A1* | 2/2007 | Polizzotti et al. | 507/143 |
| 2008/0300339 A1 | 12/2008 | Wright et al. | |
| 2009/0084604 A1 | 4/2009 | Polizzotti et al. | |
| 2009/0090558 A1 | 4/2009 | Polizzotti et al. | |
| 2009/0091053 A1 | 4/2009 | Polizzotti et al. | |
| 2009/0114450 A1 | 5/2009 | Watkins et al. | |
| 2009/0151944 A1 | 6/2009 | Fuller et al. | |
| 2009/0163388 A1 | 6/2009 | Reddy et al. | |

FOREIGN PATENT DOCUMENTS

| | | |
|---|---|---|
| CA | 2466549 | 11/2004 |
| DE | 3209488 | 9/1982 |
| EP | 0 214 827 A2 | 3/1987 |
| EP | 0214827 | 3/1987 |
| EP | 1348831 | 10/2003 |
| FR | 2534268 | 4/1984 |
| GB | 1132687 | 11/1968 |
| GB | 2354236 | 3/2001 |
| WO | WO 99/21933 | 5/1999 |
| WO | WO 00/05323 | 2/2000 |
| WO | WO 00/20350 | 4/2000 |
| WO | WO 00/047691 | 8/2000 |
| WO | WO 2006/007347 | 1/2006 |
| WO | WO 2006/007347 A2 | 1/2006 |
| WO | WO 2006007347 A2 * | 1/2006 |
| WO | WO 2006/012164 | 2/2006 |
| WO | WO 2006/012164 A1 | 2/2006 |

OTHER PUBLICATIONS

International Search Report and Written Opinion, dated Apr. 16, 2008 for PCT/US07/10821.
Polizzotti, R.S. et al., U.S. Appl. No. 12/252,927, filed Oct. 16, 2008.
Polizzotti, R.S. et al., U.S. Appl. No. 12/252,935, filed Oct. 16, 2008.
Polizzotti, R.S. et al., U.S. Appl. No. 12/252,936, filed Oct. 16, 2008.
Claims of Great Britain Patent No. 1140068, Jan. 15, 1969.
"Hawley's Condensed Chemical Dictionary," 14th Edition, revised by Richard J. Lewis, Sr., pp. 922 and 941 (2001).
"Metallized Elastomers," Metal Finishing, vol. 99, No. 12, Dec. 2001, p. 61.
"New Mexico: Aphron ICS System Drills Through Highly Fractured Zone Without Losses," Performance Report, M-I LLC, Houston, Texas, 2001.
Abstract of "Drilling Industry Advances Deepwater, Related Technologies," Oil and Gas Journal 99/46 60,62 (Nov. 12, 2001) (Abstract only as published by Elsevier Engineering Information, Inc.).
Abstract of "Electroless Nickel and Plating on Plastics," Transactions of the Institute of Metal Finishing, vol. 77, No. 5, pp. B76-B77, 1999 (Abstract only as published by ACS on STN).
Abstract of Abdel All, A. et al., "Electroless Copper Plating on Polyethylene Films Modified by Radiation Grafting of Vinyl Ether of Monoethanolamine," Bayandamalary Kazakstan Respublikasy Ulttyk Gylym Akademiyasynyn, 6, pp. 67-72, 2003 (Abstract only as published by ACS on STN).
Abstract of Akis, B. Ceylan et al., "Effects of the In-Situ Controlled Oxidation of the Substrate on the Morphologies of Composite Palladium-Silver Membranes," Abstract for 14th Annual NAMS Meeting, Jackson Hole, Wyoming, 2003 (Extended Abstract).
Abstract of Akis, B. Ceylan et al., "Effects of the Sequence of Ag Deposition and Annealing on the Microstructure of Composite Pd-Ag Alloy/Porous Stainless Steel Membranes by SEM and EDS," Abstract for 15th Annual NAMS Meeting, Honolulu, Hawaii, 2004.
Abstract of Al-Rawahi, S. M. et al., "Nimr Horizontal Drilling: A Case History," SPE 8th Middle East Oil Conference (Bahrain 4/3-6/93) Proceedings V1 597-607 (1993) (Abstract only as published by Elsevier Engineering Information, Inc.).
Abstract of Alleman, J. et al., "Multi-Functional Solid Lubricant Reduces Friction/Prevents Mud Loss," World Oil V219 n.9 87-90 (Sep. 1998) (Abstract only as published by Elsevier Engineering Information, Inc.).
Abstract of An, Wei et al., "Studies of Electroless Nickel-Phosphorus Plating on Polyester Plastic," Diandu Yu Tushi, 21(1), pp. 13-15, 2002 (Abstract only as published by ACS on STN).
Abstract of Argillier, J.F. et al., "Biodegradable Lubricant Improves Water-Based Muds," SPE European Petroleum Europec '96 Conference (Milan Oct. 22-24, 1996) Proceedings V1 401-10 (1996) (SPE Paper #36862) (Condensation) World Oil V218 n. 4 1-6 (Apr. 1997) (Abstract only as published by Elsevier Engineering Information, Inc.).
Abstract of Argillier, J.F. et al., "Performance of a New Biodegradable Ester Based Lubricant for Improving Drilling Operations With Water Based Muds," SPE International Oilfield Chemistry Symposium (Houston Feb. 18-21, 1997) Proceedings 539-49 (1997) (SPE Paper #37264) (Abstract only as published by Elsevier Engineering Information, Inc.).
Abstract of Arizanov, V., "Lubricating Action of Drilling Fluid Additives," Rudodobiv V36 N. 12 9-11 (1981) (Abstract only as published by Elsevier Engineering Information, Inc.).
Abstract of Bennion, D.B., "Selecting Proper Fluid Critical to Successful UBD (Underbalanced Drilling) Operation," Amer Oil Gas Reporter, V 39, No. 8, pp. 72-75,78-80, Aug 1996 (Abstract).
Abstract of Bland, R., "Development of New Water Based Mud Formulations," Spec. Publ.—R. Soc. Chem., (Chem. Oil Ind.: Dev. Appl.) V97 83-98 (1991) (Abstract only as published by Elsevier Engineering Information, Inc.).
Abstract of Bland, R., "Water-Based Glycol Systems Acceptable Substitute for Oil-Based Muds," American Association of Drilling Engineers Drilling Fluids Technology Conference (Houston Apr. 22-23, 1992) (Adaptation) Oil & Gas Journal V90 N. 26 54-56,58-59 (Jun. 29, 1992) (Abstract only as published by Elsevier Engineering Information, Inc.).
Abstract of Bozovic, D. et al., "Plastic Deformations in Mechanically Strained Single-Walled Carbon Nanotubes," Physical Review B, (Jan. 15, 2003) vol. 6703, No. 3, p. 3407 (Abstract only as published by SciSearch Copyright 2005 The Thompson Corporation on STN).
Abstract of Breton, Y. et al., "Mechanical Properties of Multiwall Carbon Nanotubes / Epoxy Composites: Influence of Network Morphology," Carbon v 42 n. 5-6 2004, pp. 1027-1030 (Abstract only as published by Compendex Copyright 2005 EEI on STN).
Abstract of Briscoe, B.J. et al., "Lubrication of Water-Based Clay Suspensions," Tribology Series (27th Leeds-Lyon Symposium on Tribology, Lyon) 2001 (Abstract only as published by Elsevier Engineering Information, Inc.).
Abstract of Brookey T., "'Micro-Bubbles': New Aphron Drill-In Fluid Technique Reduces Formation Damage in Horizontal Wells," SPE International Formation Damage Control Symposium (Lafayette, LA Feb. 18-19, 1998) Proceedings 645-56 (1998) (Paper #SPE 39589) (Abstract only as published by Elsevier Engineering Information, Inc.).

Abstract of Brookey, T. et al., "Copolymer Beads Aid Horizontal Drilling Operations by Reducing Sliding Wellbore Friction," 4th World Oil et al Horizontal Well Technol Int Conf, Houston, Oct. 20-21, 1992 (Abstract).

Abstract of Brujan, E.A., "A First-Order Model for Bubble Dynamics in a Compressible Viscoelastic Liquid," Journal of Non-Newtonian Fluid Mechanics, 84/1 (83-103), 1999 (Abstract).

Abstract of Cadek, M. et al., "Effect of Nanotube Type on the Enhancement of Mechanical Properties of Free-Standing Polymer / Nanotube Composite Films," AIP Conference Proceedings (2003) No. 685, pp. 269-272 (Abstract only as published by INSPEC (C) 2005 IEE on STN).

Abstract of Cadek, M. et al., "Morphological and Mechanical Properties of Carbon-Nanotube-Reinforced Semicrystalline and Amorphous Polymer Composites," Applied Physics Letters v 81 n. 27 Dec. 30, 2003 2002, pp. 5123-5125 (Abstract only as published by Compendex Copyright 2005 EEI on STN).

Abstract of Cadek, Martin et al., "Mechanical and Thermal Properties of Carbon Nanotube Reinforced Polymer Composites," Proceedings of SPIE—The International Society for Optical Engineering v 4876 n. 2 2002, pp. 676-684 (Abstract only as published by Compendex Copyright 2005 EEI on STN).

Abstract of Carter, K.R. et al., "Exploring the Metal-Polymer Interface: Electroless Plating From Imprinted Polymer Surfaces," Abstracts of Papers, 226th ACS National Meeting, New York, NY, Sep. 7-11, 2003 (Abstract only as published by ACS on STN).

Abstract of Charbonnier, M. et al., "Electroless Plating of Polymer Substrates: Interaction of Pd-Based Catalysts With Plasma or VUV-Pretreated Surfaces," Proceedings of 24th Annual Meeting of the Adhesion Society, pp. 95-98, 2001 (Abstract only as published by ACS on STN).

Abstract of Coleman, J.N. et al., "Mechanical Properties of Hybrid Polymer Nanotube Systems," Proceedings of SPIE—The International Society for Optical Engineering V 5118 2003, pp. 271-279 (Abstract only as published by Compendex Copyright 2005 EEI on STN).

Abstract of Coleman, Jonathan N. et al., "Improving the Mechanical Properties of Single-Walled Carbon Nanotube Sheets by Intercalation of Polymeric Adhesives," Applied Physics Letters v 82 n. 11 Mar. 17, 2003, pp. 1682-1684 (Abstract only as published by Compendex Copyright 2005 EEI on STN).

Abstract of Demczyk, B.G. et al., "Direct Mechanical Measurement of the Tensile Strength and Elastic Modulus of Multiwalled Carbon Nanotubes," Materials Science & Engineering A (Sep. 2002) vol. A334, No. 1-2, pp. 173-178 (Abstract only as published by INSPEC (C) 2005 IEE on STN).

Abstract of Dumitrica, Traian and Yakobson, Boris I., "Strain-Rate and Temperature Dependent Plastic Yield in Carbon Nanotubes From Ab Initio Calculations," Applied Physics Letters v 84 n. 15 Apr. 12, 2004, pp. 2775-2777 (Abstract only as published by Compendex Copyright 2005 EEI on STN).

Abstract of Enright, D.P. et al., "An Environmentally Safe Water-Based Alternative to Oil Muds," SPE—International Association of Drilling Contractors Drilling Conference (Amsterdam Mar. 11-14, 1991) Proceedings 357-364 (1991) (Abstract only as published by Elsevier Engineering Information, Inc.).

Abstract of Ermakov, N.P. et al., "Lubricant Additives for Drilling Fluids," Razvedka i Okhrana Nedr (1989), (7), 37-40 (Abstract only as published by American Chemical Society).

Abstract of Frankland, S.J.V. et al., "The Stress-Strain Behavior of Polymer—Nanotube Composites From Molecular Dynamics Simulation," Composites Science and Technology (2003) v. 63(11), pp. 1655-1661 (Abstract only as published by Apollit Copyright 2005 FIZ KA on STN).

Abstract of Gao, J.-P. et al., "Performance Properties of Polyol SYP-1 As Additive for Environmentally Safe Drilling Fluid," Oilfield Chemistry 17/2, 97-99, 103 (Jun. 2000) (Abstract only as published by Elsevier Engineering Information, Inc.).

Abstract of Goepfert, Y. et al., "Electroless Plating of Polymer Substrates: Adhesion Testing Through a Tensile Shear Method Using Electrical Measurements," Proceedings of 24th Annual Meeting of the Adhesion Society, pp. 183-186, 2001 (Abstract only as published by ACS on STN).

Abstract of Goepfert, Y. et al., "Electroless Plating of Polymer Substrates: Extended Approaches Using Tin-Free Catalysts," Proceedings of the 25th Annual Meeting of the Adhesion Society, pp. 38-40, 2002 (Abstract only as published by ACS on STN).

Abstract of Gojny, F.H. et al., "Carbon Nanotube—Reinforced Epoxy—Composites: Enhanced Stiffness and Fracture Toughness at Low Nanotube Content," Composites Science and Technology (2004) v. 64 (15) , pp. 2363-2371 (Abstract only as published by Apollit Copyright 2005 FIZ KA on STN).

Abstract of Gojny, Florian H. & Schulte, Karl, "Functionalisation Effect on the Thermo-Mechanical Behaviour of Multi-Wall Carbon Nanotube / Epoxy—Composites," Composites Science and Technology (2004) v. 64 (15), pp. 2303-2308 (Abstract only as published by Apollit Copyright 2005 FIZ KA on STN).

Abstract of Gou, Jihua et al., "Load Transfer in Single-Walled Carbon Nanotube Rope/Polymer Nanocomposites," International SAMPE Technical Conference 2004, pp. 2287-2298 (Abstract only as published by Compendex Copyright 2005 EEI on STN).

Abstract of Goze, C. et al., "Elastic and Mechanical Properties of Carbon Nanotubes," Synthetic Metals v 103 n. 1-3 pt 3 Jun. 1999, pp. 2500-2501 (Abstract only as published by Compendex Copyright 2005 EEI on STN).

Abstract of Growcock, F.B. et al., "Novel Lubricants for Water-Based Drilling Fluids," SPE International Oilfield Chemistry Symposium, (Houston Feb. 16-19, 1999) Proceedings 93-103 (1999) SPE Paper #50710 (Abstract only as published by Elsevier Engineering Information, Inc.).

Abstract of Growcock, F.B. et al., "Application of Water-Based and Oil-Based Aphrons in Drilling Fluids," SPE Oilfield Chem Int Symp (Houston, TX, Feb. 5-7, 2003) Proc 2003 (SPE-80208) (Abstract only as published by American Chemical Society).

Abstract of Growcock, Frederick B. et al., "Alternative Aphron-Based Drilling Fluid," SPE Paper No. 87134; This paper was prepared for presentation at the IADC/SPE Drilling Conference held in Dallas, TX, USA, Mar. 2-4, 2004 (Abstract).

Abstract of Hwang, G.L. et al., "Efficient Load Transfer to Polymer—Grafted Multiwalled Carbon Nanotubes in Polymer Composites," Advanced Functional Materials (2004) v. 14 (5), pp. 487-491 (Abstract only as published by Apollit Copyright 2005 FIZ KA on STN).

Abstract of Ivan, C.D. et al., "Aphron-Base Drilling Fluid: Evolving Technologies for Lost Circulation Control," Annu Spe Tech Conf (New Orleans, LA, Sep. 30, 2001-Oct. 3, 2001) Proc 2001 (SPE-71377) (Abstract only as published by American Chemical Society).

Abstract of Ivan, C.D. et al., "Chemical and Physical Characterization of Aphron-Based Drilling Fluids," Annu Spe Tech Conf (San Antonio, TX, Sep. 29, 2002-Oct. 2, 2002) Proc 2002 (SPE-77445) (Abstract only as published by American Chemical Society).

Abstract of Iwai, Masao et al., "Electroless Plating of Plastic and Graphite Activated With Colloid Aggregates," Hyomen Gijutsu, 41(3), pp. 290-294, 1990 (Abstract only as published on ACS on STN).

Abstract of Jensen, P. et al., "Catalysis of Nanotube Plasticity Under Tensile Strain," Physical Review B, (Nov. 15, 2002) vol. 66, No. 19, p. 193403-1-4 (Abstract only as published by INSPEC (C) 2005 IEE on STN).

Abstract of Kinchen, D. et al., "Case History: Drilling Techniques Used in Successful Redevelopment of Low Pressure H25 Gas Carbonate Formation," SPE/IADC Drilling Conf (Amsterdam, Netherlands, Feb. 27, 2001-Mar. 1, 2001) Proc V 1, pp. 392-403, 2001 (SPE/IADC-67743) (Abstract only as published by American Chemical Society).

Abstract of Kintak, Lau et al., "Thermal and Mechanical Properties of Single-Walled Carbon Nanotube Bundle-Reinforced Epoxy Nanocomposites: The Role of Solvent for Nanotube Dispersion," Composites Science and Technology (2005) v. 65 (5), pp. 719-725 (Abstract only as published by Apollit Copyright 2005 FIZ KA on STN).

Abstract of Konno, Sunao, "Development of High Lubricity Water-Based Mud Using Polypropylene Glycol," Sekiyu Gijutsu Kyokaishi (2000), 65(2), 123-131 (Abstract only as published by American Chemical Society).

Abstract of Koshelev, V. N. et al., "Polymer-Dispersed Synergism and New Drilling Mud Systems," Neftyanoe Khozyaistvo (2001), (4), 22-23 (Abstract only as published by American Chemical Society).

Abstract of Kuru, E. et al., "New Directions in Foam and Aerated Mud Research and Development," SPE Paper No. 53963; This paper was prepared for presentation at the 1999 SPE Latin American and Caribbean Petroleum Engineering Conference held in Caracas, Venezuela, Apr. 21-23, 1999 (Abstract).

Abstract of Kuru, E. & Miska, S., "Hydraulics Design Concepts for Underbalanced Drilling Operations—A Current State of the Art," 52nd Mining & Met Mtg, Freiberg, Germany, Jun. 20-22, 2001, Pap; Oil Gas Europe Mag V 28, No. 2, pp. 27-33, Jun. 2002 (Abstract).

Abstract of Li, Qianqian et al., "Carbon Nanotube / Epoxy Resin Composites Using a Block Copolymer as a Dispersing Agent," Physica Status Solidi A (Oct. 2004) vol. 201, No. 13, pp. R89-91 (Abstract only as published by INSPEC (C) 2005 IEE on STN).

Abstract of Li, Rui-Hai & Gu, Yi, "Study on the Electroless Nickel Plating on Polystyrene Plastics," Sichuan Daxue Xuebao (Gongcheng Kexue Ban)/Journal of Sichuan University (Engineering Science Edition) v 36 N. 6 Dec. 2004, pp. 62-65 (Abstract only as published by Copyright 2005 EEI on STN).

Abstract of Li, Xiaodong et al., "Nanomechanical Characterization of Single-Walled Carbon Nanotube Reinforced Epoxy Composites," Nanotechnology v 15 n. 11 Nov. 2004, pp. 1416-1423 (Abstract only as published by Compendex Copyright 2005 EEI on STN).

Abstract of Lin, X.-W. et al., "Preparation of Powdered Caving—Preventor/Lubricator FRH-C for Water Base Drilling Fluids," Oilfield Chemistry 16/3 198-200 (Sep. 1999) (Abstract only as published by Elsevier Engineering Information, Inc.).

Abstract of Lin-Gibson, Sheng, et al., "Aggregation of Polymer—Dispersed Nanotubes Under Weak-Shear," Abstracts of Papers, 226th ACS National Meeting, New York, NY United States, Sep. 7-11, 2003 (Abstract only as published by HCAPLUS Copyright 2005 ACS on STN).

Abstract of Liu, C. et al., "Filtrate-Loss Controller/Lubricator PPL for Water-Base Drilling Fluids: Researches and Uses," Oilfield Chemistry V11 N. 4 278-82 (Dec. 1994) (in Chinese with English Abstract) (Abstract only as published by Elsevier Engineering Information, Inc.).

Abstract of Lu, K.-H. et al., "Performance Evaluation and Application of New Polyol and Polyol Water Base Drilling Fluid," Oilfield Chemistry 19/1 7-9, Mar. 25, 2002 (Abstract only as published by Elsevier Engineering Information, Inc.).

Abstract of Lusti, H.R. & Gusev, A.A., "Finite Element Predictions for the Thermoelastic Properties of Nanotube Reinforced Polymers," Modelling and Simulation in Materials Science and Engineering (May 2004), pp. S107-S119 (Abstract only as published by EMA Copyright 2005 CSA on STN).

Abstract of Maassen, E. and Tieke, B., "Catalytic Surfaces From Langmuir-Blodgett Films of Tris (4,4'-diisopropyldibenzylideneacetone) Palladium (0) as Precursor 2. Study of the Catalytic Activity in Electroless Metal Plating of Polymers," Langmuir, vol. 12, No. 23, pp. 5601-5605, Nov. 13, 1996 (Abstract only as published by The Thomson Corporation).

Abstract of Mandich, N. V., "EMI Shielding by Electroless Plating of ABS Plastics," Plating and Surface Finishing, vol. 81, No. 10, pp. 60-63, Oct. 1994 (Abstract only as published by EEI on STN).

Abstract of Maurer, W.C. & Medley, Jr. G.H., "Development and Testing of Underbalanced Drilling Products," US Doe et al Natur Gas RD&D Contract Rev Mtg, Baton Rouge, LA, Apr. 4-6, 1995 (Abstract).

Abstract of McDonald, W.J. et al., "New Lightweight Fluids for Underbalanced Drilling," Fed Energy Technol Center et al Oil & Gas Conf, Dallas, TX, Jun. 28-30, 1999 (Abstract).

Abstract of McNaughton, Timothy & Horch, Kenneth W., "Metallized Polymer Fibers as Leadwires and Intrafascicular Microelectrodes," Journal of Neuroscience Methods, vol. 70, Issue 1, Dec. 1, 1996, pp. 103-110 (Abstract).

Abstract of Medley, Jr., G.H. et al., "Development and Testing of Underbalanced Drilling Products: Topical Report (Sep. 1994-Sep. 1995)," US Doe Rep No Doe/MC/31197-5129 (DE96000649) Sep. 1995 (Abstract).

Abstract of Medley, Jr., G.H. et al., "Field Application of Lightweight Hollow Glass Sphere Drilling Fluid," Annu SPE Tech Conf, San Antonio, Oct. 5-8, 1997 pp. 699-707 (Abstract).

Abstract of Mensa-Wilmot, G. et al., "PAO (polyalphaolefin) Lubricant [Additive for Water-Based Drilling Muds] Inhibits Bit Balling, Speeds Drilling," Oil & Gas Journal V95 N. 16 68-70 (Apr. 21, 1997) (Abstract only as published by Elsevier Engineering Information, Inc.).

Abstract of Newpark Drilling Fluids, Inc., "Drilling Fluid," World Oil, vol. 199, No. 4, p. 126, Sep. 1984 (Abstract only as published by Elsevier Engineering Information, Inc.).

Abstract of Odegard, G.M. et al., "The Effect of Chemical Functionalization on Mechanical Properties of Nanotube / Polymer Composites," 44th AIAA/ASME/ASCE/AHS/ASC Structures, Structural Dynamics, and Materials Conference, v 4 2003, pp. 2728-2741 (Abstract only as published by Compendex Copyright 2005 EEI on STN).

Abstract of Paiva, M.C. et al., "Mechanical and Morphological Characterization of Polymer—Carbon Nanocomposites From Functionalized Carbon Nanotubes," Carbon v 42 N. 14 2004, pp. 2849-2854 (Abstract only as published by Compendex Copyright 2005 EEI on STN).

Abstract of Park, Soo-Jin et al., "A Study of Oxyfluorination of Multi-Walled Carbon Nanotubes on Mechanical Interfacial Properties of Epoxy Matrix Nanocomposites," Materials Science and Engineering. A: Structural Materials: Properties, Microstructure and Processing (2004) v. 385 (1-2), pp. 13-16 (Abstract only as published by Apollit Copyright 2005 FIZ KA on STN).

Abstract of Pen'kov, A.I. et al., "Increasing the Effectiveness of Lubricating Additives for Drilling Muds," Neftyanoc Khozyaistvo (2000), (5), 33-35 (Abstract only as published by American Chemical Society).

Abstract of Perez-Herranz, V. et al., "Effect of Citric Acid and Hydrochloric Acid on the Polarographic Behaviour of Tin: Application to the Determination of Tin (II) in Presence of Tin (IV) in the Activating Solutions of the Electroless Plating of Polymers," Analytica Chimica Acta, vol. 484, No. 2, pp. 243-251, May 19, 2003 (Abstract only as published by EEI on STN).

Abstract of Quigley, M.C., "Advanced Technology for Laboratory Measurements of Drilling Fluid Friction Coefficient (CF)," 64th SPE Annu Tech. Conf./Drilling (San Antonio 10/8-11/89) Proc. N. 19537 199-206 (1989) (Abstract only as published by Elsevier Engineering Information, Inc.).

Abstract of Ramirez, F. et al., "Experience Using Microbubbles—Aphron Drilling Fluid in Mature Reservoirs of Lake Maracaibo," SPE Formation Damage Contr Int Symp (Lafayette, LA, Feb. 20-21, 2002) Proc 2002 (SPE-73710) (Abstract only as published by American Chemical Society).

Abstract of Ren, Yu et al., "Tension-Tension Fatigue Behavior of Unidirectional Single-Walled Carbon Nanotube Reinforced Epoxy Composite," Carbon v 41 N. 11 2003, pp. 2177-2179 (Abstract only as published by Compendex Copyright 2005 EEI on STN).

Abstract of Roy, D. et al., "Treatability of Water-Based Drilling Fluids Using Colloidal Gas Aphrons," Fluid/Part. Sep. J. V5 N. 1 31-6 (1992) (Abstract only as published by Elsevier Engineering Information, Inc.).

Abstract of Saether, E. et al., "Transverse Mechanical Properties of Single-Walled Carbon Nanotube Crystals. Part I: Determination of Elastic Moduli," Composites Science and Technology v 63 N. 11 Aug. 2003, pp. 1543-1550 (Abstract only as published by Compendex Copyright 2005 EEI on STN).

Abstract of Sano, Morihiro, "Use of Polypropylene Glycol as a Drilling Fluid Additive," Sekiyu Gakkaishi (1997), 40(6), 534-538 (Abstract only as published by American Chemical Society).

Abstract of Sawdon, C.A. et al., "An Integrated Approach to the Development of a Water-Based Mud With Oil-Based Mud Performance," SPE-International Association of Drilling Contractors Drilling Conference (Amsterdam Feb. 28-Mar. 2, 1995) Proceedings 375-86 (1995) (Abstract only as published by Elsevier Engineering Information, Inc.).

Abstract of Schadler, L.S. et al., "Load Transfer in Carbon Nanotube Epoxy Composites," Applied Physics Letters (Dec. 28, 1998) vol. 73, No. 26, pp. 3842-3844 (Abstract only as published by INSPEC (C) 2005 IEE on STN).
Abstract of Shaffer, M.S.P & Windle, A.H., "Analogies Between Polymer Solutions and Carbon Nanotube Dispersions," Macromolecules v 32 N. 20 1999, pp. 6864-6866 (Abstract only as published by Compendex Copyright 2005 EEI on STN).
Abstract of Shi, Dong-Li et al., "The Effect of Nanotube Waviness and Agglomeration on the Elastic Property of Carbon Nanotube—Reinforced Composites," Journal of Engineering Materials and Technology, (2004), 126(3), 250-257 (Abstract only as published by PASCAL Copyright 2005 INIST-CNRS on STN).
Abstract of Song, Young Seok & Youn, Jae Ryoun, "Influence of Dispersion States of Carbon Nanotubes on Physical Properties of Epoxy Nanocomposites," Carbon v 43 n. 7 Jun. 2005 pp. 1378-1385 (Abstract only as published by Compendex Copyright 2005 EEI on STN).
Abstract of Sreekumar, T. et al., "Structure, Processing, and Properties of Polymer / SWNT Composite Fibers," Abstracts, 55th Southeast Regional Meeting of the American Chemical Society, Atlanta, GA, United States, Nov. 16-19, 2003, 505 (Abstract only as published by HCAPLUS Copyright 2005 ACS on STN).
Abstract of Sugihara, S. et al., "Study of Electroless Plating Fog on Plastic Surfaces," Journal of Applied Electrochemistry, vol. 26, No. 1, pp. 63-71, Jan. 1996 (Abstract only as published by EEI on STN).
Abstract of Takeda, Tomo et al., "Three-Dimensional Thermoelastic Analysis of Cracked Plain Weave Glass / Epoxy Composites at Cryogenic Temperatures Developments in Carbon Nanotube and Nanofibre Reinforced Polymers," Composites Science and Technology, (2004), 64 (15), 2353-2362 (Abstract only as published by Pascal Copyright 2005 INIST-CNRS on STN).
Abstract of Valentini, L. et al., "Physical and Mechanical Behavior of Single-Walled Carbon Nanotube / Polypropylene / Ethylene—Propylene—Diene Rubber Nanocomposites," Journal of Applied Polymer Science (2003) v. 89 (10), pp. 2657-2663 (Abstract only as published by Apollit Copyright 2005 FIZ KA on STN).
Abstract of Vera L.V., "Potential Use of Hollow Spheres in Dual Gradient Drilling," MS Thesis, Texas A&M Univ, College Station, TX, 2002 (Abstract only).
Abstract of Viswanathan, B., "Metallization of Plastics by Electroless Plating," Current Science, vol. 65, No. 7, pp. 537-543, Oct. 10, 1993 (Abstract only as published by The Thomson Corporation).
Abstract of Voitenko, V.S. et al., "Lubricating Additive for Drilling Muds," Razved. Okhr. Nedr N. 11 57-9 (1984) (Abstract only as published by Elsevier Engineering Information, Inc.).
Abstract of Wall, A. et al., "Physical Mechanism for the Mechanical Reinforcement in Nanotube— Polymer Composite Materials," Physical Review B (Condensed Matter and Materials Physics) (Mar. 15, 2005) vol. 71, No. 12, pp. 125421-1-5 (Abstract only as published by INSPEC (C) 2005 IEE on STN).
Abstract of Walters, D.A. et al., "Elastic Strain of Freely Suspended Single-Wall Carbon Nanotube Ropes," Applied Physics Letters (Jun. 21, 1999) vol. 74, No. 25, pp. 3803-3805 (Abstract only as published by INSPEC (C) 2005 IEE on STN).
Abstract of Wang, Ben et al., "Theoretical Prediction and Experimental Study of Mechanical Properties for Random and Magnetically Aligned Single-Walled Carbon Nanotube / Epoxy Composites," Materials Research Society, Symposium Proceedings (2004), pp. 331-339 (Abstract only as published by HCAPLUS Copyright 2005 ACS on STN).
Abstract of Wei, Chengyu et al., "Temperature and Strain—Rate Dependent Plastic Deformation of Carbon Nanotube," Materials Research Society Symposium Proceedings vol. 677, San Francisco, CA, Usa, Apr. 16-20, 2001 (Abstract only as published by INSPEC (C) 2005 IEE on STN).
Abstract of Welch, O. et al., "Cationic Polymer Mud Solves Gumbo Problems in North Sea," Oil & Gas Journal V90 N. 28 53-57 (Jul. 13, 1992) (Abstract only as published by Elsevier Engineering Information, Inc.).
Abstract of White, C.C. et al., "Aphron-Based Drilling Fluid: Novel Technology for Drilling Depleted Formations in the North Sea," SPE/IADC Drilling Conf (Amsterdam, Netherlands, Feb. 19-21, 2003) Proc 2003 (SPE/IADC-79840) (Abstract only as published by American Chemical Society).
Abstract of Wong, A. & Arco, M.J., "Use of Hollow Glass Bubbles as a Density Reducing Agent for Drilling," 9th Bien Cade/Caodc Drilling Conf, Calgary, Alberta, Oct. 22-24, 2001 (Abstract).
Abstract of Xie, Guang-Wen et al., "Electroless Silver Plating on Polymer Material," Qingdao Huagong Xuebao, 22(2), pp. 155-157, 2001 (Abstract only as published by ACS on STN).
Abstract of Xu, M.B. et al., "A Study on Novel Polyol Ether Lubricant for Water Based Drilling Fluids," Oilfield Chemistry 19/4 301-303, 321 (Dec. 25, 2002) (Abstract only as published by Elsevier Engineering Information, Inc.).
Abstract of Yakobson, B.I., "Mechanical Relaxation and 'Intramolecular Plasticity' in Carbon Nanotubes," Applied Physics Letters (Feb. 23, 1998) vol. 72, No. 8, pp. 918-920 (Abstract only as published by INSPEC (C) 2005 IEE on STN).
Abstract of Yang, Zhengtao & D'Souza, N. A., "Mechanical Properties of Multiwalled Carbon Nanotube—Epoxy Nanocomposites," Antec 2004: 62. Annual Technical Conference—Conference Proceedings. SPE (2004), pp. 2328-2332 Chicago, IL (Abstract only as published by Apollit Copyright 2005 FIZ KA on STN).
Abstract of Ye, Haihui et al., "Reinforcement and Rupture Behavior of Carbon Nanotubes—Polymer Nanofibers," Applied Physics Letters v 85 N. 10 Sep. 6, 2004, pp. 1775-1777 (Abstract only as published by Compendex Copyright 2005 EEI on STN).
Abstract of Zhou, Fengshan et al., "Rational Evaluation of Lubricity of Drilling Fluids," Xi'An Shiyou Xueyuan Xuebao (1999), 14(1), 22-25 (Abstract only as published by American Chemical Society).
Abstract of U.S. Patent No. 2,740,772, Apr. 3, 1956.
Abstract of U.S. Patent No. 2,779,053, Jan. 29, 1957.
Abstract of U.S. Patent No. 3,022,199, Feb. 20, 1962.
Abstract of U.S. Patent No. 3,130,959, Apr. 28, 1964.
Abstract of U.S. Patent No. 3,131,910, May 5, 1964.
Abstract of U.S. Patent No. 3,176,965, Apr. 6, 1965.
Abstract of U.S. Patent No. 3,322,695, May 30, 1967.
Abstract of U.S. Patent No. 3,358,749, Dec. 19, 1967.
Abstract of U.S. Patent No. 3,370,974, Feb. 27, 1968.
Abstract of U.S. Patent No. 3,507,681, Apr. 21, 1970.
Abstract of U.S. Patent No. 3,607,350, Sep. 21, 1971.
Abstract of U.S. Patent No. 3,661,783, May 09, 1972.
Abstract of U.S. Patent No. 3,711,176, Jan. 16, 1973.
Abstract of U.S. Patent No. 3,716,612, Feb. 13, 1973.
Abstract of U.S. Patent No. 3,737,263, Jun. 5, 1973.
Abstract of U.S. Patent No. 3,751,288, Aug. 7, 1973.
Abstract of U.S. Patent No. 3,759,647, Sep. 18, 1973.
Abstract of U.S. Patent No. 3,763,921, Oct. 9, 1973.
Abstract of U.S. Patent No. 3,801,429, Apr. 2, 1974.
Abstract of U.S. Patent No. 3,844,739, Oct. 29, 1974.
Abstract of U.S. Patent No. 4,035,227, Jul. 12, 1977.
Abstract of U.S. Patent No. 4,094,947, Jun. 13, 1978.
Abstract of U.S. Patent No. 4,150,177, Apr. 17, 1979.
Abstract of U.S. Patent No. 4,414,121, Nov. 8, 1983.
Abstract of U.S. Patent No. 4,420,405, Dec. 13, 1983.
Abstract of U.S. Patent No. 4,431,551, Feb. 14, 1984.
Abstract of U.S. Patent No. 4,455,429, Jun. 19, 1984.
Abstract of U.S. Patent No. 4,459,330, Jul. 10, 1984.
Abstract of U.S. Patent No. 4,491,524, Jan. 1, 1985.
Abstract of U.S. Patent No. 4,507,210, Mar. 26, 1985.
Abstract of U.S. Patent No. 4,517,100, May 14, 1985.
Abstract of U.S. Patent No. 4,526,693, Jul. 2, 1985.
Abstract of U.S. Patent No. 4,528,245, Jul. 9, 1985.
Abstract of U.S. Patent No. 4,554,080, Nov. 19, 1985.
Abstract of U.S. Patent No. 4,572,790, Feb. 25, 1986.
Abstract of U.S. Patent No. 4,582,543, Apr. 15, 1986.
Abstract of U.S. Patent No. 4,600,480, Jul. 15, 1986.
Abstract of U.S. Patent No. 4,600,656, Jul. 15, 1986.
Abstract of U.S. Patent No. 4,610,895, Sep. 9, 1986.
Abstract of U.S. Patent No. 4,619,772, Oct. 28, 1986.
Abstract of U.S. Patent No. 4,661,372, Apr. 28, 1987.
Abstract of U.S. Patent No. 4,664,818, May 12, 1987.
Abstract of U.S. Patent No. 4,719,021, Jan. 12, 1988.
Abstract of U.S. Patent No. 4,743,384, May 10, 1988.

Abstract of U.S. Patent No. 4,757,862, Jul. 19, 1988.
Abstract of U.S. Patent No. 4,830,765, May 16, 1989.
Abstract of U.S. Patent No. 4,876,017, Oct. 24, 1989.
Abstract of U.S. Patent No. 4,941,981, Jul. 17, 1990.
Abstract of U.S. Patent No. 4,963,273, Oct. 16, 1990.
Abstract of U.S. Patent No. 4,978,569, Dec. 18, 1990.
Abstract of U.S. Patent No. 5,030,365, Jul. 9, 1991.
Abstract of U.S. Patent No. 5,076,373, Dec. 31, 1991.
Abstract of U.S. Patent No. 5,110,484, May 5, 1992.
Abstract of U.S. Patent No. 5,127,475, Jul. 7, 1992.
Abstract of U.S. Patent No. 5,149,690, Sep. 22, 1992.
Abstract of U.S. Patent No. 5,160,600, Nov. 3, 1992.
Abstract of U.S. Patent No. 5,180,020, Jan. 19, 1993.
Abstract of U.S. Patent No. 5,208,216, May 4, 1993.
Abstract of U.S. Patent No. 5,211,250, May 18, 1993.
Abstract of U.S. Patent No. 5,248,664, Sep. 28, 1993.
Abstract of U.S. Patent No. 5,248,665, Sep. 28, 1993.
Abstract of U.S. Patent No. 5,260,269, Nov. 9, 1993.
Abstract of U.S. Patent No. 5,350,740, Sep. 27, 1994.
Abstract of U.S. Patent No. 5,399,425, Mar. 21, 1995.
Abstract of U.S. Patent No. 5,593,952, Jan. 14, 1997.
Abstract of U.S. Patent No. 5,658,860, Aug. 19, 1997.
Abstract of U.S. Patent No. 5,684,075, Nov. 4, 1997.
Abstract of U.S. Patent No. 5,686,396, Nov. 11, 1997.
Abstract of U.S. Patent No. 5,693,698, Dec. 2, 1997.
Abstract of U.S. Patent No. 5,700,767, Dec. 23, 1997.
Abstract of U.S. Patent No. 5,785,747, Jul. 28, 1998.
Abstract of U.S. Patent No. 5,807,810, Sep. 15, 1998.
Abstract of U.S. Patent No. 5,807,811, Sep. 15, 1998.
Abstract of U.S. Patent No. 5,837,655, Nov. 17, 1998.
Abstract of U.S. Patent No. 5,843,872, Dec. 1, 1998.
Abstract of U.S. Patent No. 5,851,961, Dec. 22, 1998.
Abstract of U.S. Patent No. 5,881,826, Mar. 16, 1999.
Abstract of U.S. Patent No. 5,882,713, Mar. 16, 1999.
Abstract of U.S. Patent No. 5,891,832, Apr. 6, 1999.
Abstract of U.S. Patent No. 5,942,467, Aug. 24, 1999.
Abstract of U.S. Patent No. 6,100,222, Aug. 8, 2000.
Abstract of U.S. Patent No. 6,103,671, Aug. 15, 2000.
Abstract of U.S. Patent No. 6,123,159, Sep. 26, 2000.
Abstract of U.S. Patent No. 6,194,361, Feb. 27, 2001.
Abstract of U.S. Patent No. 6,211,119, Apr. 3, 2001.
Abstract of U.S. Patent No. 6,242,389, Jun. 5, 2001.
Abstract of U.S. Patent No. 6,247,543, Jun. 19, 2001.
Abstract of U.S. Patent No. 6,248,698, Jun. 19, 2001.
Abstract of U.S. Patent No. 6,248,700, Jun. 19, 2001.
Abstract of U.S. Patent No. 6,258,756, Jul. 10, 2001.
Abstract of U.S. Patent No. 6,355,600, Mar. 12, 2002.
Abstract of U.S. Patent No. 6,422,325, Jul. 23, 2002.
Abstract of U.S. Patent No. 6,436,878, Aug. 20, 2002.
Abstract of U.S. Patent No. 6,454,005, Sep. 24, 2002.
Abstract of U.S. Patent No. 6,464,009, Oct. 15, 2002.
Abstract of U.S. Patent No. 6,500,785, Dec. 31, 2002.
Abstract of U.S. Patent Application No. 2001/0006935, Jul. 5, 2001.
Abstract of U.S. Patent Application No. 2001/0049341, Dec. 6, 2001.
Abstract of U.S. Patent Application No. 2002/0092681, Jul. 18, 2002.
Abstract of U.S. Patent Application No. 2002/0123433, Sep. 5, 2002.
Abstract of U.S. Patent Application No. 2002/0155956, Oct. 24, 2002.
Abstract of U.S. Patent Application No. 2003/0106718, Jun. 12, 2003.
Abstract of U.S. Patent Application No. 2003/0130132, Jul. 10, 2003.
Abstract of Canadian Patent No. 2,049,430, Feb. 22, 1992.
Abstract of Canadian Patent No. 2,044,048, Dec. 7, 1992.
Abstract of Canadian Patent No. 2,088,344, Oct. 11, 1993.
Abstract of Chinese Patent No. 1308111, Aug. 15, 2001.
Abstract of Chinese Patent No. 1329124, Jan. 2, 2002.
Abstract of East German Patent No. 295653, Nov. 7, 1991.
Abstract of German Patent No. 958698, Feb. 21, 1957.
Abstract of German Patent No. 2610470, Sep. 30, 1976.
Abstract of German Patent No. 2744426, Apr. 5, 1979.
Abstract of German Patent No. 3622826, Jan. 21, 1988.
Abstract of German Patent No. 4011348, Oct. 10, 1991.
Abstract of German Patent No. 19647598, May 20, 1998.
Abstract of German Patent No. 19852971, May 18, 2000.
Abstract of European Patent No. 68601, Jan. 5, 1983.
Abstract of European Patent No. 673984, Sep. 27, 1995.
Abstract of European Patent No. 325466, Jul. 26, 1989.
Abstract of European Patent No. 333458, Sep. 20, 1989.
Abstract of European Patent No. 340513, Nov. 8, 1989.
Abstract of European Patent No. 369692, May 23, 1990.
Abstract of European Patent No. 495579, Jul. 22, 1992.
Abstract of European Patent No. 634468, Jan. 18, 1995.
Abstract of European Patent No. 702073, Mar. 20, 1996.
Abstract of European Patent No. 713909, May 29, 1996.
Abstract of European Patent No. 770661, May 2, 1997.
Abstract of European Patent No. 967299, Dec. 29, 1999.
Abstract of European Patent No. 1103589, May 30, 2001.
Abstract of European Patent No. 1529858, May 11, 2005.
Abstract of Great Britain Patent No. 1174461, Dec. 17, 1969.
Abstract of Great Britain Patent No. 1246706, Sep. 15, 1971.
Abstract of Great Britain Patent No. 2013722, Aug. 15, 1979.
Abstract of Great Britain Patent No. 2125860, Mar. 14, 1984.
Abstract of Great Britain Patent No. 2153411, Aug. 21, 1985.
Abstract of Great Britain Patent No. 2216573, Oct. 11, 1989.
Abstract of Great Britain Patent No. 2216574, Oct. 11, 1989.
Abstract of Great Britain Patent No. 2221940, Feb. 21, 1990.
Abstract of Great Britain Patent No. 2245579, Jan. 8, 1992.
Abstract of Great Britain Patent No. 2251876, Jul. 22, 1992.
Abstract of Great Britain Patent No. 2277338, Oct. 26, 1994.
Abstract of Great Britain Patent No. 2283036, Apr. 26, 1995.
Abstract of Great Britain Patent No. 2297774, Aug. 14, 1996.
Abstract of Great Britain Patent No. 2297775, Aug. 14, 1996.
Abstract of Great Britain Patent No. 2304754, Mar. 26, 1997.
Abstract of Great Britain Patent No. 2309240, Jul. 23, 1997.
Abstract of Great Britain Patent No. 2328228, Feb. 17, 1999.
Abstract of Great Britain Patent No. 2340521, Feb. 23, 2000.
Abstract of Great Britain Patent No. 2342110, Apr. 5, 2000.
Abstract of Hungarian Patent No. 047969, Apr. 28, 1989.
Abstract of Indian Patent No. 176402, May 18, 1996.
Abstract of Japanese Patent No. 67007127, 1968.
Abstract of Japanese Patent No. 47018737, Nov. 1, 1972.
Abstract of Japanese Patent No. 48078038, Oct. 19, 1973.
Abstract of Japanese Patent No. 49005481, Jan. 18, 1974.
Abstract of Japanese Patent No. 49019687, May 20, 1974.
Abstract of Japanese Patent No. 49063623, Jun. 20, 1974.
Abstract of Japanese Patent No. 49073472, Jul. 16, 1974.
Abstract of Japanese Patent No. 49073473, Jul. 16, 1974.
Abstract of Japanese Patent No. 49104842, Oct. 3, 1974.
Abstract of Japanese Patent No. 49128832, Dec. 10, 1974.
Abstract of Japanese Patent No. 51151631, Dec. 26, 1976.
Abstract of Japanese Patent No. 52069475, Jun. 9, 1977.
Abstract of Japanese Patent No. 52077833, Jun. 30, 1977.
Abstract of Japanese Patent No. 54117328, Sep. 12, 1979.
Abstract of Japanese Patent No. 56041859, Apr. 18, 1981.
Abstract of Japanese Patent No. 58120640, Jul. 18, 1983.
Abstract of Japanese Patent No. 58196238, Nov. 15, 1983.
Abstract of Japanese Patent No. 60121273, Jun. 28, 1985.
Abstract of Japanese Patent No. 61091363, May 9, 1986.
Abstract of Japanese Patent No. 61091364, May 9, 1986.
Abstract of Japanese Patent No. 61113773, May 31, 1986.
Abstract of Japanese Patent No. 62020877, Jan. 29, 1987.
Abstract of Japanese Patent No. 62124278, Jun. 5, 1987.
Abstract of Japanese Patent No. 62156273, Jul. 11, 1987.
Abstract of Japanese Patent No. 62222816, Sep. 30, 1987.
Abstract of Japanese Patent No. 63103077, May 7, 1988.
Abstract of Japanese Patent No. 63206475, Aug. 25, 1988.
Abstract of Japanese Patent No. 01109551, Apr. 26, 1989.
Abstract of Japanese Patent No. 02270967, Nov. 6, 1990.
Abstract of Japanese Patent No. 03062869, Mar. 18, 1991.
Abstract of Japanese Patent No. 03068776, Mar. 25, 1991.
Abstract of Japanese Patent No. 03130373, Jun. 4, 1991.
Abstract of Japanese Patent No. 03206173, Sep. 9, 1991.
Abstract of Japanese Patent No. 03274261, Dec. 5, 1991.
Abstract of Japanese Patent No. 03287779, Dec. 18, 1991.
Abstract of Japanese Patent No. 04036470, Feb. 6, 1992.
Abstract of Japanese Patent No. 04136184, May 11, 1992.

Abstract of Japanese Patent No. 04183873, Jun. 30, 1992.
Abstract of Japanese Patent No. 04337078, Nov. 25, 1992.
Abstract of Japanese Patent No. 05070962, Mar. 23, 1993.
Abstract of Japanese Patent No. 05129249, May 25, 1993.
Abstract of Japanese Patent No. 05301786, Nov. 16, 1993.
Abstract of Japanese Patent No. 5320922, Dec. 7, 1993.
Abstract of Japanese Patent No. 06087964, Mar. 29, 1994.
Abstract of Japanese Patent No. 07011450, Jan. 13, 1995.
Abstract of Japanese Patent No. 07207451, Aug. 8, 1995.
Abstract of Japanese Patent No. 09003653, Jan. 7, 1997.
Abstract of Japanese Patent No. 09025580, Jan. 28, 1997.
Abstract of Japanese Patent No. 09116158, May 2, 1997.
Abstract of Japanese Patent No. 10088361, Apr. 7, 1998.
Abstract of Japanese Patent Application No. 2000/313963, Nov. 14, 2000.
Abstract of Japanese Patent Application No. 2001/131759, May 15, 2001.
Abstract of Japanese Patent Application No. 2001/247974, Sep. 14, 2001.
Abstract of Norwegian Patent Application No. 2000/01336, Sep. 18, 2000.
Abstract of Research & Development Patent No. 384041, Apr. 10, 1996.
Abstract of Research & Development Patent No. 391024, Nov. 10, 1996.
Abstract of Romanian Patent Application No. 114971, Sep. 30, 1999.
Abstract of Russian Patent No. 2163616, Feb. 27, 2001.
Abstract of Russian Patent No. 2178320, Jan. 20, 2002.
Abstract of Russian Patent No. 2182587, May 20, 2002.
Abstract of Soviet Union Patent No. 963996, Feb. 7, 1983.
Abstract of Soviet Union Patent No. 1010101, Apr. 7, 1983.
Abstract of Soviet Union Patent No. 1052533, Nov. 7, 1983.
Abstract of Soviet Union Patent No. 1102802, Jul. 15, 1984.
Abstract of Soviet Union Patent No. 1127893, Dec. 7, 1984.
Abstract of Soviet Union Patent No. 1129215, Dec. 15, 1984.
Abstract of Soviet Union Patent No. 1141110, Feb. 23, 1985.
Abstract of Soviet Union Patent No. 1146306, Mar. 23, 1985.
Abstract of Soviet Union Patent No. 1196369, Dec. 7, 1985.
Abstract of Soviet Union Patent No. 1196370, Dec. 7, 1985.
Abstract of Soviet Union Patent No. 1239141, Jun. 23, 1986.
Abstract of Soviet Union Patent No. 1263704, Oct. 15, 1986.
Abstract of Soviet Union Patent No. 1298236, Mar. 23, 1987.
Abstract of Soviet Union Patent No. 1303604, Apr. 15, 1987.
Abstract of Soviet Union Patent No. 1303606, Apr. 15, 1987.
Abstract of Soviet Union Patent No. 1399322, May 30, 1988.
Abstract of Soviet Union Patent No. 1447831, Dec. 30, 1988.
Abstract of Soviet Union Patent No. 1461754, Feb. 28, 1989.
Abstract of Soviet Union Patent No. 1481252, May 23, 1989.
Abstract of Soviet Union Patent No. 1484823, Jun. 7, 1989.
Abstract of Soviet Union Patent No. 1627554, Feb. 15, 1991.
Abstract of Soviet Union Patent No. 1645278, Apr. 30, 1991.
Abstract of Soviet Union Patent No. 1680751, Sep. 30, 1991.
Abstract of Soviet Union Patent No. 1724674, Apr. 7, 1992.
Abstract of Soviet Union Patent No. 1747464, Jul. 15, 1992.
Abstract of Soviet Union Patent No. 1749226, Jul. 23, 1992.
Abstract of Soviet Union Patent No. 1754757, Aug. 15, 1992.
Abstract of Soviet Union Patent No. 1776269, Nov. 15, 1992.
Abstract of Soviet Union Patent No. 1792959, Feb. 7, 1993.
Abstract of Soviet Union Patent No. 1799895, Mar. 7, 1993.
Abstract of Soviet Union Patent No. 1808861, Apr. 15, 1993.
Abstract of Soviet Union Patent No. 1808862, Apr. 15, 1993.
Abstract of Soviet Union Patent No. 1838364, Aug. 30, 1993.
Abstract of PCT International Publication No. 9311202, Jun. 10, 1993.
Abstract of PCT International Publication No. 9315164, Aug. 5, 1993.
Abstract of PCT International Publication No. 9323491, Nov. 25, 1993.
Abstract of PCT International Publication No. 9414919, Jul. 7, 1994.
Abstract of PCT International Publication No. 9603474, Feb. 8, 1996.
Abstract of PCT International Publication No. 9604349, Feb. 15, 1996.
Abstract of PCT International Publication No. 9632455, Oct. 17, 1996.
Abstract of PCT International Publication No. 9632456, Oct. 17, 1996.
Abstract of PCT International Publication No. 9633250, Oct. 24, 1996.
Abstract of PCT International Publication No. 9634068, Oct. 31, 1996.
Abstract of PCT International Publication No. 9707183, Feb. 27, 1997.
Abstract of PCT International Publication No. 9710313, Mar. 20, 1997.
Abstract of PCT International Publication No. 9836151, Aug. 20, 1998.
Abstract of PCT International Publication No. 9840446, Sep. 17, 1998.
Abstract of PCT International Publication No. 9966006, Dec. 23, 1999.
Abstract of PCT International Publication No. 2000/43465, Jul. 27, 2000.
Abstract of PCT International Publication No. 2001/94740, Dec. 13, 2001.
Abstract of PCT International Publication No. 2002/22759, Mar. 21, 2002.
Abstract of PCT International Publication No. 2002/36929, May 10, 2002.
Abstract of PCT International Publication No. 2002/38697, May 16, 2002.
Abstract of PCT International Publication No. 2002/53873, Jul. 11, 2002.
Abstract of PCT International Publication No. 2002/64697, Aug. 22, 2002.
Abstract of PCT International Publication No. 2002/79359, Oct. 10, 2002.
Abstract of PCT International Publication No. 2003/25086, Mar. 27, 2003.
Adams, Steven F. and Miller, Terry A., "Surface and Volume Loss of Atomic Nitrogen in a Parallel Plate Rf Discharge Reactor," Plasma Sources Sci. Technol., vol. 9, pp. 1-8, 2000.
Akis, B. Ceylan et al., "Effects of the In-Situ Formation of an Intermetallic Diffusion Barrier Layer on the Properties of Composite Palladium Membranes," Fuel Chemistry Division Preprints 2002, 47(1).
Akis, B. Ceylan, "Preparation of Pd-Ag/PSS Composite Membranes for Hydrogen Separation," A Thesis Submitted to the Faculty of the Worcester Polytechnic Institute, May 2004.
Aleksinas, Michael J., "Troubleshooting Electroless Nickel Plating Solutions," Chapter 3, pp. 101-109 in *Electroless Plating: Fundamentals and Applications*, Mallory, G.O. & Hajdu, J.B., editors, American Electroplaters and Surface Finishers Society, 1990.
Arco, M.J. et al., "Field Application of Glass Bubbles as a Density-Reducing Agent," Annu SPE Tech Conf, Dallas, TX, Oct. 1-4, 2000, pp. 115-126.
Athayde, A.L. et al., "Metal Composite Membranes for Hydrogen Separation," Journal of Membrane Science, 94 (1994) pp. 299-311.
Auch, M. et al., "Ultrathin Glass for Flexible OLED Application," Thin Solid Films 417 (2002) 47-50.
Babcock, Jason R., "Novel Low-Temperature Coating Method for Environmental Protective Coatings on Polymers," Ultramet Advanced Materials Solutions, Pacoima, CA, Feb. 1995.
Bader, S. et al., "Comparison of Mechanical Properties and Microstructure of A1 (1 wt.%Si) and A1 (1 wt.%Si, 0.5 wt.%Cu) Thin Films," Thin Solid Films, vol. 263, No. 2, Jul. 15, 1995, pp. 175-184.
Baldwin, E. et al., "Processing TiPdNi Base Thin-Film Shape Memory Alloys Using Ion Beam Assisted Deposition," Surface & Coatings Technology 200 (2005) 2571-2579.
Beil, S. et al., "Photochemical Functionalization of Polymer Surfaces for Subsequent Metallization," Surface and Coatings Technology, vols. 116-119, Sep. 1999, pp. 1195-1203.
Beu, T.A. and Mercea, P.-V., "Gas Transport Through Metallized Polymer Membranes," Materials Chemistry and Physics, vol. 26, Issues 3-4, Nov. 1990, pp. 309-322.

Bezuk, S.J. and Kryzak, C., "Laser Stimulated Chemical Vapor Deposition of Metals on Polyimides," Metallized Plastics 1, Plenum Press, 1989, pp. 1-8.

Bindra, Perminder & White, James R., "Fundamental Aspects of Electroless Copper Plating," Chapter 12, pp. 289-329 in "*Electroless Plating: Fundamentals and Applications*," Mallory, G.O. & Hajdu, J.B., editors, American Electroplaters and Surface Finishers Society, 1990.

Blanco, J. et al., "Field Application of Glass Bubbles as a Density Reducing Agent in an Oil Base Drilling Fluid for Marginal/Low-Permeability/Low-Pressure Reservoirs," SPE 75508, SPE Gas Technology Symposium, Calgary, Canada, Apr. 30-May 2, 2002, pp. 1-7.

Bowyer, W.H. and Bader, M.G., "On the Re-inforcement of Thermoplastics by Imperfectly Aligned Discontinuous Fibres," Journal of Materials Science 7, 1315-1321 (1972).

Boyce, M.C. et al., "Micro/Nanoscale Modeling of Anisotropic Mechanical Properties of Polymer Nano-Clay Composites," Polymeric Materials Science and Engineering 86, 425-426 (2002).

Brantly, J.E., *A History of Oil Well Drilling*, Gulf Publishing Co., Houston, TX, 1971.

Brinker, W. et al., "Metallized Viscoelastic Control Layers for Light-Valve Projection Displays," Displays, vol. 16, No. 1, Jan. 1995, pp. 13-20.

Brochure entitled, "Abaqus/Answers," Hibbitt, Karlsson & Sorensen, Inc., 1080 Main Street, Pawtucket, RI 02860-4847, USA, Spring 2001.

Brochure entitled, "Expancel," A company within Akzo Nobel, Jan. 2003.

Brochure entitled, "Industry Leading Elastomer Technology," R&M Energy Systems, 10586 US Highway 75 North, Willis, TX 77378, 2003.

Brochure entitled, "Specialty Materials for the Oil & Gas Industry," 3M Specialty Materials, St. Paul, MN (Jun. 2001).

Brochure entitled, "Spherelite Cement Additive," Halliburton Energy Services, Inc. (1999).

Brochure entitled, "The Aphron ICS-Invasion-Control System," M-I LLC Houston, Texas, 2001.

Brochure entitled, "3M Microspheres," 3M Specialty Materials, St. Paul, MN (Sep. 2000).

Brochure entitled, "3M Scotchlite Glass Bubbles," 3M Specialty Materials, St. Paul, MN (Jul. 1999).

Brochure entitled, "Vectra Liquid Crystal Polymer (LCP)," Ticona, 90 Morris Avenue, Summit, NJ 07901-3914, 2001.

Bucur, R.V. and Mecea, V., "The Diffusivity and Solubility of Hydrogen in Metallized Polymer Membranes Measured by the Non-Equilibrium Stripping Potentiostatic Method," Surface and Coatings Technology, vol. 28, Nos. 3-4, Jul.-Aug. 1986, pp. 387-396.

Bucur, R.V. and Mecea, V., "Permeation of Hydrogen Through Metallized Polyethyleneterephtalate Membranes Measured by the Stripping Potentiostatic Method," Electrochimica Acta, vol. 31, No. 10, Oct. 1986, pp. 1343-1346.

Canova, L.A., "Mica Reinforcement of Polypropylene," in *Handbook of Polypropylene and Polypropylene Composites*, edited by H. G. Karian (Marcel Dekker, New York, 1999), pp. 499-547.

Capaccio, Robert, "Wastewater Treatment for Electroless Plating," Chapter 20, pp. 519-528 in "*Electroless Plating: Fundamentals and Applications*," Mallory, G.O. & Hajdu, J.B., editors, American Electroplaters and Surface Finishers Society, 1990.

Chandra, D. et al., "Hydration and Strength of Neat Portland Cement," Reprinted from Magazine of Concrete Research, vol. 20, No. 64, Sep. 1968, pp. 131-136.

Charbonnier, M. et al., "Laser-Assisted Grafting Onto Polycarbonate: Application to Metallization by Chemical Means," Applied Surface Science, vols. 109-110, Feb. 1, 1997, pp. 206-211.

Charbonnier, M. et al., "Electroless Plating of Polymers: XPS Study of the Initiation Mechanisms," Journal of Applied Electrochemistry, vol. 28, No. 4, pp. 449-453, Apr. 1998.

Charbonnier, M. et al., "New Approaches for Electroless Plating Processes by Activation of Polymer Surfaces Using Low Pressure Plasma and Dielectric-Barrier Discharge Devices," Metallized Plastics 7, 2001, pp. 3-26.

Charbonnier, M. and Romand, M., "Tin-Free Electroless Metallization of Glass Substrates Using Different PACVD Surface Treatment Processes," Surface and Coatings Technology, vol. 162, No. 1, Jan. 1, 2002, pp. 19-30.

Charbonnier, M. and Romand, M., "Polymer Pretreatments for Enhanced Adhesion of Metals Deposited by the Electroless Process," International Journal of Adhesion & Adhesives, vol. 23, No. 4, (2003), pp. 277-285.

Chen, W.X. et al., "Electroless Preparation and Tribological Properties of Ni-P-Carbon Nanotube Composite Coatings Under Lubricated Condition," Surface and Coatings Technology, vol. 160, No. 1, Oct. 1, 2002, pp. 68-73.

Chen, G. and Burnett, D., "Improving Performance of Low Density Drill in Fluids with Hollow Glass Spheres," SPE 82276, SPE European Formation Damage Conference, The Hague, Netherlands, May 2003, pp. 1-10.

Chong, S.P. et al., "Electroless Copper Seed Layer Deposition on Tantalum Nitride Barrier Film," Surface & Coatings Technology 198 (2005) 287-290.

Chopra, K.L., *Thin Film Phenomena*, McGraw-Hill, New York, (1969).

Chou, T.-W. (Volume Ed.), Structure and Properties of Composites, vol. 13 of *Materials Science and Technology*, eds. Cahn, R.W. et al. (VCH Publishers, Inc., Weinheim, 1993).

Clingerman, Matthew L. et al., "Synergistic Effects of Carbon Fillers in Electrically Conductive Nylon 6,6 and Polycarbonate Based Resins," Polymer Composites, Oct. 2002, vol. 23, No. 5, pp. 911-924.

Colaruotolo, Joseph and Tramontana, Diane, "Engineering Applications of Electroless Nickel," Chapter 8, pp. 207-227 in "*Electroless Plating: Fundamentals and Applications*," Mallory, G.O. & Hajdu, J.B., editors, American Electroplaters And Surface Finishers Society, 1990.

Curtin, W.A. and Takeda, N., "Tensile Strength of Fiber-Reinforced Composites: I. Model and Effects of Local Fiber Geometry," Journal of Composite Materials 32, 2042-2059 (1998).

Curtin, W.A. and Takeda, N., "Tensile Strength of Fiber-Reinforced Composites: II. Application to Polymer Matrix Composites," Journal of Composite Materials 32, 2060-2081 (1998).

Curtin, W.A., "Tensile Strength of Fiber-Reinforced Composites: III. Beyond the Traditional Weibull Model for Fiber Strengths," Journal of Composite Materials 34, 1301-1332 (2000).

Dai, J. and Harrington, J.A., "High-Peak-Power, Pulsed $CO_2$ Laser Light Delivery by Hollow Glass Waveguides," Applied Optics, vol. 36, No. 21, pp. 5072-5077, Jul. 20, 1997.

Dallaire, E. et al., "High Performance Powder," Civil Engineering, Jan. 1998, pp. 49-51.

David, E. et al., "Surface Modification of Polytetrafluoroethylene for Adhesive Bonding," Journal of Materials Processing Technology, vols. 157-158, Dec. 2004, pp. 284-289.

Delaunois, F. and Lienard, P., "Heat Treatments for Electroless Nickel-Boron Plating on Aluminium Alloys," Surface and Coatings Technology, vol. 160, Nos. 2-3, Oct. 22, 2002, pp. 239-248.

Desai, Shrojal M. et al., "Fabrication of Long-Term Hydrophilic Elastomeric Surfaces Via Plasma Induced Surface Cross-Linking of Functional Monomers," Surface and Coatings Technology, vol. 184, No. 1, Jun. 1, 2004, pp. 6-12.

DeSimone, Antonio, "Coarse-Grained Models of Materials With Non-Convex Free-Energy: Two Case Studies," Computer Methods in Applied Mechanics and Engineering, vol. 193, Nos. 48-51, Dec. 3, 2004, pp. 5129-5141.

Domenech, S.C. et al., "Electroless Plating of Nickel-Phosphorous on Surface-Modified Poly(ethylene terephthalate) Films," Applied Surface Science, vol. 220, Nos. 1-4, Dec. 30, 2003, pp. 238-250.

Duffek, E.F. et al., "Electroless Nickel Applications in Electronics," Chapter 9, pp. 229-259 in "*Electroless Plating: Fundamentals and Applications*," Mallory, G.O. & Hajdu, J.B., editors, American Electroplaters and Surface Finishers Society, 1990.

Dworak, T.D., "Shape Memory Metals," Final Report, Technical Communications, Kansas City Division, published Sep. 1993.

Eberhardt, W. et al., "Innovative Concept for the Fabrication of Micromechanical Sensor and Actuator Devices Using Selectively Metallized Polymers," Sensors and Actuators A, vols. 97-98, Apr. 1, 2002, pp. 473-477.

Eduljee, R.F. and McCullough, R.L.,"Elastic Properties of Composites," Chapter 9 of vol. 13, Structure and Properties of Composites, edited by T.-W. Chou in *Materials and Science Technology*, edited by R.W. Cahn et al. (VCH Publishers, Inc., Weinheim, 1993) pp. 381-474.

Engwall, Erik E. et al., "Formation and Characterization of Oxide Diffusion Barriers on Porous 316L Stainless Steel Supports Used for Composite Pd Membranes," Prepared for Presentation at the 2003 Annual Meeting, San Francisco, CA T6015 Nov. 2003.

Faupel, F. et al., "Fundamental Aspects of Polymer Metallization," in *Metallization of Polymers 2*, E. edited by E. Sacher, Plenum Publishers, 2002, pp. 73-96.

Feldstein, Nathan, "Composite Electroless Plating," Chapter 11, pp. 269-287 in *"Electroless Plating: Fundamentals and Applications,"* Mallory, G.O. & Hajdu, J.B., editors, American Electroplaters and Surface Finishers Society, 1990.

Folweiler, R.G. and Brotzen, F.R., "The Effect of Quenched-In Vacancies on the Elastic Modulus of Aluminum," Acta Metallurgica, vol. 7, No. 11, Nov. 1959, pp. 716-721.

Fornes, T.D. et al., "Effect of Organoclay Structure on Nylon 6 Nanocomposite Morphology and Properties," Polymer 43, 5915-5933 (2002).

Frerichs, H. et al., "Laser-Induced Surface Modification and Metallization of Polymers," Applied Surface Science, vol. 86, Nos. 1-4, Feb. 1995, pp. 405-410.

Friedrich, K., "Crazes and Shear Bands in Semi-Crystalline Thermoplastics," in *Crazing in Polymers*, edited by H.H. Kausch (Springer-Verlag, Berlin, 1983), pp. 225-274.

Galindo, R. Escobar et al., "Study of Polymer/Metal Coating Under Stress Using Positron Annihilation Spectroscopy," Acta Materialia, vol. 48, Nos. 18-19, Dec. 2000, pp. 4743-4747.

Ghomshei, M.M., et al., "A Three-Dimensional Shape Memory Alloy/Elastomer Actuator," Composites: Part B, vol. 32, No. 5, 2001, pp. 441-449.

Godbole, M.J. and Pedraza, A.J., "Recrystallization and Mechanical Properties of Electroless Copper II," Scripta Metallurgica et Materialia, vol. 24, No. 7, Jul. 1990, pp. 1191-1196.

Goldberg, Robert K. and Stouffer, Donald C., "High Strain Rate Deformation Modeling of a Polymer Matrix Composite," NASA/TM—1998-206969 (Aug. 1998).

Goldberg, Robert K., "Strain Rate Dependent Deformation and Strength Modeling of a Polymer Matrix Composite Utilizing a Micromechanics Approach," NASA / TM—1999-209768 (Dec. 1999).

Gordaninejad, Faramarz and Wu, Weida, "A Two-Dimensional Shape Memory Alloy/Elastomer Actuator," International Journal of Solids and Structures, vol. 38, No. 19, May 2001, pp. 3393-3409.

Gray, J.E. et al., "Mechanism of Adhesion of Electroless-Deposited Silver on Poly(ether urethane)," Thin Solid Films, 484 (2005) 196-207.

Griehl, Stefan et al., "Thick Metallization-Layers on Polymers Through Vacuum-Technology," Surface and Coatings Technology, vols. 169-170, Jun. 2, 2003, pp. 24-26.

Griffin, Jr., A.J. et al., "Mechanical Testing of Thin Metallic Films," Thin Solid Films, vol. 220, Nos. 1-2, Nov. 20, 1992, pp. 265-270.

Gryaznov, V.M. et al., "Preparation and Catalysis Over Palladium Composite Membranes," Applied Catalysis A: General, 96 (1993) 15-23.

Hajdu, Juan, "Surface Preparation for Electroless Nickel Plating," Chapter 7, pp. 193-206 in *"Electroless Plating: Fundamentals and Applications,"* Mallory, G.O. & Hajdu, J.B., editors, American Electroplaters and Surface Finishers Society, 1990.

Halpin, J.C. and Thomas, R.L., "Ribbon Reinforcement of Composites," Journal of Composite Materials, vol. 2, No. 4, 488-497 (Oct. 1968).

Halpin, J.C. and Kardos, J.L., "The Halpin-Tsai Equations: A Review," Polymer Engineering and Science, vol. 16, No. 5, 344-352 (May 1976).

Halpin, J.C. and Kardos, J.L., "Strength of Discontinuous Reinforced Composites: I. Fiber Reinforced Composites," Polymer Engineering and Science, vol. 18, No. 6, 496-504 (Mid-May 1978).

Heinz, R. et al., "PECVD of Transition Metals for the Production of High-Density Circuits," Surface and Coatings Technology, vols. 116-119, Sep. 1999, pp. 886-890.

Henning, C.A.O. et al., "Mechanical Properties of Vacuum-Deposited Metal Films—I. Copper Films," Acta Metallurgica, vol. 23, Issue 2, Feb. 1975, pp. 177-185.

Henning, C.A.O. et al., "Mechanical Properties of Vacuum-Deposited Metal Films—Nickel Films," Acta Metallurgica, vol. 23, Issue 2, Feb. 1975, pp. 187-192.

Horn, H. et al., "Excimer Laser Pretreatment and Metallization of Polymers," Nuclear Instruments and Methods in Physics Research Section B, vol. 151, Issues 1-4, May 2, 1999, pp. 279-284.

Howson, R.P. et al., "High Rate Reactive Sputtering onto Flexible Polymer Sheet," Metallized Plastics 1, Plenum Press, 1989, pp. 45-54.

Huang, Chi-Yuan and Mo, Wen-Wei, "The Effect of Attached Fragments on Dense Layer of Electroless Ni/P Deposition on the Electromagnetic Interference Shielding Effectiveness of Carbon Fibre / Acrylonitrile—Butadiene—Styrene Composites," Surface and Coatings Technology, vol. 154, No. 1, May 1, 2002, pp. 55-62.

Huang, Xu and Liu, Yong, "Effect of Annealing on the Transformation Behavior and Superelasticity of NiTi Shape Memory Alloy," Scripta Materialia, vol. 45 2001, pp. 153-160.

Huang, X. et al., "Effect of $SiO_2$ Buffer Layer on Properties of Sputter-Deposited NiTi Shape Memory Alloy Thin Films," Surface and Coatings Technology, vol. 167, Nos. 2-3, Apr. 22, 2003, pp. 148-153.

Huang, Xu and Liu, Yong, "Substrate-Induced Stress and the Transformation Behavior of Sputter-Deposited NiTi Thin Films," Materials Science and Engineering A, vol. 352, Nos. 1-2, Jul. 15, 2003, pp. 314-317.

Hwang, W.C. and Waugh, R.E., "Energy of Dissociation of Lipid Bilayer from the Membrane Skeleton of Red Blood Cells," Biophysical Journal, vol. 72, Jun. 1997, pp. 2669-2678.

Isalgue, A. et al., "Shape Memory NiTi Thin Films Deposited at Low Temperature," Materials Science and Engineering A, vols. 273-275, Dec. 15, 1999, pp. 717-721.

Jamieson, E.H.H. and Windle, A.H., "Structure and Oxygen-Barrier Properties of Metallized Polymer Film," Journal of Materials Science, vol. 18, pp. 64-80 1983.

Ji, X.L. et al., "Tensile Modulus of Polymer Nanocomposites," Polymer Engineering and Science, vol. 42, No. 5, 983-993 (May 2002).

Jones, R.M., *Mechanics of Composite Materials*, Second ed. (Taylor and Francis, Inc., Philadelphia, 1999).

Kanzow, J. et al., "Formation of a Metal/Epoxy Resin Interface," Applied Surface Science, vol. 239, No. 2, Jan. 15, 2005, pp. 227-236.

Kardos, J.L. et al., "The Strength of Oriented Short Fiber Reinforced Plastics," in Rheology, vol. 3, edited by G. Astartia et al. (Plenum Press, New York, 1980), pp. 255-260.

Kardos, J.L. and Halpin, J.C., "Short Predicting the Strength and Toughness of Fiber Composites," Macromolecular Symposia 147, 139-153 (1999).

Kato, M. and Usuki, A., "Polymer-Clay Nanocomposites," in *Polymer-Clay Nanocomposites*, edited by T. J. Pinnavaia and G. W. Beall (John Wiley & Sons, Ltd, Chichester, 2000) pp. 97-109.

Keller, R.R. et al., "Tensile and Fracture Behavior of Free-Standing Copper Films," Materials Science and Engineering A, vol. 214, Nos. 1-2, Aug. 30, 1996, pp. 42-52.

Kersten, H.-J. and Wolf, G.K., "Metallization of High-Temperature Thermoplasts by Means of Ion-Beam-Assisted Deposition," Surface and Coatings Technology, vols. 116-119, Sep. 1999, pp. 1183-1188.

Khonakdar, H.A. et al., "An Investigation of Chemical Crosslinking Effect on Properties of High-Density Polyethylene," Polymer 44 (2003) 4301-4309.

Kim, J.-K. and Mai, Y.-W., "Interfaces in Composites," Chapter 6 of vol. 13, Structure and Properties of Composites, edited by T.-W. Chou in Materials and Science Technology, edited by R.W. Cahn et al. (VCH Publishers, Inc., Weinheim, 1993), pp. 239-289.

Kim, Yoon B. and Park, H.M., "Synthesis of Amorphous/Crystalline Composite Using Electroless Copper Plated Amorphous Powder," Materials Science and Engineering A 396 (2005) 166-171.

Kim, Yoon B. and Park, Hyun M., "Electroless Nickel-Phosphorus Plating on Ni-Zr-Ti-Si-Sn Amorphous Powder," Surface and Coatings Technology 195 (2005) 176-181.

Kishimoto, S. and Shinya, N., "Development of Metallic Closed Cellular Materials Containing Polymers," Materials and Design, vol. 21, No. 6, Dec. 1, 2000, pp. 575-578.

Kishimoto, S. and Shinya, N., "New Fabrication Method for Metallic Closed Cellular Materials Containing Polymers," Materials and Design, vol. 22, No. 7, Oct. 2001, pp. 535-539.

Kishimoto, Satoshi et al., "Development of Metallic Closed Cellular Materials Containing Organic Materials," Journal of Alloys and Compounds, vol. 355, Nos. 1-2, Jun. 30, 2003, pp. 161-165.

Kodentsov, A.A. et al., " Permeation of Nitrogen in Solid Nickel and Deformation Phenomena Accompanying Internal Nitridation," Acta Mater, vol. 47, No. 11, pp. 3169-3180, 1999.

Koh, S.K. et al., "Surface Modification by Ion Assisted Reaction," *Metallization of Polymers 2*, Plenum Publishers, 2002, pp. 165-190.

Konell, Jeremiah P. et al., "Synergistic Effects of Carbon Fillers on Tensile and Impact Properties in Nylon 6,6 and Polycarbonate Based Resins," Polymer Composites, Apr. 2004, vol. 25, No. 2, pp. 172-185.

Koura, N., "Electroless Plating of Silver,"Chapter 17, pp. 441-462 in *"Electroless Plating: Fundamentals and Applications,"* Mallory, G.O. & Hajdu, J.B., editors, American Electroplaters and Surface Finishers Society, 1990.

Kovačević, V. et al., "Morphology and Failure in Nanocomposites. Part I: Structural and Mechanical Properties," Journal of Adhesion Science and Technology 16, 1343-1365 (2002).

Kozodoy, R. et al., "Small Bore Hollow Waveguides for Delivery of 3-μm Laser Radiation," Applied Optics, vol. 35, No. 7, pp. 1077-1082, Mar. 1, 1996.

Kreutz, E.W. et al., "Processing of Polymer Surfaces by Laser Radiation," Nuclear Instruments and Methods in Physics Research Section B, vol. 105, Nos. 1-4, Nov. 2, 1995, pp. 245-249.

Kuczma, Jr., John, "Equipment Design for Electroless Nickel Plating," Chapter 5, pp. 139-167 in *"Electroless Plating: Fundamentals and Applications,"* Mallory, G.O. & Hajdu, J.B., editors, American Electroplaters and Surface Finishers Society, 1990.

Kunces, David, "Chemical Deposition of Metallic Films From Aqueous Solutions," Chapter 19, pp. 511-517 in *"Electroless Plating: Fundamentals and Applications,"* Mallory, G.O. & Hajdu, J.B., editors, American Electroplaters and Surface Finishers Society, 1990.

Kupfer, H. et al., "Ecologically Important Metallization Processes for High-Performance Polymers," Surface and Coatings Technology, vol. 112, Nos. 1-3, Feb. 1999, pp. 379-383.

Kupfer, H. and Wolf, G.K., "Plasma and Ion Beam Assisted Metallization of Polymers and Their Application," Nuclear Instruments and Methods in Physics Research Section B, vols. 166-167, May 2, 2000, pp. 722-731.

Kuzmik, John J., "Plating on Plastics," Chapter 14, pp. 377-399 in *"Electroless Plating: Fundamentals and Applications,"* Mallory, G.O. & Hajdu, J.B., editors, American Electroplaters and Surface Finishers Society, 1990.

Leidheiser, H. & Sloope, B.W., "Mechanical Properties of Copper Films," Journal of Applied Physics, vol. 41, No. 1, Jan. 1970, 402-406.

Lewis, T.B. and Nielsen, L.E., "Dynamic Mechanical Properties of Particulate-Filled Composites," Journal of Applied Polymer Science, vol. 14, 1449-1471 (1970).

Ling, G.P. and Li, Y., "Influencing Factors on the Uniformity of Copper Coated Nano-$Al_2O_3$ powders Prepared by Electroless Plating," Materials Letters 59 (2005) 1610-1613.

Liu, Yong, "Mechanical and Thermomechanical Properties of a $Ti_{50}Ni_{25}Cu_{25}$ Melt Spun Ribbon," Materials Science and Engineering A354 (2003) 286-291.

Liu, Y. et al., "A TiNiPd Thin Film Microvalve for High Temperature Applications," Materials Science and Engineering A, vol. 378, Nos. 1-2, Jul. 25, 2004, pp. 205-209.

Luan, B. et al., "Chemical Surface Preparation for Metallization of Stereolithography Polymers," Applied Surface Science, vol. 156, Nos. 1-4, Feb. 2, 2000, pp. 26-38.

Ma, Dejun et al., "Evaluation of the Mechanical Properties of Thin Metal Films," Surface and Coatings Technology, vols. 116-119, Sep. 1999, pp. 128-132.

Ma, Yi Hua et al., "Characterization of Intermetallic Diffusion Barrier and Alloy Formation for Pd/Cu and Pd/Ag Porous Stainless Steel Composite Membranes," Ind. Eng. Chem. Res. 2004, vol. 43, pp. 2936-2945.

Mallory, Glenn O., "The Fundamental Aspects of Electroless Nickel Plating," Chapter 1, pp. 1-56 in *"Electroless Plating: Fundamentals and Applications,"* Mallory, G.O. & Hajdu, J.B., editors, American Electroplaters and Surface Finishers Society, 1990.

Mallory, G.O., "The Electroless Nickel Plating Bath: Effect of Variables on the Process," Chapter 2, pp. 57-99 in *"Electroless Plating: Fundamentals and Applications,"* Mallory, G.O. & Hajdu, J.B., editors, American Electroplaters and Surface Finishers Society, 1990.

Massey, L.K., *Permeability Properties of Plastics and Elastomers*, A Guide to Packaging and Barrier Materials (2nd Edition), 2003 William Andrew Publishing.

Medley, Jr., G. H., et al., "Use of Hollow Glass Spheres for Underbalanced Drilling Fluids", SPE 30500, SPE Annual Technical Conference, Dallas, Texas, Oct. 22-25, 1995, pp. 511-520.

Mercea, P. et al., "Permeation of Gases Through Metallized Polymer Membranes," Journal of Membrane Science, vol. 24, No. 3, Aug. 1985, pp. 297-307.

Mercea, P.V. et al., "Separation of a Gas Mixture Through a Polymer Membrane Metallized with Palladium," Gas Separation & Purification, vol. 4, No. 3, Sep. 1990, pp. 137-140.

Mercea, P.-V. and Mecea, V., "Gas Separation Through a High-Flux Asymmetric Polymer Membrane Metallized With Palladium," Gas Separation & Purification, vol. 5, No. 4, Dec. 1991, pp. 267-272.

Mohamed, Nadia Ahmed, "Novel Wholly Aromatic Polyamide-Hydrazides—VII. Metallization of Polymers Through Transition Metal Complexation," European Polymer Journal, vol. 34, Nos. 3-4, Mar. 1998, pp. 387-398.

Monette, L. et al., "Effect of Modulus and Cohesive Energy on Critical Fibre Length in Fibre-Reinforced Composites," J. Mater Sci., vol. 27, No. 16, 4393-4405 (1992).

Monette, L. and Anderson, M.P., "Elastic and Fracture Properties of the Two-Dimensional Triangular and Square Lattices," Modeling Simul. Mater. Sci. Eng. 2, 53-66 (1994).

Monette, L. et al., "Effect of Volume Fraction and Morphology of Reinforcing Phases in Composites," Journal of Applied Physics, vol. 75, No. 2, 1155-1170, Jan. 15, 1994.

Murat, M. and Anholt, M., "Fracture Behavior of Short-Fiber Reinforced Materials," Journal of Materials Research, vol. 7, No. 11, 3120-3131, Nov. 1992.

Nicolas-Debarnot, Dominique et al., "Influence of the Polymer Pre-Treatment Before Its Electroless Metallization," Surface and Coatings Technology 200 (2006) 4257-4265.

Nielsen, L.E., "Generalized Equation for the Elastic Moduli of Composite Materials," Journal of Applied Physics, vol. 41, No. 11, 4626-4627, Oct. 1970.

Nix, William D., "Elastic and Plastic Properties of Thin Films on Substrates: Nanoindentation Techniques," Materials Science and Engineering A, vols. 234-236, Aug. 30 1997, pp. 37-44.

O'Neil et al., "Tensile Properties of Very-High-Strength Concrete for Penetration-Resistant Structures," Shock and Vibration 6 (1999) 237-245.

Ohno, I. and Haruyama, S., "Measurement of the Instantaneous Rate of Electroless Plating by an Electrochemical Method," Surface Technology, vol. 13, No. 1, May 1981, pp. 1-15.

Ohno, Izumi, "Electrochemistry of Electroless Plating," Materials Science and Engineering A, vol. 146, Nos. 1-2, Oct. 25, 1991, pp. 33-49.

Okinaka, Yutaka, "Electroless Plating of Gold and Gold Alloys," Chapter 15, pp. 401-420 in *"Electroless Plating: Fundamentals and Applications,"* Mallory, G.O. & Hajdu, J.B., editors, American Electroplaters and Surface Finishers Society, 1990.

Okinaka, Yutaka and Wolowodiuk, Catherine, "Electroless Plating of Platinum Group Metals," Chapter 16, pp. 421-440 in *"Electroless Plating: Fundamentals and Applications,"* Mallory, G.O. & Hajdu, J.B., editors, American Electroplaters and Surface Finishers Society, 1990.

Osman, M.A. et al., "Reinforcement of Poly(dimethylsiloxane) Networks by Mica Flakes," Polymer, vol. 42, No. 15, 6545-6556 (2001).

Paglieri, Stephen N. et al., "A New Preparation Technique for Pd/Alumina Membranes with Enhanced High-Temperature Stability," Ind. Eng. Chem. Res. 1999, 38, 1925-1936.

Parvizi-Majidi, A., "Fibers and Whiskers," Chapter 2 of vol. 13, Structure and Properties of Composites, edited by T.-W. Chou in *Materials and Science Technology*, edited by R.W. Cahn et al. (VCH Publishers, Inc., Weinheim, 1993) pp. 25-88.

Pascoe, K.J., "General Fracture Mechanics," Chapter 7 in *Failure of Plastics*, edited by W. Brostow and R.D. Corneiliussen (Hanser Publishers, Munich, 1986), pp. 119-143.

Pearlstein, Fred, "Electroless Deposition of Alloys," Chapter 10, pp. 261-268 in *"Electroless Plating: Fundamentals and Applications,"* Mallory, G.O. & Hajdu, J.B., editors, American Electroplaters and Surface Finishers Society, 1990.

Pedraza, A.J. and Godbole, M.J., "Recrystallization and Mechanical Properties of Electroless Copper. I," Scripta Metallurgica et Materialia, vol. 24, No. 7, Jul. 1990, pp. 1185-1189.

Perez-Prado, M.T. and Vlassak, J.J., "Microstructural Evolution in Electroplated Cu Thin Films," Scripta Materialia, vol. 47, No. 12, Dec. 9, 2002, pp. 817-823.

Plichta, A. et al., "Ultra Thin Flexible Glass Substrates," Mat. Res. Soc. Symp. Proc., vol. 769, pp. 273-282, 2003.

Poate, J.M. et al., *Thin Films-Interdiffusion and Reactions*, John Wiley & Sons, New York, 1978.

Press, W.H. et al., *Numerical Recipes*, Cambridge University Press, Cambridge, 1989.

Price, David T. et al., "Damascene Copper Interconnects with Polymer ILDs," Thin Solid Films, vols. 308-309 (1997), 523-528.

Read, D.T. and Dally, J.W., "A New Method for Measuring the Strength and Ductility of Thin Films," J. Materials Research, vol. 8, No. 7 (Jul. 1993), 1542-1549.

Read, D.T., "Tension-Tension Fatique of Copper Thin Films," International Journal of Fatigue, vol. 20, No. 3, 1998, pp. 203-209.

Read, D.T. et al., "Morphology, Microstructure, and Mechanical Properties of a Copper Electrodeposit," Microelectronic Engineering, vol. 75, No. 1 Jul. 2004, pp. 63-70.

Rebelo, Nuno et al., "Simulation of Implantable Nitinol Stents," 2001 Abaqus Users' Conference, pp. 421-434 (copy supplied by The British Library).

Romand,M. et al., "Plasma and VUV Pretreatments of Polymer Surfaces for Adhesion Enhancement of Electrolessly Deposited Ni or Cu Films," in *Metallization of Polymers 2*, edited by E. Sacher, Plenum Publishers, 2002, pp. 191-205.

Rück, D.M., "Ion Induced Modification of Polymers at Energies Between 100 keV and 1 GeV Applied for Optical Waveguides and Improved Metal Adhesion," Nuclear Instruments and Methods in Physics Research Section B, vols. 166-167, May 2, 2000, pp. 602-609.

Saba, Brent Matthew, Chapter 2: "Metallurgical Aspects" in Thesis entitled, "Evaluation of Mechanical Fitness for Service of High Temperature Hydrogen Attacked Steels," B.S. Louisiana State University, 1994; P.E., Mechanical Engineering, 2000; P.E., Metallurgical Engineering, 2003 (May 2003).

Safranek, W.H., (Section I) & Berkenkotter, P. And Stephens, D. (Section II), "Electroless Cobalt and Cobalt Alloys," Chapter 18, pp. 463-509 in *"Electroless Plating: Fundamentals and Applications,"* Mallory, G.O. & Hajdu, J.B., editors, American Electroplaters and Surface Finishers Society, 1990.

Sakhnenko, N.D. et al, "Simulation of Metal-Polymer Coating System for Service Life Prediction," Simulation Practice and Theory, vol. 6, No. 7, Nov. 15, 1998, pp. 647-656.

Sandrin, L. and Sacher, E., "X-ray Photoelectron Spectroscopy Studies of the Evaporated Aluminum/Corona-Treated Polyethylene Terephthalate Interface," Applied Surface Science, vol. 135, Nos. 1-4, Sep. 1998, pp. 339-349.

Schilling, C.H. et al., "Continuous Production of Refractory Microballoons," NASA Center for AeroSpace Information (CASI) NPO-16679; NASA Tech Briefs, vol. 12, No. 6, pp. 80-81, Jun. 1988.

Schröer, D. et al., "Pretreatment of Polymer Surfaces—The Crucial Step Prior to Metal Deposition," Electrochimica Acta, vol. 40, No. 10, Jul. 1995, pp. 1487-1494.

Seeböck, R. et al., "Surface Modification of Polyimide Using Dielectric Barrier Discharge Treatment," Surface and Coatings Technology, vols. 142-144, Jul. 2001, pp. 455-459.

Sekine, K. et al., "Application of Synthetic Fluid Inclusions to Simultaneous Temperature-Pressure Logging in High-Temperature (Sub- to Supercritical) Geothermal Systems," Geothermics 33 (6) 775-793 (2004).

Shapiro, B.E. and Qian, H., "A Quantitative Analysis of Single Protein-Ligand Complex Separation with the Atomic Force Microscope," Biophysical Chemistry, vol. 67, pp. 69-79, (1997) 211-219.

Shih, Chen-Luen, et al., "A Robust Co-Sputtering Fabrication Procedure for TiNi Shape Memory Alloys for MEMS," IEEE Journal of Microelectromechanical Systems, vol. 10, No. 1, Mar. 2001.

Shu, J. et al., "Effect of $Cu(OH)_2$ on Electroless Copper Plating," Ind. Eng. Chem. Res. 1997, 36, 1632-1636.

Shute, C.J. and Cohen, J.B., "Stress Relaxation in Al-Cu Thin Films," Materials Science and Engineering A, vol. 149, No. 2, Jan. 30, 1992, pp. 167-172.

Stapleton, Phillip, "Quality Control of Electroless Nickel Deposits," Chapter 6, pp. 169-191 in *"Electroless Plating: Fundamentals and Applications,"* Mallory, G.O. & Hajdu, J.B., editors, American Electroplaters and Surface Finishers Society, 1990.

Stone, Frank E., "Electroless Copper in Printed Wiring Board Fabrication," Chapter 13, pp. 331-375 in *"Electroless Plating: Fundamentals and Applications,"* Mallory, G.O. & Hajdu, J.B., editors, American Electroplaters and Surface Finishers Society, 1990.

Suda, H. and Yamada, S., "Force Measurements for the Movement of a Water Drop on a Surface with a Surface Tension Gradient," Langmuir, vol. 19, No. 3 Feb. 4, 2003, 529-531.

Sun, B.K. et al., "Graded Metallization of Non-Conducting Substrates by Glow Discharge Plasma Polymerization," in *Metallized Plastics 1*, edited by K.L. Mittal and J.R. Susko, Plenium Press, New York, 1989, pp. 9-27.

Sutcliffe, R. et al., "Characterization and Aluminum Metallization of a Parylene AF-4 Surface," Applied Surface Science, vol. 126, Nos. 1-2, Apr. 1998, pp. 43-56.

Thomas, A.G. and Whittle, J.M., "Tensile Rupture of Rubber," Rubber Chemistry and Technology, vol. 43, No. 2, pp. 222-228, Mar. 1970.

Touchais-Papet, E. et al., "Electroless Metallization of Carbon Substrates," Applied Surface Science, vols. 138-139, Jan. 1999, pp. 557-562.

Tsai, Yi-Ying et al., "Thermal Stability and Mechanical Properties of Ni-W-P Electroless Deposits," Surface and Coatings Technology, vols. 146-147, Sep.-Oct. 2001, pp. 502-507.

Venkatraman, R. and Bravman, J.C., "Separation of Film Thickness and Grain Boundary Strengthening Effects in Al Thin Films on Si," J. Materials Research, vol. 7, No. 8, Aug. 1992, 2040-2048.

Verdier, S. and Anderson, S.I., "Internal Pressure and Solubility Parameter as a Function of Pressure," Fluid Phase Equilibria 231(2), 125-137 (2005).

Vokoun, D. et al., "Study of the Effect of Curing Treatment in Fabrication of SMA/Polymer Composites on Deformational Behavior of NiTi-5at.%Cu SMA Wires," Scripta Materialia, vol. 48, No. 5, Mar. 3, 2003, pp. 623-627.

Volinsky, A.A. et al., "Microstructure and Mechanical Properties of Electroplated Cu Thin Films," Materials Research Society Symp. 649, 2001.

Wagner, Sigurd et al., "Electronic Skin. Architecture and Components," Physica E, vol. 25, Nos. 2-3, Nov. 2004, pp. 326-334.

Weber, Erik H. et al.,"Thermally Conductive Nylon 6,6 and Polycarbonate Based Resins. I. Synergistic Effects of Carbon Fillers," Journal of Applied Polymer Science, vol. 88, 112-122 (2003).

Weichenhain, R. et al., "KrF-Excimer Laser Pretreatment and Metallization of Polymers," Applied Surface Science, vols. 109-110, Feb. 1, 1997, pp. 264-269.

Weil, Rolf and Parker, Konrad, "The Properties of Electroless Nickel," Chapter 4, pp. 111-137 in *Electroless Plating: Fundamentals and Applications*," Mallory, G.O. & Hajdu, J.B., editors, American Electroplaters and Surface Finishers Society, 1990.

Wohlbier, F.H. & Fisher, D.J., editors, Diffusion and Defect Data, vol. 31 Trans Tech Publications (1983).

Wolf, G.K. and Kersten, H.J., "Ion Beam Modification of Injection Moulded Polymere Materials," Nuclear Instruments and Methods in Physics Research Section B, vol. 141, Issues 1-4, May 1998, pp. 174-180.

Yan, XiaoJun and Nie, JingXu, "Study of a New Application Form of Shape Memory Alloy Superelasticity," Technical Note, Smart Materials and Structures, vol. 12 2003, pp. N14-N23.

Yang, D.-Q. and Sacher, E., "The Study of Copper Cluster on Dow Cyclotene, and Their Stability," in *Metallization of Polymers 2*, edited by E. Sacher, Plenium Publishers, New York, 2002, pp. 97-105.

Zaporojtchenko, V. et al., "Adsorption of Nobel Metal Atoms on Polymers," in *Metallization of Polymers 2*, edited by E. Sacher, 2002, Plenum Publishers, New York, 2002, pp. 107-116.

Zhu, F., et al., "Optimized Indium Tin Oxide Contact for Organic Light Emitting Diode Applications," Thin Solid Films, 363, pp. 314-317 (2000).

\* cited by examiner

COMPRESSIBLE OBJECTS COMBINED WITH A DRILLING FLUID TO FORM A VARIABLE DENSITY DRILLING MUD

CROSS REFERENCE TO RELATED APPLICATIONS

This application is a continuation application under 35 U.S.C. §120 of International Application Number PCT/US07/10821, entitled "COMPRESSIBLE OBJECTS COMBINED WITH A DRILLING FLUID TO FORM A VARIABLE DENSITY DRILLING MUD," filed on 4 May 2007, which claims the benefit under 35 U.S.C. §119(e) to U.S. Provisional Application 60/811,619, entitled "COMPRESSIBLE OBJECTS COMBINED WITH A DRILLING FLUID TO FORM A VARIABLE DENSITY DRILLING MUD," filed on 7 Jun. 2006. Additionally, this application is a continuation-in-part application of pending U.S. patent application Ser. No. 11/441,698, entitled "VARIABLE DENSITY DRILLING MUD," filed on 25 May 2006, which is a continuation application under 35 U.S.C. §120 of International Application Number PCT/US/05/20320, entitled "VARIABLE DENSITY DRILLING MUD," filed on 9 Jun. 2005, which claims the benefit under 35 U.S.C. §119(e) to U.S. Provisional Application Ser. No. 60/580,523, entitled "VARIABLE DENSITY DRILLING MUD," filed on 17 Jun. 2004. Each of these applications is hereby incorporated by reference in its entirety for all purposes.

FIELD OF THE INVENTION

This invention relates generally to a method to enhance drilling and production operations from subsurface formations. More particularly, this invention relates to a method for selecting, fabricating and using compressible objects with a drilling fluid to form a variable density drilling mud that minimizes or eliminates the number of different sized casing strings utilized within a wellbore.

BACKGROUND

This section is intended to introduce the reader to various aspects of art, which may be associated with exemplary embodiments of the present invention, which are described and/or claimed below. This discussion is believed to be helpful in providing the reader with information to facilitate a better understanding of particular techniques of the present invention. Accordingly, it should be understood that these statements are to be read in this light, and not necessarily as admissions of prior art.

The production of hydrocarbons, such as oil and gas, has been performed for numerous years. To produce these hydrocarbons, a wellbore is typically drilled in intervals with different casing strings installed to reach a subsurface formation. The casing strings are installed in the wellbore to prevent collapse of the wellbore walls, to prevent undesired outflow of drilling fluid into the formation, and/or to prevent the inflow of fluid from the formation into the wellbore. Typically, the process of installing casing strings involves tripping, running casing, and cementing the casing strings. Because the casing strings in the different intervals pass through already installed casing strings, the lower intervals of the casing strings typically have smaller diameters. In this manner, the casing strings are formed in a nested configuration that continue to decrease in diameter in each of the subsequent intervals.

In addition to the casing strings, a drilling mud is circulated within the wellbore to remove cuttings from the well. The weight or density of the drilling mud is typically maintained between the pore pressure gradient (PPG) and the fracture pressure gradient (FG) for drilling operations. However, the PPG and FG increase along with the true vertical depth (TVD) of the well, which present problems for maintaining the drilling mud weight. If the weight of the drilling mud is below the PPG, the well may take a kick. A kick is an influx of formation fluid into the wellbore, which has to be controlled for drilling operations to resume. Also, if the weight of the drilling mud is above the FG, the drilling mud may leak off into the formation. These lost returns result in large volumes of drilling mud loss, which has to be replaced for the drilling operations to resume. Accordingly, the casing strings are utilized to assist in maintaining the weight of the drilling mud within the PPG and FG to continue drilling operations to greater depths.

With subsurface formations being located at greater depths, the cost and time associated with the forming the wellbore increases. For instance, with the nested configuration, the initial casing strings have to be sufficiently large to provide a wellbore diameter of a specific size for the tools and other devices near the subsurface formations. As a result the diameter of the initial casing strings is relatively large to provide a final useable wellbore diameter. The large diameter increases the costs of the drilling operations because of the cost associated with the increased size of the casing string, increased volume of cuttings that have to be managed, and increased volume of cement and drilling mud utilized to form the wellbore. As such, the cost of typically drilling operations results in some subsurface formations being economically unfeasible.

To reduce the diameter of casing strings, various processes are utilized. For example, drilling operations may utilize variable density drilling mud to maintain the drilling mud within the PPG and FG. As noted in Intl. Patent Application Publication No. WO 2006/007347 to Polizzotti et al., compressible objects may include compressible or collapsible hollow objects of various shapes or structures. These compressible objects, which are selected to achieve a favorable compression in response to pressure and/or temperature changes. These compressible objects may be recirculated as part of the variable density drilling mud to provide volume changes that reduce the number of intermediate casing string intervals in the wellbore.

However, the use of compressible objects in the variable density drilling mud can be challenging. For instance, the compressible objects have to be fabricated to provide a certain amount of compression and to be resilient. Further, the compressible objects have to be designed to compress at certain pressures to provide the volume changes in specific intervals within the wellbore. In addition, the drilling fluid, which is combined with the compressible objects, may be selected and include certain additives to interact with the compressible objects to enhance the variable density drilling mud. As such, there is a need for a method for selecting and fabricating compressible objects for use with drilling fluids to form the variable density drilling mud.

Other related material may be found in at least U.S. Pat. No. 3,174,561; U.S. Pat. No. 3,231,030; U.S. Pat. No. 4,099,583; U.S. Pat. No. 5,881,826; U.S. Pat. No. 5,910,467; U.S. Pat. No. 6,156,708; U.S. Pat. No. 6,422,326; U.S. Pat. No. 6,497,289; U.S. Pat. No. 6,530,437; U.S. Pat. No. 6,588,501; U.S. Pat. No. 7,108,066; U.S. Patent Application Publication No. 2005/0113262; U.S. Patent Application Publication No. 2005/0284641; and Intl. Patent Application Publication No. WO 2006/007347.

SUMMARY

In one embodiment, a compressible object is described. The compressible object includes a shell that encloses an interior region. The shell experiences less strain when the external pressure is about equal to the internal pressure than when the external pressure is above or below a predetermined compression interval of the compressible object. Further, the shell experiences less strain when the external pressure is above or below the internal pressure than when the external pressure is about equal to the internal pressure.

In a first alternative embodiment, a drilling mud is described. The drilling mud includes compressible objects, each of at least a portion of the compressible objects has a shell that encloses an interior region, wherein the shell experiences less strain when the external pressure is about equal to the internal pressure than when the external pressure is above or below a predetermined compression interval of the compressible object. The drilling mud further includes a drilling fluid, wherein the density of the drilling mud changes due to the volume change of compressible objects in response to pressure changes as the drilling fluid and compressible objects circulate toward the surface of a wellbore.

In a second alternative embodiment, a method associated with drilling a well is described. The method includes selecting compressible objects having a shell that encloses an interior region, wherein the shell is configured to experience less strain when the external pressure is about equal to the internal pressure than when the external pressure is above or below a predetermined compression interval of the compressible object; selecting a drilling fluid; introducing the compressible objects to the drilling fluid to form a variable density drilling mud, wherein the variable density drilling mud provides a density between a pore pressure gradient and a fracture pressure gradient for at least one interval as the variable density drilling mud circulates toward the surface of a well; and drilling a wellbore with the variable density drilling mud at the location of the well. Further, once the wellbore is formed, hydrocarbons may be produced from the wellbore.

In a third alternative embodiment, a method for forming a variable density drilling mud is described. The method includes selecting compressible objects having a shell that encloses an interior region, wherein the shell experiences less strain when the external pressure is about equal to the internal pressure than when the external pressure is above or below a predetermined compression interval of the compressible object; selecting a drilling fluid to be combined with the compressible objects; blending the compressible objects with the drilling fluid to form a variable density drilling mud, wherein the variable density drilling mud maintains a density between a pore pressure gradient and a fracture pressure gradient for an interval of a well as the variable density drilling mud circulates toward the surface of a well.

In a fourth alternative embodiment, a system associated with drilling a wellbore is described. The system includes a wellbore and a variable density drilling mud disposed in the wellbore. The variable density drilling mud comprises compressible objects and each of at least a portion of the compressible objects has a shell that encloses an interior region, wherein the shell experiences less strain when the external pressure is about equal to the internal pressure than when the external pressure is above or below a predetermined compression interval of the compressible object. Further, the system includes a drilling string disposed within the wellbore; and a bottom hole assembly coupled to the drilling string and disposed within the wellbore.

BRIEF DESCRIPTION OF THE DRAWINGS

The foregoing and other advantages of the present technique may become apparent upon reading the following detailed description and upon reference to the drawings in which.

DETAILED DESCRIPTION

In the following detailed description and example, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

The present technique is directed to a method, composition and system for selecting, fabricating, and utilizing compressible objects in a variable density drilling mud. In particular, the compressible objects may be utilized with a drilling fluid to form the variable density drilling mud for drilling operations in a well. The compressible objects and the drilling fluid are selected to maintain the drilling mud weight between the pore pressure gradient (PPG) and the fracture pressure gradient (FG) within a wellbore. Specifically, under the present techniques, the compressible objects have a shell configured to experience less strain when the external pressure is about equal to the internal pressure than when the external pressure is greater than the internal pressure or less than the internal pressure. The compressible objects may include compressible or collapsible hollow objects of various shapes, such as spheres, cubes, pyramids, oblate or prolate spheroids, cylinders, pillows and/or other shapes or structures, which are selected to achieve a favorable compression in response to pressure and/or temperature changes. Also, as discussed below, the compressible objects may include polymers, polymer composites, metals, metal alloys, and/or polymer or polymer composite laminates with metals or metal alloys, which are fabricated in a variety of methods. Accordingly, various methods and systems are described to select and fabricate the compressible objects. Further, it should be noted that the following methods and procedures are not limited to drilling operations, but may also be utilized in completion operations, or any operations benefiting from variable density fluids.

Figure 1:
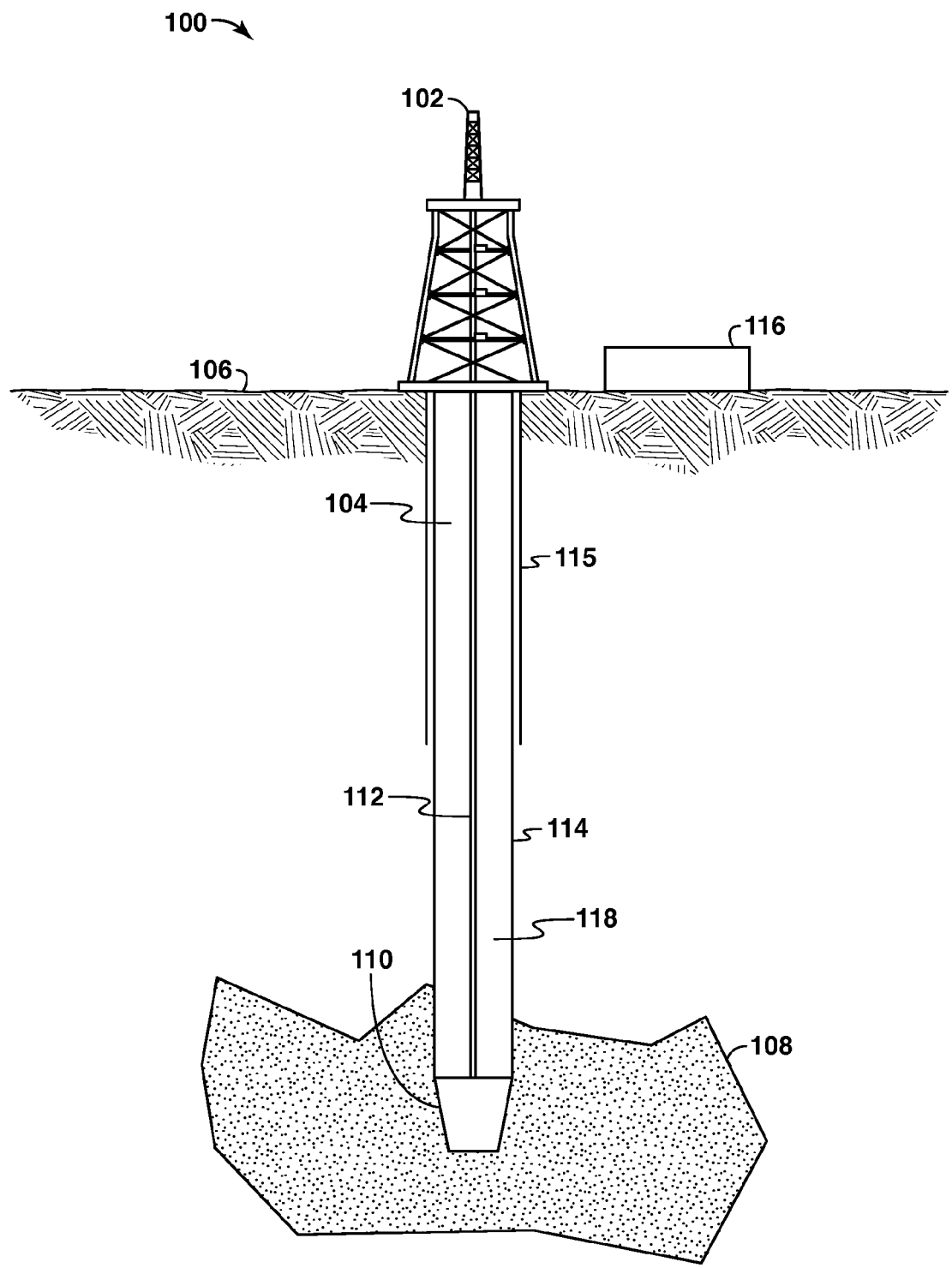
FIG. 1 is an illustration of an exemplary drilling system in accordance with certain aspects of the present techniques.

Turning now to the drawings, and referring initially to FIG. 1, an exemplary drilling system 100 in accordance with certain aspects of the present techniques is illustrated. In the exemplary drilling system 100, a drilling rig 102 is utilized to drill a well 104. The well 104 may penetrate the surface 106 of the Earth to reach the subsurface formation 108. As may be appreciated, the subsurface formation 108 may include various layers of rock that may or may not include hydrocarbons, such as oil and gas, and may be referred to as zones or intervals. As such, the well 104 may provide fluid flow paths between the subsurface formation 108 and production facilities (not shown) located at the surface 106. The production facilities may process the hydrocarbons and transport the hydrocarbons to consumers. However, it should be noted that the drilling system 100 is illustrated for exemplary purposes and the present techniques may be useful in circulating fluids in a wellbore for any purpose, such as performing drilling operations or producing fluids from a subsurface location.

To access the subsurface formation 108, the drilling rig 102 may include drilling components, such as a bottom hole assembly (BHA) 110, drilling strings 112, casing strings 114 and 115, drilling fluid processing unit 116 for processing the variable density drilling mud 118 and other systems to manage wellbore drilling and production operations. Each of these drilling components is utilized to form the wellbore of the well 104. The BHA 110 may include a drill bit and be used to excavate formation, cement or other materials from the wellbore. The casing strings 114 and 115 may provide support and stability for the access to the subsurface formation 108, which may include a surface casing string 115 and an intermediate or production casing string 114. The production casing string 114 may extend down to a depth near or through the subsurface formation 108. The drilling fluid processing unit 116 may include equipment that may be utilized to manage the variable density drilling fluid. For example, the drilling fluid processing unit 116 may include shakers, separators, hydrocyclones and other suitable devices (e.g., as described in International Patent Application No. PCT/US2007/003691, filed 13 Feb. 2007).

During drilling operations, the use of a variable density drilling mud 118 as a drilling mud allows the operator to drill deeper below the surface 106, maintain sufficient hydrostatic pressure, prevent an influx of formation fluid (gas or liquid), and remain below an FG that the subsurface formation 108 can support. As noted in Patent Application Publication No. WO 2006/007347 to Polizzotti et al., which is incorporated by reference, compressible objects may preferably have a compression ratio that is tailored to create a mud weight that lies between the pore pressure gradient (PPG) and the fracture gradient (FG) over the depth interval specific to the drilling application. That is, the compressible objects should have substantially recoverable load bearing walls and low permeability for the gas within the compressible objects. Substantially recoverable is defined to mean that the accumulation of plastic strain in the shell wall as a consequence of repeated cycling of the compressible objects between the surface and the bottom of the wellbore does not cause substantial failure of the load bearing wall or significant loss of the internal gas pressure during repeated cycles (i.e. two or more cycles) as the well is drilled to the target depth. Also, low permeability is defined to mean that the internal pressure of the compressible objects, while in use, remains within acceptable limits for a predetermined time period required to drill the wellbore to the target depth.

While adding compressible objects to drilling mud to control the density of the drilling mud based on depth has been described in Patent Application Publication No. WO 2006/007347 to Polizzotti et al., the design of compressible objects and selection of a drilling fluid to provide this functionality is difficult. In particular, the repeated compression cycles typically experienced by a recirculating variable density drilling mud within the constraints imposed by the mechanical properties of existing materials may be a limitation for the compressible objects. As such, the process of fabricating the compressible objects may have to include various factors that influence the durability and performance of the compressible objects, as discussed further below.

To begin, it should be noted that large compression ratios are required to achieve the desired change in the drilling fluid density with depth within the limits set by the maximum volume fraction of the compressible objects allowed by the effect of the compressible objects on the fluid rheology, as described in Patent Application No. WO 2006/007347. Accordingly, the compressible objects should have certain properties configured to provide large compression ratios and to begin compression within certain pressure ranges or levels. The compression ratio of a hollow object, which is one embodiment of the compressible objects, may be limited by the ratio of the initial uncompressed volume (i.e. uncompressed or expanded state) divided by the volume occupied by the material comprising the shell wall plus the volume of the compressed gas inside the shell for the delta pressure $\Delta P$ of the wellbore interval of interest. Large compression ratios are provided by the wall of the compressible objects being thin and flexible. Accordingly, the compressible objects may preferably be designed such that the compression and re-expansion of the compressible objects may be accomplished without significant permanent deformation of the walls (i.e., permanent deformation leading to early fatigue failure of the walls of the compressible object).

In addition, the predetermined external pressure or depth of compression and the predetermined compression interval of the compressible objects may be tailored to provide a change in the density of the drilling mud at or near specific depths within the wellbore. Typically, object compression that begins at the surface has limited value. In these applications, the compressible objects compress from the surface for a predetermined compression interval or range, which extends down to a specific depth. As a result, these compressible objects may be utilized for some specific land drilling applications, but may not be useful in deepwater environments or deeper drilling intervals. To provide a change in the density over a specific predetermined pressure interval for specific depths or external pressure, the starting depth and depth interval for the predetermined pressure interval over which the compression occurs may preferably be adjusted by the compressible objects. For example, the initial internal pressure of the compressible object may be selected based on the depth at which a transition in the compressibility is desired. At depths in the mud column (i.e. drilling fluid within the wellbore) for which the pressure is below the initial internal pressure of the compressible objects, the Young's Modulus of the wall material and the differential pressure across the wall material control the volume change of the compressible objects. At depths for which the pressure in the mud column is above the initial internal pressure, the volume change of the compressible objects gradually becomes dominated by the compressibility of the gas. That is, the predetermined compression interval is a pressure range from an external pressure that is about equal to the internal pressure of the compressible object to an external pressure that substantially compresses the compressible object (i.e. compresses the compressible object into a compressed state, which is discussed further below). As such, compressible objects may be fabricated to begin compression at or near a specific pressure or depth and/or for a specific predetermined pressure interval to provide a density change in specific portions or intervals of the wellbore.

To compress at a specific depth, the walls of the compressible objects may be designed to maintain a predetermined internal pressure. The initial internal pressure of the compressible objects for a given drilling mud density is determined by the depth at which a transition to gas compression is dominated by volume change of the compressible objects. Typically, an internal pressure greater than about 200 psi (pounds per square inch) at atmospheric pressure, greater than 500 psi at atmospheric pressure, greater than 1500 psi at atmospheric pressure or more preferably greater than 2000 psi at atmospheric pressure, may be utilized. For a given initial internal pressure, the achievable object compression ratio is dependent on the ratio of the wall thickness to the effective diameter of the compressible object. While the wall thickness is preferably as thin as possible, the lower limit of the wall thickness is defined by the minimum thickness capable of containing the desired internal gas pressure at an external pressure of about 1 atmosphere, which is typically encountered at the surface 106. Accordingly, a material with a tensile strength greater than 10,000 psi may typically be utilized, as discussed below, to maintain the internal pressure for the compressible object. As such, the internal pressure may be in a range from 200 psi up to the tensile strength of the shell material at atmospheric pressure, in a range from 2000 psi to the tensile strength of the shell material at atmospheric pressure, and/or in a range from 1500 psi to 3500 psi at atmospheric pressure.

Further, for a given internal pressure and diameter of a compressible object, the minimum wall thickness that may be used is therefore defined by the elastic limit of the tensile strength of the wall material. Within these strength limitations, it is desirable to minimize the wall thickness because the ratio of the volume of the wall material to the total volume of the compressible object sets an upper limit on the magnitude of the achievable compression ratio, as noted above. Accordingly, while the compressible object may include a variety of shapes, such as cubes, pyramids, oblate or prolate spheroids, cylinders, pillows, for example, spherical and elliptical objects with spherical or near spherical inflated geometries are useful for reasons related to the optimization of the compressible mud rheology. Accordingly, the compressible objects may include elliptical and/or spherical objects, such as pressurized hollow metallic spherical and elliptical objects, with an aspect ratio (i.e., the ratio of the major diameter to the minor diameter) of between about 1 and 5 to provide compression ratios of up to 5:1 or greater.

The design of the compressible object may be further complicated by structural instabilities. For instance, a spherical object for a given internal pressure and diameter may be restricted by structural instabilities characteristic of the spherical object's architecture. The structural instabilities may include local strains, such as equatorial buckling instability during the inflation phase and the cap buckling instability during the compression phase. As such, the design of the compressible object may also be adjusted to compensate for, or reduce, the localized strains and instabilities during expansion and compression of the compressible objects. Accordingly, the Finite Element Analysis (FEA) modeling of a spherical object, which may be one embodiment of a compressible object, is discussed further below, as shown in FIGS. 2A-2D.

Figure 2A:
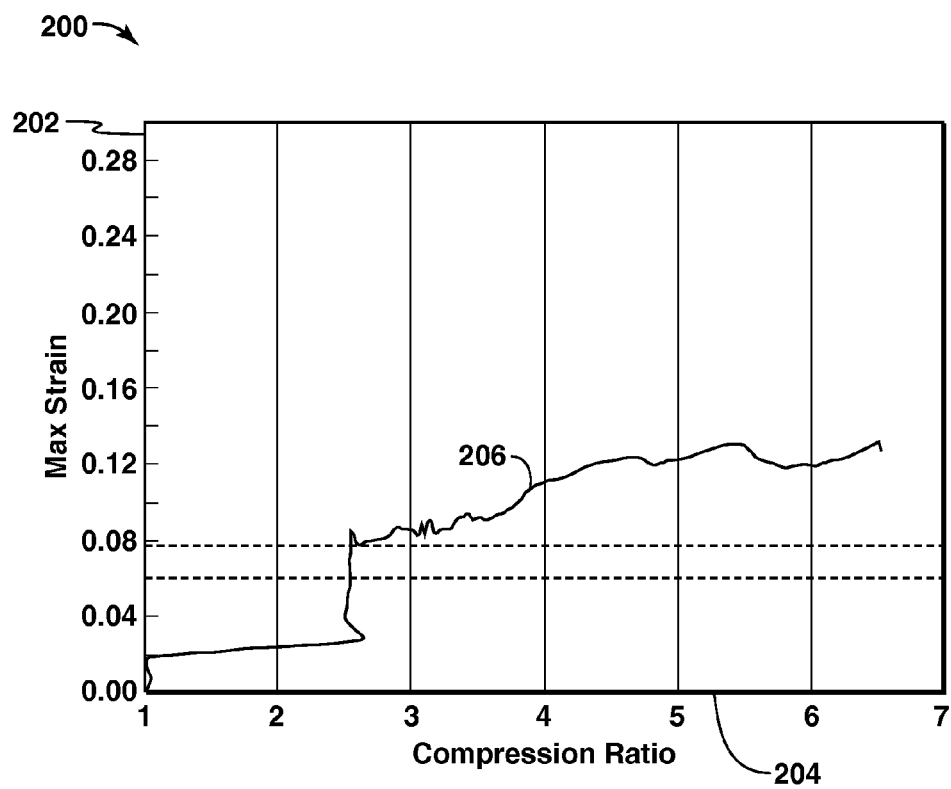
FIGS. 2A-2D are an exemplary chart and embodiments of a compressible object in accordance with aspects of the present techniques.

FIG. 2A is an exemplary chart and embodiments of a compressible object. In the chart 200, a compressible object is a nearly spherical object, which has an aspect ratio of about 1.0 and wall thickness of 10 microns. The aspect ratio of an object is defined as the ratio of the major axis over the minor axis, which is discussed further below.

In FIG. 2A, the chart 200 of maximum strain 202 versus compression ratio 204 of the elastic spherical object is shown. The maximum strain 202 is the largest strain at any point on the compressible object in that state. The chart 200, which is generated from a FEA modeling tool, such as ABAQUS™ FEA, includes a response curve 206 of the spherical object in different states. As indicated by the response curve 206, a linear elastic deformation in excess of about 12% is required to provide a compression ratio of at least 5:1. Along the response curve 206, the maximum elastic deformation does not occur uniformly over the object surface during compression, but is localized due to buckling instabilities during compression.

Figure 2B:
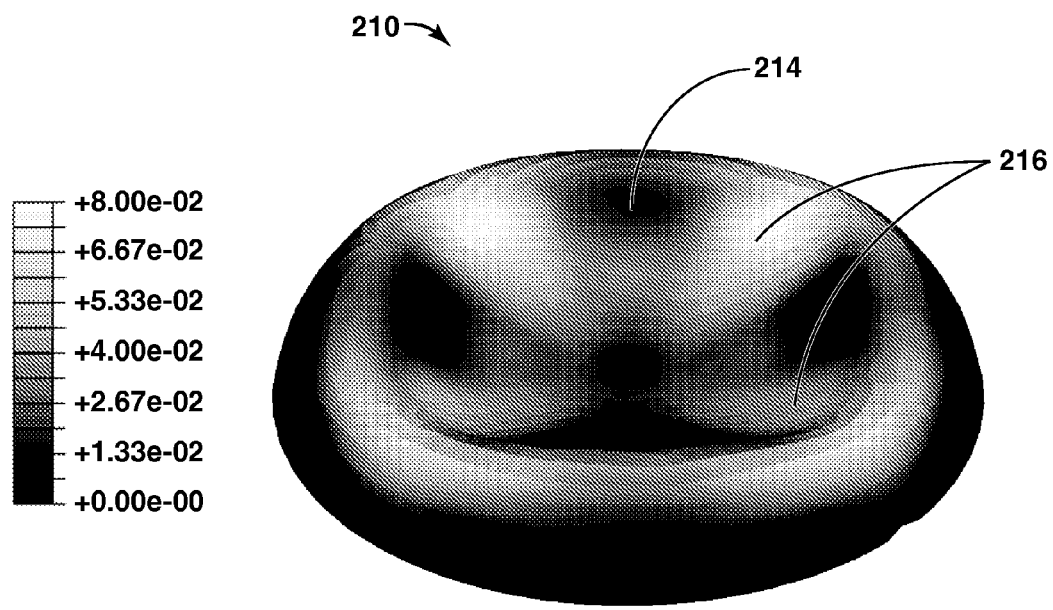

Specific examples of the localized strain on the object are shown in FIG. 2B. In FIG. 2B, a partial view of an object 210, such as a spherical or elliptical object, subjected to compression pressure that is external to the object is shown. The elastic deformation of the object 210 as it is compressing is dominated by strain localization associated with a cap buckling instability, which is indicated by the depressed region 214. The cap buckling instability is a collapse of the depressed region 214 due to the inability of the structure to resist the external pressure loaded on that region. In particular, the regions 216 are the locations or areas of the largest localized strain, which are plotted in the response curve 206 of FIG. 2A. The severity of this instability has been shown to increase with increasing wall thickness Based on the discussion above, the compressible object should have a tensile strength sufficient to handle the internal pressure and a recoverable linear elongation or elastic strain large enough to handle the required deformation. If the spherical or near spherical compressible object shell is assumed to be metallic, then the metal or metal alloy should have sufficient tensile strength within its elastic limit to contain the internal pressure and at least 12% recoverable linear elongation. While the tensile strength may be easily achieved, few metals or metal alloys have an elastic strain limit in excess of 1%. If the recoverable linear elongation of greater than 1% is desired, typical materials may not be sufficient. The exceptions to this limitation are some amorphous metal alloys with a limit of elastic strain approaching about 2% and the shape memory alloys (e.g., the Nitol family of NiTi alloys), which exhibit pseudo-elastic strains of up to 8% with less than about 0.1% permanent deformation. Accordingly, typical metal or metal alloys cannot provide the at least 12% recoverable linear elongation if a spherical structure is utilized as the initial shape.

Figure 2C:
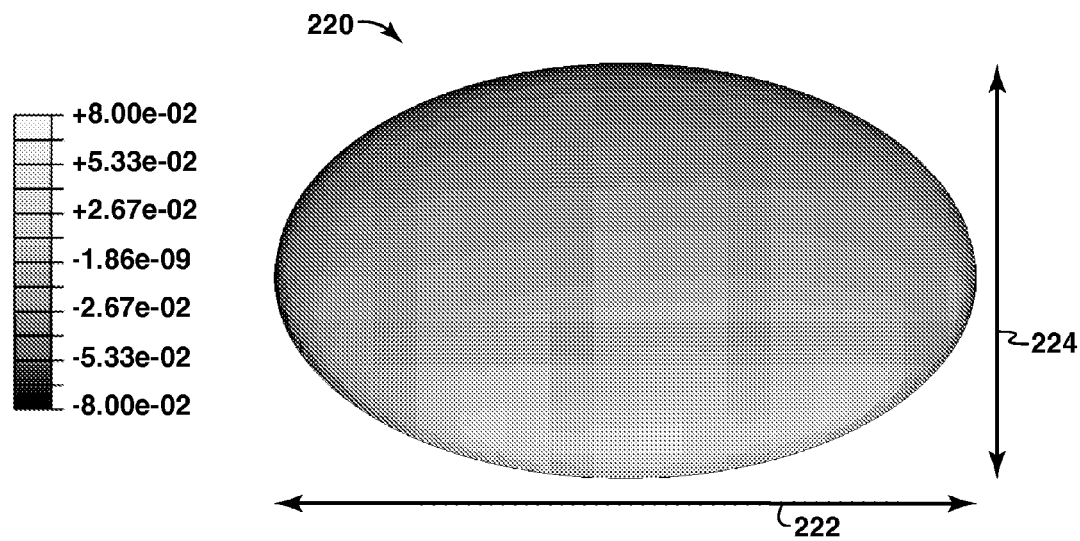

To provide the required recoverable linear elongation, the compressible object may be designed to divide the deformation of the compressible object into different states. For instance, the compressible objects may have three different states, such as an initial state, an expanded state, and a compressed state. In one embodiment the initial state may be, for example, an oblate spheroid with an aspect ratio less than 1.0. FIG. 2C shows an oblate spherical object 220 having a major axis 222 and a minor axis 224. As noted above, the aspect ratio of the object 220 in the initial state is defined as the ratio of the major axis 222 over the minor axis 224. With these states, the required deformation of the compressible object is divided into two phases. The overall required deformation may be divided between an expanded state and a compressed state. The inflation or first phase involves the expansion of the compressible object from the initial state to the expanded state, which may be limited by the tensile strength of the wall material and/or structural instabilities of the fully expanded compressible object characteristic of the initial state of the compressible object architecture and the initial internal pressure.

Figure 2D:
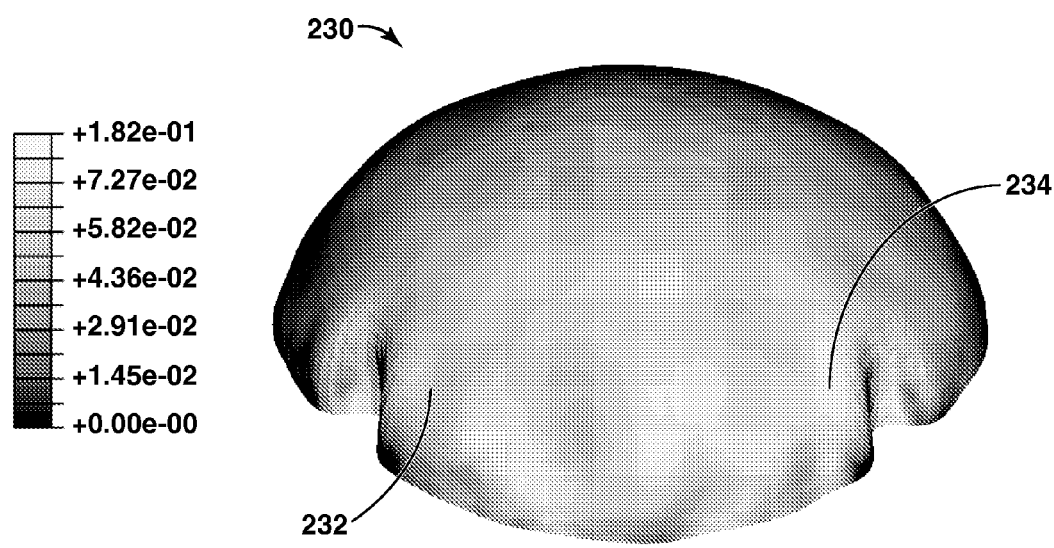

In particular, in FIG. 2D, an oblate spherical object 230 with an initial 4:1 aspect ratio, a 10 micron wall thickness and an inflated internal pressure of 10.9 MPa (mega-pascals) is subjected to internal pressure that expands the oblate spherical object 230. The maximum in the elastic deformation of the object 230 as it is expanding is dominated by strain localization associated with equatorial wall buckling, which is indicated by the depressed regions 232 and 234. The equatorial wall buckling instability is a collapse of the regions 232 and 234 due to the contraction of the equatorial belt associated with the inflation of the oblate spherical object 230. In general it has been shown that the susceptibility of the compressible object to equatorial buckling increases as the initial aspect ratio of the compressible object increases, the internal pressure increases and the wall thickness decreases. In this example, the expanded state may be an equilibrium state with the outside pressure of one atmosphere and where the compressible object has a spherical or near spherical shape (i.e. aspect ratio of about 1.0).

The second phase may involve the compression of the object from the expanded state back to about the initial state during which the deformation due to the initial expansion is nearly fully recovered and a subsequent further compression to the fully compressed state, which may again be limited by the elastic strain of the wall material of the fully compressed object. The compressed state may be, for example, an equilibrium compressed shape based on the hydrostatic compression exerted on the compressible object at a certain downhole depth. Accordingly, the compressible objects may be designed using these states to provide a suitable compression ratio that is beneficial for use within a wellbore.

Figure 3A:
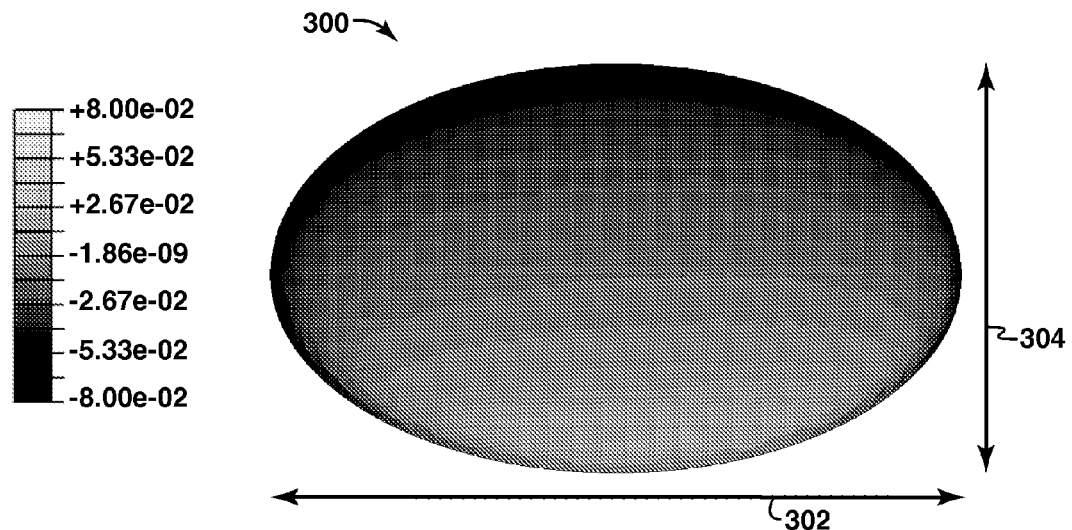
FIGS. 3A-3C are exemplary embodiments of a compressible object in different states in accordance with aspects of the present techniques.
Figure 3B:
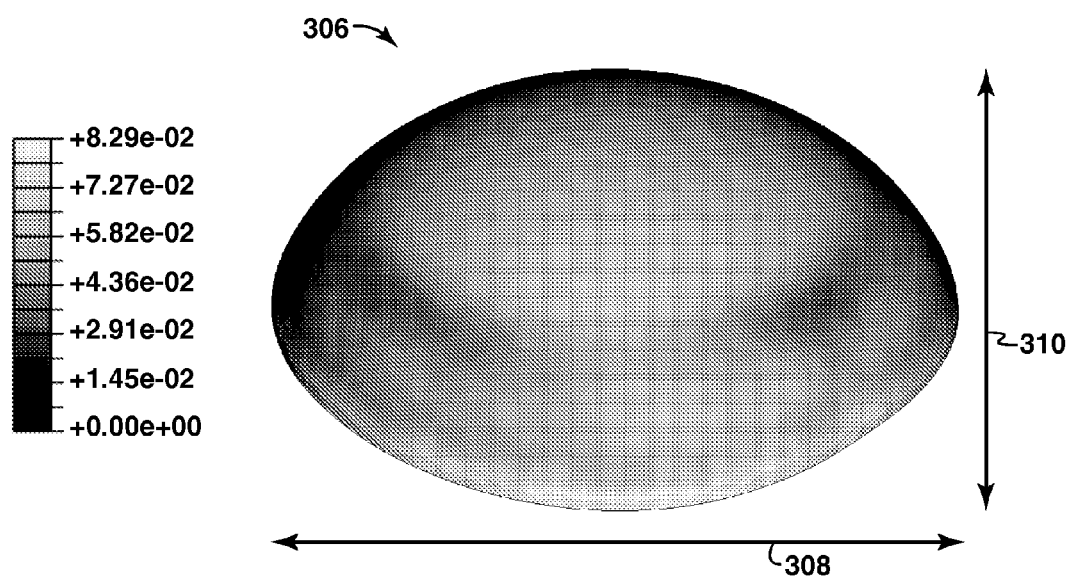
Figure 3C:
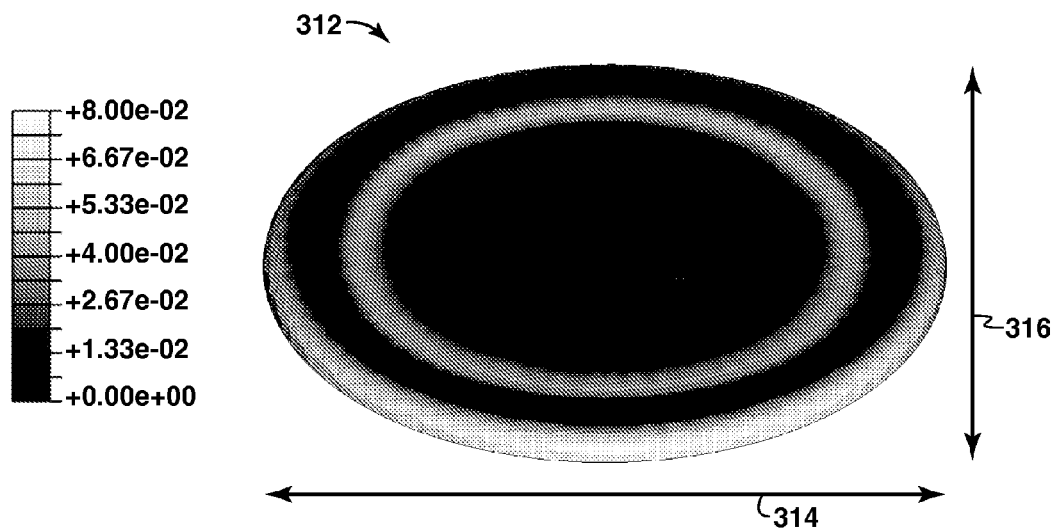

FIGS. 3A-3C are exemplary embodiments of a compressible object in different states in accordance with aspects of the present techniques. In the embodiments of FIGS. 3A-3C, FEA modeling is utilized to demonstrate the different states of a compressible object, which is an ellipsoid in this example. Each of these FIGS. 3A-3C is a partial view of the compressible object in different states. As shown in FIG. 3A, a elliptical object may be in the initial state 300 and have a major axis 302 and a minor axis 304 with the aspect ratio being 4:1. In FIG. 3B, the elliptical object may be in the expanded state 306 and have a major axis 308 and minor axis 310 and an aspect ratio less than (i.e. <) 4:1. In FIG. 3C, the elliptical object may be in compressed state 312 and have a major axis 314 and minor axis of 316 and an aspect ratio greater than (i.e. >>) 4:1. Accordingly, the aspect ratio for each of the different states 300, 306 and 312 may differ based on the expansion and/or compression of the elliptical object. Compressible objects having different initial aspect ratios is discussed further in FIG. 4.

Figure 4:
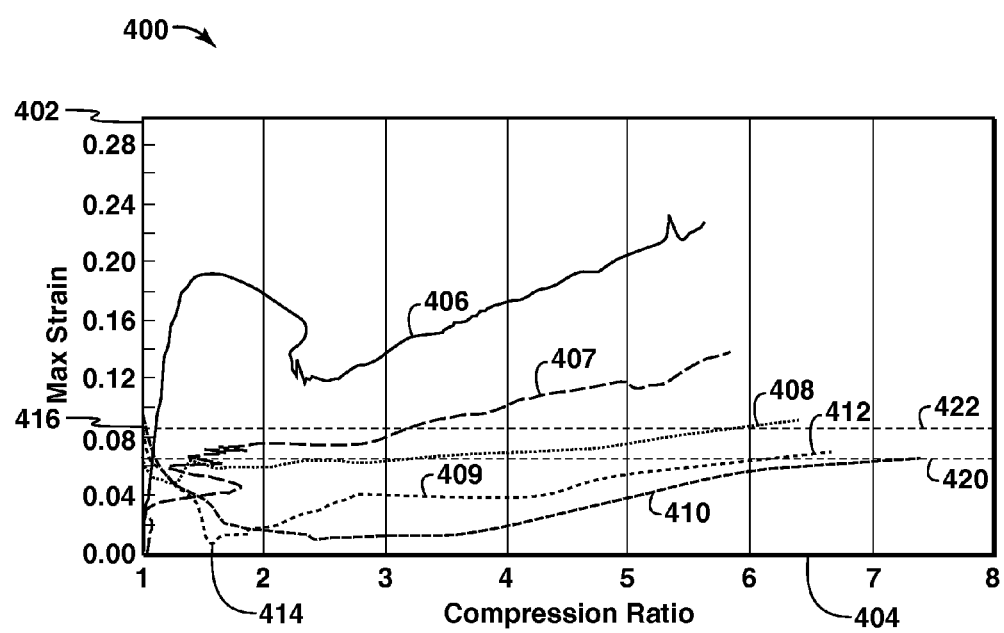
FIG. 4 is an exemplary chart of different shaped compressible objects in accordance with aspects of the present techniques.

FIG. 4 is an exemplary chart of different initial shaped compressible objects in accordance with aspects of the present techniques. FEA modeling is utilized to generate the chart 400 of the maximum strain 402 versus compression ratio 404 for different compressible objects having a wall thickness of 15 microns. The chart 400 includes a first response curve 406 for a spherical object, a second response curve 407 of an elliptical object having a 2:1 aspect ratio, a third response curve 408 of an elliptical object having a 3:1 aspect ratio, a fourth response curve 409 of an elliptical object having a 4:1 aspect ratio, which may be the elliptical object in FIGS. 3A-3C, and a fifth response curve 410 of an elliptical object having a 5:1 aspect ratio.

As indicated by the response curves 406-410, the maximum strain increases and decreases between the various states. For objects with an initial aspect ratio less than 3:1, the maximum linear elastic strain behavior for compression ratios less than 3:1 is dominated by cap buckling instabilities described above. For compressible objects with an initial aspect ratio greater than 3:1, the maximum strain decreases from the expanded state to a minimum value at or close to the initial state, which is a global minimum for the strain on the compressible object. Then, the maximum strain increases from the initial state until the fully compressed state is reached. As such, the maximum strain at the initial state of the compressible objects is near zero as indicated by the response curves 406-410. This aspect is clearly demonstrated by the fourth response curve 409. Along the response curve 409, the expanded state is located at the point 416, the initial state is located at the point 414 and the compressed state is located at the point 412. Clearly, the initial state of the compressible object has the lowest strain in comparison to the expanded and compressed states. In addition, this compressible object has a maximum strain of about 0.085, which is about the value of the maximum recoverable strain for the austenite to martensite phase transformation of the Nitol family of alloys in their pseudo-elastic state. That is, the response curve 409 indicates that the elliptical object having a 4:1 initial aspect ratio is a suitable structure and wall thickness to provide the specified compression ratio of greater than 5:1 with an internal pressure useful for the practice of the invention disclosed in International Patent Application Publication No. WO 2006/007347. Each of the other response curves 406-408 and 410 exceed the maximum recoverable strain of 0.085. Strains above the austenite to martensite phase transformation completion strain of approximately 8% may experience permanent deformation resulting in limited fatigue life in cyclic deformation.

From this chart 400, the inflation and subsequent compression of the compressible object is bounded by an equatorial buckling instability during the inflation phase and the cap buckling instability described earlier during the compression phase. By modeling the inflation and subsequent compression, the initial architecture of the compressible object may be designed to minimize the recoverable elongation for the specific compression ratio. In particular, for a compressible object of constant wall thickness fabricated from a NiTi shape memory alloy with an austenite to martensite phase transformation temperature below about 0° C. (Celsius) and a target expanded internal pressure of 1500 psig (pounds per square inch gauge), the initial aspect ratio of the compressible object before inflation may preferably be between about 3 and 4 with a wall thickness between about 15 and 20 microns to avoid exceeding about 8% linear elongation anywhere in the wall of the compressible object for a compression ratio of up to 8:1. As noted above, to be useful for the practice of Patent Application No. WO 2006/007347, the alloy should be in a pseudo-elastic condition. Ordinary shape memory alloys with transformation temperatures above about 0° C. are not useful for this application. The requirement of an austenite to martensite phase transformation temperature below about 0° C. recognizes that the alloy should remain pseudo-elastic over the entire temperature range encountered during operation of the compressible objects in the drilling mud.

Based on the modeling methods discussed above, compressible objects may be designed of a certain material and having a specific architecture to provide specific compression ratios that are within the deformation limitations of existing materials. With these compression ratios, the compressible objects may be useful for certain applications, such as drilling and production operations, which are described above. As an example, the compressible objects may be useful if they provide a recoverable compression ratio greater than or equal to five times the expanded state at a specific depth interval of interest. The compressible objects may be included in the variable density drilling mud in a volume fraction of up to 40% or 50% to provide a change in drilling mud density representative of typical PPGs and/or FGs. By changing the density of the drilling mud by adding up to 50% by volume of small low-density, compressible objects, which may have a diameter of about 1 millimeter (mm), the pressure gradient within the wellbore may be substantially controlled to reduce the number of casing strings utilized within the wellbore. In particular for a deep-water application, the number of casing intervals may be reduced substantially below that achievable with dual gradient or multi-gradient systems without major modification of existing hardware or equipment. As such, the well cost may be reduced by up to 30 to 50% for certain applications. Accordingly, the selection of the compressible objects and fabrication of the compressible objects is discussed further below in FIG. 5.

Figure 5:
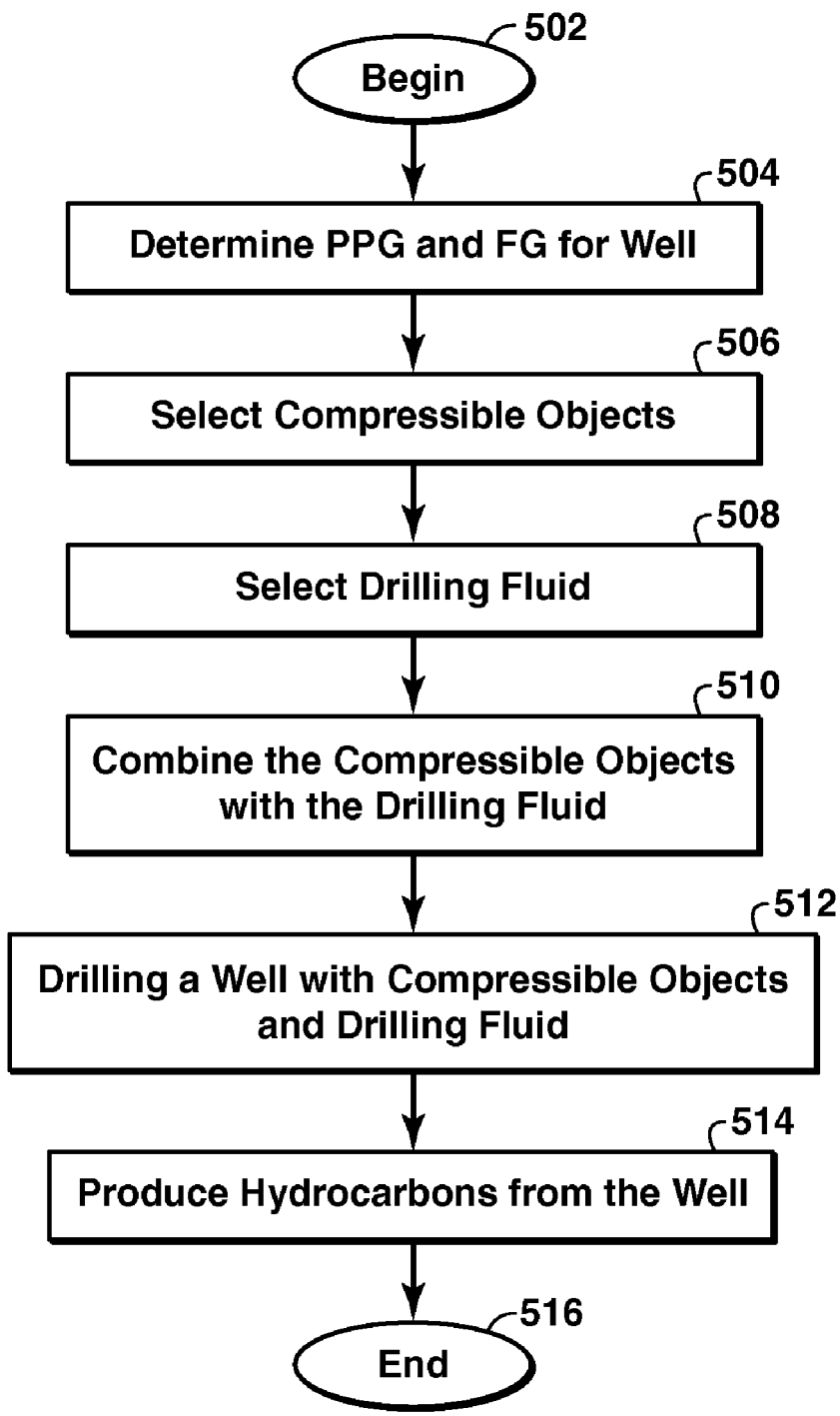
FIG. 5 is an exemplary flow chart of the selection and use of a variable density drilling mud for the drilling system of FIG. 1 in accordance with certain aspects of the present techniques.

FIG. 5 is an exemplary flow chart of the selection and use of the variable density drilling mud for the drilling system 100 of FIG. 1 in accordance with certain aspects of the present techniques. This flow chart, which is referred to by reference numeral 500, may be best understood by concurrently viewing FIGS. 1, 3A-3C and 4. In this flow chart 500, compressible objects and drilling fluid may be selected to formulate a variable density drilling mud for a well. These compressible objects may include objects that each have a shell enclosing an interior region, and wherein the compressible object has (a) an internal pressure (i) greater than about 200 psi at atmospheric pressure, 500 psi at atmospheric pressure, 1500 psi at atmospheric pressure and/or 2000 psi at atmospheric pressure, and (ii) selected for a predetermined external pressure, wherein external pressures that exceed the internal pressure reduce the volume of the compressible object; (b) wherein the shell experiences less strain when the external pressure is about equal to the internal pressure than when the external pressure is above or below a predetermined compression interval of the compressible object or wherein the shell is configured to experience less strain when the external pressure is about equal to the internal pressure than when the external pressure is greater than the internal pressure or less than the internal pressure; and/or (c) compressible objects having a shell that encloses an interior region at least partially filled with a foam. Then, the variable density drilling mud may be utilized to enhance the drilling operations of the well. This process may enhance the drilling operations by providing a variable density drilling mud that extends the drilling operations to further limit or reduce the installation of additional casing strings. Accordingly, drilling operations performed in the described manner may reduce inefficiencies from utilizing additional casing strings from drilling operations.

The flow chart begins at block 502. At block 504, the FG and PPG for a well may be determined. For example, the FG and PPG may be obtained by receiving information from the drilling location and/or performing calculation to estimate the FG and PPG. Then, compressible objects may be selected to provide specific volumetric changes, as shown in block 506. The selection of compressible objects may include operational considerations, such as removal of the compressible objects from the drilling mud for re-circulation at the surface, limiting potentially detrimental effects of the high volume fraction of compressible objects on the rheology of the drilling mud and facilitating the flow of the compressible objects through the pumps and orifices in the flow path. As such, the compressible objects may be sized to have an equivalent diameter between 0.1 millimeter (mm) and 50 mm, and/or preferably between 0.1 mm and 5.0 mm. The equivalent diameter is defined as the diameter of a sphere of equal volume as the fully expanded compressible object at atmospheric pressure. Further, the selection of compressible objects may include utilizing compressible objects of different sizes or volumes at the surface of the wellbore and/or different shapes to manage the viscosity increases of the drilling mud. The selection of the compressible objects is further described in FIG. 6.

At block 508, the drilling fluid may be selected. The drilling fluid, which may include various weighting agents, may be selected to provide a specific density that may interact with the compressible objects to maintain the drilling mud density between the FG and PPG, which is discussed further below. The compressible objects and the drilling fluid may be combined in block 510. The combination of the compressible objects and the drilling fluid may involve mixing or blending the compressible objects with the drilling fluid, as described in International Patent Application No. PCT/US 2007/003691, filed 13 Feb. 2007. Further, the compressible objects and the drilling fluid may be combined prior to shipping to the drilling location or shipped individually with the compressible objects and the drilling fluid being combined at the drilling location. It should be noted that the compressible objects may be shipped in refrigerated vehicles, such as trucks and ships, to reduce risks associated with the release of internal pressure within the compressible objects.

At the drilling location, the compressible objects and the drilling fluid, which may be the variable density drilling mud 118 (FIG. 1) may be utilized in the drilling operations, as shown in block 512. The drilling operations may include any process where surface fluids are used to achieve and maintain a desired hydrostatic pressure in a wellbore and/or the processes of circulating this fluid to, among other uses, remove formation cuttings from the wellbore. Once the well is drilled, the hydrocarbons may be produced in block 514. The production of hydrocarbons may include completing the wellbore, installing devices within the wellbore along with a production tubing string, obtaining the hydrocarbons from the subsurface reservoir, processing the hydrocarbons at a surface facility and/or other similar operations. Then, the process ends at block 516.

Figure 6:
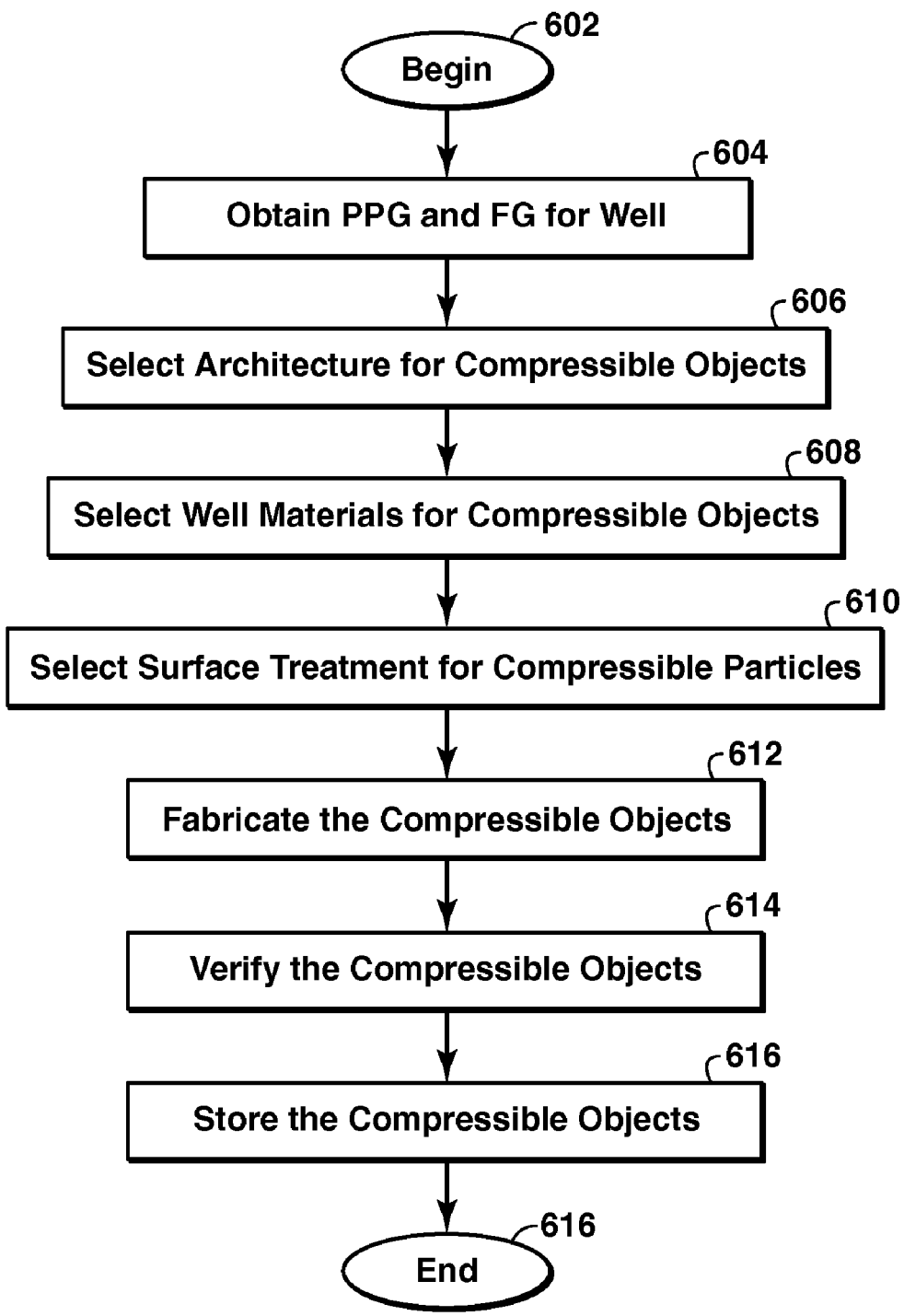
FIG. 6 is an exemplary flow chart of the selection and fabrication of compressible objects for the flow chart in FIG. 5 in accordance with certain aspects of the present techniques.

FIG. 6 is an exemplary flow chart of the selection and fabrication of the compressible objects discussed in the flow chart of FIG. 5 in accordance with certain aspects of the present techniques. This flow chart, which is referred to by reference numeral 600, may be best understood by concurrently viewing FIGS. 1, 3A-3C, 4 and 5. In this flow chart 600, a process for selecting compressible objects to maintain the density of a drilling mud within the well between the PPG and FG is described. Beneficially, the use of compressible objects in the variable density drilling mud may enhance drilling operations by reducing the size of the wellbore and casing strings, and may provide access to greater depths.

The flow chart begins at block 602. At block 604, the FG and PPG for a well are obtained. The FG and PPG may be obtained by receiving information from the drilling location and/or performing calculation to estimate the FG and PPG. Then, a structure for each of the compressible objects is selected, as shown in block 606. The selection of the structure for the compressible objects may include using finite element analysis (FEA) methods to match structures and geometries of compressible objects to properties of the available materials, as described above. At block 608, wall materials for the compressible objects are selected. The selection of wall materials may include metals and/or metal alloy thin films formed mechanically or by depositional methods, polymers with or without micro and/or nanofiber re-enforcement in a polymer matrix to achieve the specific properties of the wall material (e.g., as defined by FEA analysis of the object compression). In addition, wall materials may include ex-foliated inorganic mineral as re-enforcement or as a barrier to gas permeability in a polymer matrix; metal and/or metal alloy thin films formed by depositional methods on polymer surfaces with or without chemical modification of the polymer surface to form a structural wall or a barrier to gas permeation. The metal and/or metal alloy thin films may be deposited on polymer sheet prior to forming of the compressible object or on a pre-formed compressible polymer object. The metal layer may be formed on the inside or outside surface of the compressible objects or incorporated within a polymer wall or polymer laminate of the same or different polymers.

Surface treatments may be selected for the fabrication of the compressible objects in block 610. The surface treatments may include physical and/or chemical surface treatments to improve the continuity and adhesion of metal and/or metal alloy films on the surface of the polymer objects or to enhance the chemical and/or physical compatibility of the polymer or metallic exterior wall of compressible objects with the drilling fluid.

Once selected, the compressible objects are fabricated in block 612. The fabrication of the compressible objects may include various polymerizations, depositions, surface treatments and other fabrication processes used to form the wall structures of the compressible object. For instance, the fabrication of the wall structures may include co-axial bubble blowing methods where the polymer is the structural wall; co-axial bubble blowing methods where the polymer is a template for the deposition of a metal or metal alloy structural wall; dispersion polymerization methods where the polymer is a template for the deposition of a metal or metal alloy structural wall; and/or interfacial polymerization methods where the polymer is a template for the deposition of a metal or metal alloy structural wall. The fabrication may include the deposition of a continuous metal or metal alloy layer on the surface of a compressible polymer object in either low or high pressure liquid environments using electro or electro-less plating methods; the deposition of a continuous metal or metal alloy layer on the surface of a compressible polymer object in high pressure gas environments using ultraviolet chemical vapor deposition (UV-CVD) methods; and/or the deposition of a continuous metal or metal alloy layer on the surface of a compressible hollow object under vacuum using physical and/or chemical deposition methods. The vacuum deposition methods may or may not include reducing the internal pressure inside the compressible object prior to deposition. This may be accomplished for example, by first reducing the internal pressure of the compressible hollow object by cooling the pressurized compressible hollow object preferably to a temperature below which the gas inside the compressible hollow object may condense. Further, fabrications may include molding or forming a flat metalized polymer sheet or film into portions of compressible objects and joining the components using mechanical, chemical and/or thermal methods; forming a flat polymer sheet or film into portions of the compressible object before metallization and joining the components using mechanical, chemical and/or thermal methods; deposition of a metal or metal alloy on a polymer sheet with or without chemical and/or physical pre-treatment to improve adhesion and continuity and subsequent removal of the polymer template from the flat free standing metal or metal alloy sheet by physical, chemical and/or thermal methods resulting in the formation of a thin metallic sheet suitable for mechanical forming into components of compressible objects and subsequently joining the components by mechanical, thermal and/or chemical methods; deposition of a metal or metal alloy on a polymer sheet pre-formed into a template for free standing metal or metal alloy components of the compressible object and subsequent removal of the polymer template from the metallic component by chemical, mechanical and/or thermal methods and subsequently joining the components by mechanical, thermal and/or chemical methods.

At block 614, the compressible objects may be verified or tested. The verification and testing may include cyclic compression tests to verify the internal pressure and to quantify the fatigue life of the compressible objects with or without micro-structural analysis of the structural wall and the joints if any. Then, the compressible objects may be stored, as shown in block 616. The storage of the compressible objects may include placing the compressible objects in a storage vessel. The compressible objects may be stored at ambient pressure or at a pressure equal to or higher than the internal pressure of the compressible objects to facilitate packing of the compressible objects in the storage vessel. Alternatively, the compressible objects may be stored in a cold environment to reduce the internal pressure inside the compressible objects. The cold compressible objects may then be stored in a vessel at ambient pressure or at elevated pressure to facilitate packing of the compressible objects in the storage vessel and shipping the compressible objects to another location, such as the drilling location, for storage or other similar activities. The process ends at block 618.

Accordingly, based on the discussion above, the selection and use of these compressible objects may involve different aspects that affect the design of the compressible objects. For instance, the nature of the transition to gas compression controlled deformation is dependent on the mechanical properties of the shell or wall material and the evolution of those properties in repeated compression cycles. As such, the compression of hollow objects results in a different gradient of mud density above and below the depth defined by the initial internal pressure of the hollow objects. Because the use of compressible objects having different initial internal pressures may be beneficial to enhance or extend drilling operations, changing the volume fraction and distribution of initial pressures of compressible objects may achieve the desired result of maintaining the effective mud weight between the PPG and FG.

Further, the use of different gases may also influence the design of the compressible objects. For instance, the hollow object may be filled with a mixture of condensable and non-condensable gases. The addition of a condensable gas allows additional flexibility in tailoring the variation of drilling mud density with depth. At the temperature and pressure of the gas/liquid phase boundary, the condensable gas liquefies with an increase in density and a corresponding decrease in volume. The decrease in internal volume of the hollow object results in a step increase in effective mud density at the depth and temperature corresponding to the phase transition. An additional benefit of using a gas mixture containing a condensable gas is the finite internal volume occupied by the condensed gas at depths once it has condensed because the compressibility of the condensed liquid is generally lower than that of the non-condensable gas. As a result, the condensed liquid volume may be used to set an upper limit on the deformation experienced by the wall of the hollow object. This may be utilized to control the fatigue life of the flexible objects as they cycle between the bottom of the wellbore and the surface.

Moreover, the operational use may influence the design of the compressible objects. In particular, confining the volume change to a large number of small diameter compressible objects mixed into the drilling mud allows tailoring of the initial size and/or shape of the compressible objects to achieve a stable composite mud fluid rheology within the vertical mud column of the wellbore. To create a usable variable density drilling mud, the initial properties of the fluid phase for a given compressible solid volume fraction is selected to suspend both the rock cuttings and the compressible objects in the wellbore annulus during non-circulating operations. In addition, the viscosity of the composite mud has to be configured to be pumped within the wellbore by mud and rig pumps within acceptable limits. Also, the use of different sized compressible objects may further enhance the operational use. These aspects and others are discussed further below.

Architecture of Compressible Objects

To determine the architecture of the compressible objects, as noted in block 606 of FIG. 6, a finite element numerical modeling method may be utilized. The finite element numerical modeling method may include implicit methods and/or explicit methods. In these methods, the shell walls or elements may be represented by mesh size and shape tailored with higher resolution in regions of interest, such as regions of high stress and/or strain for compressible object construction. The finite element numerical model may be used to simulate the entire three dimensional object or a segment of the object related to the three dimensional object by symmetry. Further, the architecture of the compressible objects may be influenced by various criteria, such as the materials and use of the compressible objects, which are discussed in this and other portions of the application.

With regard to the use of the compressible objects, it should be noted that the architecture of the compressible objects may facilitate periodic removal of the compressible objects from the re-circulating drilling mud. This may facilitate limiting potentially detrimental effects of the high volume fraction of compressible objects on the rheology of the drilling mud and/or facilitate the flow of the compressible objects through the equipment, such as pumps, and orifices in the flow path. As such, the compressible objects may include structures having an equivalent diameter in the range of about 0.1 mm (millimeter) to 5.0 mm. The equivalent diameter is again defined as the diameter of a sphere of equal volume as the fully expanded compressible object at an external pressure of one atmosphere. In addition, the shape of the compressible objects may be adjusted to increase the packing density and reduce effects on fluid flow. For instance, a spherical or elliptical object may provide the highest packing density and lowest effects on the fluid flow within the wellbore in comparison to pillow or rod shaped objects.

Another criterion for the architecture is the wall thickness. As noted above, the wall thickness should be as thin as possible within the constraints imposed by structural instabilities and the properties of existing materials to maximize the compression limit of the compressible object. However, the lower limit of the wall thickness is defined by the minimum thickness able to contain the desired internal gas pressure at an external pressure of about 1 atmosphere typically encountered at the surface of the Earth.

To determine the optimal geometry of the compressible objects, methods of finite element numerical modeling may be utilized. Finite element numerical modeling is well known to those skilled in the art. These methods may include modeling the walls as shell elements of the compressible objects or as a mesh object with variable mesh size and shape. Certain regions of interest, such as regions of high stress and/or strain for the compressible object construction, may be tailored with higher resolution (i.e., smaller mesh size) to provide more information in these regions. Further, the model may be used to simulate the entire three dimensional (3D) compressible object, a segment of the compressible object, or a portion of the compressible object that may be related to the 3D compressible object structure by symmetry.

As an example, one preferred method of analyzing and optimizing the combinations of compressible object geometry, compressible object material properties, internal gas properties, internal pressure and response of the compressible object to changes in external temperature and/or pressure is to construct a finite element model of either the entire compressible object or a portion of the compressible object (i.e., a hemisphere, due to symmetry). By using software, such as ABAQUS™ or any other suitable FEA analysis package, a finite element numerical model may be constructed for the compressible objects. In this model, an explicit method may be used to monitor for contact between the internal surfaces of the compressible objects during compression. To minimize oscillations during external pressure modifications, the external pressure may initially be set equal to the internal pressure. Then, the external pressure may be slowly decreased down to ambient, which may be done over a period (e.g., 0.5 sec.) sufficient to substantially eliminate dynamic artifacts in the simulation. Depending on the flow behavior of the wall material and any occurrence of buckling, the amplitude and rate of external pressurization and depressurization may be adjusted to minimize oscillations. Once the finite element numerical model has been constructed, other analysis may be performed. For instance, the compressible object may undergo a pressurization cycle test. Then, an analysis of the data from the pressurization cycle test may be utilized to gain insight on the effect of compressible object geometry, compressible object dimensions and/or material properties. In addition, if the numerical model is constructed using shell elements, sudden changes in mesh geometry should be avoided to reduce the potential for anomalies in local stress calculations.

As a specific example, the finite element numerical model of the compressible object of FIGS. 3A-3C is discussed. In these embodiments, the compressible object has the shape of an oblate ellipsoid. The initial aspect ratio may be in the range of 1 to 10, with a more preferred aspect ratio being in the range of 2 to 5. The use of an internally pressurized oblate ellipsoid hollow compressible object with an initial aspect ratio greater than 1 has the advantage that at ambient external surface pressure, the ellipsoid object inflates and approaches an aspect ratio of about 1 depending on the internal pressure and material properties, as shown in FIG. 3B. If the ellipsoid object has an initial aspect ratio of 4:1, a uniform NiTi alloy wall thickness of 10 microns and an internal pressure of 1500 psig, the aspect ratio in the expanded state is about 1.22:1. As the external pressure increases, the ellipsoid object tends to return to an initial state 300. In the initial state 300, the aspect ratio of the ellipsoid object is that of the original design with little elastic strain, as shown in FIGS. 3A and 4. Then, as the pressure continues to increase, the ellipsoid object is compressed further into a compressed state 312, as shown in FIG. 3C.

Wall Material for Compressible Objects

In addition to the architecture, various materials may be utilized for the wall of the compressible objects based on the criteria discussed above, as noted in block 608 of FIG. 6. In particular, the shell or wall materials may be divided into two classes of commercially available materials, which are metal materials and polymer materials. The metal materials may include metals, metal alloys, and alloys with pseudo-elastic behavior (e.g., deformations associated with a reversible stress induced structural phase transformation). Further, the super-plastic behavior of ultra thin (i.e., <500 Angstroms (A)) metal or metal alloy films may also be used to make a wider variety of metals and metal alloys (e.g., Aluminum (Al), Copper (Cu), Nickel Titanium (NiTi), etc.) suitable for application as a thin permeation barrier in conjunction with a non-metallic load bearing wall that satisfies the mechanical properties of the load bearing wall. Specifically, the metal materials may include, but are not limited to, binary or near binary NiTi, ternary alloys of NiTi with iron and chromium alloying additions, Magnesium-40Copper (Mg-40Cu) alloys, Beta-Titanium-9.8Molybdenum-4Niobium-2Vanadium-3Aluminum (β-Ti-9.8Mo-4Nb-2V-3Al) alloys, metallic glasses and amorphous metals (e.g. Zirconium (Zr), Iron (Fe) and/or Magnesium (Mg) based alloys) and the like. The polymeric materials may include polymers and polymer blends with or without reinforcement (e.g., micro to nano-fiber, nanotubes, exfoliated inorganic fillers with appropriate orientation within the polymer wall etc.). Examples of polymers with suitable properties include but are not limited to commercially available polyimide, such as Ubilex-R and Ubilex-S.

Because each of these materials has specific properties, such as tensile strength and recoverable elongation, the material utilized in the walls of the compressible objects is a factor in determining the thickness of the wall. The determination may be based upon finite element numerical modeling, as noted above, to evaluate different thicknesses of the shell or wall with different materials. For instance, if the load bearing wall material is a metal or metal alloy, only metals and metal alloys with sufficiently high elastic or pseudo-elastic behavior should be selected because deformations associated with a reversible stress induced structural phase transformation have to be recoverable for reuse of the compressible objects. As noted above, even these selected materials have to be combined with careful design of the geometry of the exterior shell of the compressible object to avoid strain localization during compression and re-expansion. In particular, the geometry and material may be utilized for optimization of the wall thickness relative to particle size; variation of the bearing wall thickness and/or mechanical properties with location on the compressible objects' surface; and/or variation of the aspect ratio and major diameter of an oblate spheroid hollow compressible objects, etc. Accordingly, these various factors are considered in selecting a material for the compressible objects.

Figure 7:
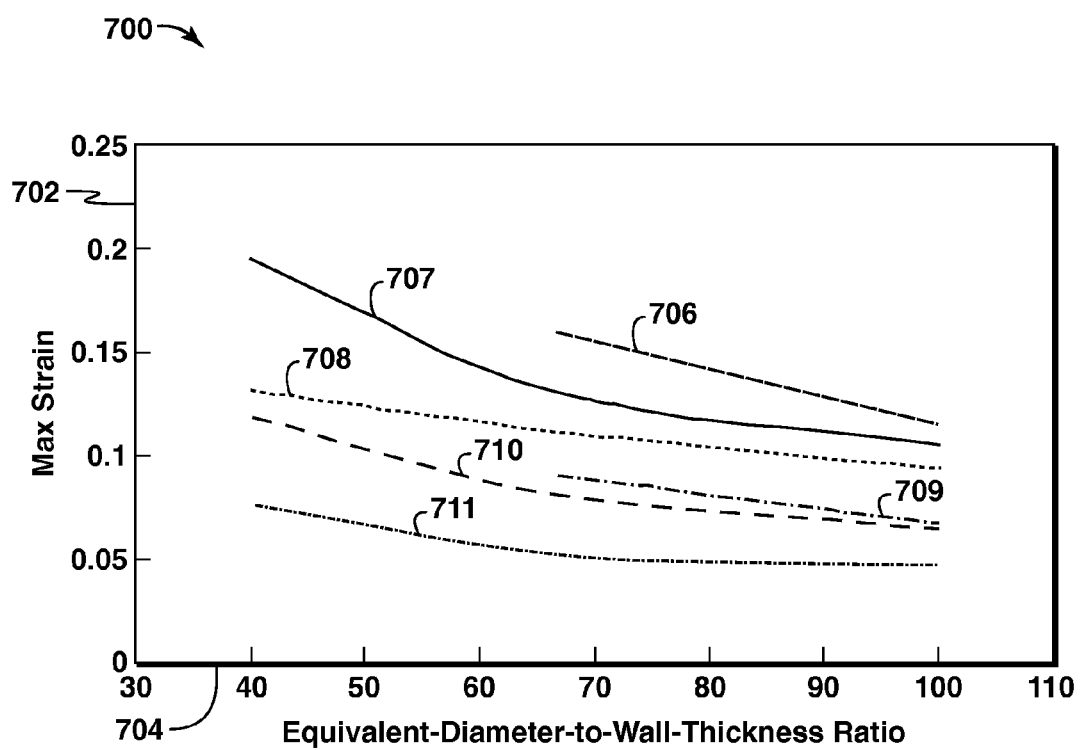
FIG. 7 is an exemplary chart relating to the shape of compressible objects in accordance with certain aspects of the present techniques.

As an example of the variation of wall thickness, the wall material may be utilized to influence the compression ratios of the compressible object, such as the elliptical object discussed above in FIGS. 3A-3C. In FIG. 7, the FEA calculations provide various shapes that have different compression ratios within the limits defined by existing materials properties. The FEA calculations may provide compressible objects having an aspect ratio between 2 to 5, with an equivalent-diameter-to-wall-thickness ratio between 20 and 200, or more preferably between 50 and 100. As shown in FIG. 7, a chart 700 of the effect of wall thickness is shown for maximum strain 702 of compressible objects against the equivalent diameter to wall thickness ratio 704 for various shapes, which are shown by curves 706-711, generated from finite element numerical modeling. For sphere-shaped compressible objects, curve 706 has a compression ratio of 3.5, curve 707 has a compression ratio of 3, and curve 708 has a compression ratio of 2. For the ellipse shaped compressible objects, curve 709 has a compression ratio between 3.5 and 2, curve 710 has a compression ratio between 3 and 2, and curve 711 has a compression ratio of about 2. It is clear from the chart 700 that compressible objects having an aspect ratio greater than unity with a thinner wall (i.e., higher equivalent-diameter-to-wall-thickness ratio) are preferable because they provide higher compression ratios with correspondingly lower maximum strain. Also, it may be preferable to maintain the maximum strain below a specific value, of about 0.06 as defined by the maximum allowable strain to achieve adequate fatigue life of the structural wall. Typically, a minimum fatigue life of at least 2000 to 3000 cycles is desirable. Based on this limitation, an ellipsoid object with an aspect ratio at 2 or more and equivalent-diameter-to-wall-thickness ratio greater than 65 provides a compressible object that is below the specific value, as shown on curve 711.

In addition to being a single material, the walls of the compressible objects may include two or more layers. For instance, the layered composite shell may include a load bearing structural layer or wall and a gas permeation barrier wall or layer. The load bearing wall may be a relatively thick wall having a thickness in the range of 1 micron to 50 microns and a gas barrier wall may be a thin wall having a thickness in the range of less than or equal to 5 microns. For example, the load bearing polymer wall, which may have a hollow interior or be deposited on a polymer foam template, may be utilized to provide the structure of the compressible object. The gas barrier wall, which may be internal or external to the load bearing wall may be a metal or metal alloy permeation barrier layer that contains the internal pressure and has a thickness below 500 Angstrom. Alternatively, the compressible objects may have a thin (i.e., <5 micron) shell wall, which is either hollow or deposited on a polymer foam, with a relatively thick (i.e., 1 micron<wall thickness<50 microns) load bearing and barrier wall of metal or metal alloy layer that provides structural support and a barrier to gas permeation.

Selection of Surface Treatments for Compressible Objects

As discussed in block 610 of FIG. 6, various surface treatments may be utilized for the compressible objects. The surface treatments may be utilized to improve the continuity and adhesion of polymer layers or metal and/or metal alloy films on the surface of the compressible objects, such as polymer objects. Accordingly, the surface treatments may be utilized to enhance specific properties, such as compatibility with the base fluid and the permeability of the shell layers to maintain the internal pressure, which is discussed further below.

For internally pressurized compressible objects having a load bearing wall of a polymer and/or an elastomer with or without reinforcement, a surface treatment may be utilized to enhance the continuity of a metal and/or non-metal film deposited on the surface of the polymer to reduce the gas permeability of the load bearing wall. In general, elastomers, crystalline polymers and/or polymer blends have gas permeabilities too large to be useful for the fabrication of the compressible objects. Accordingly, in addition to the incorporation of exfoliated inorganic fillers in the polymer wall, the deposition of a continuous, thin (i.e., <500 Angstrom) low gas permeability coating either on the surface of the wall or incorporated into a layered wall structure may be used. For example, the coating may be a thin metal, metal alloy or inorganic gas permeation barrier, which is applied through a variety of physical and/or chemical treatments to the exterior of the surface wall of the compressible object. In particular, the deposition coating may be less than 500 A in thickness and include Al, NiTi, or any other suitable material. Surface treatments to enhance the uniformity and/or continuity of these permeation reducing layers may include: (1) Anionic functionalization of the surface e.g., sulfonation, carboxylation, i.e. acid formation, as well as other anionic functionalization methodologies and chemistries used by those well-versed in the state of the art. (2) Cationic quaternization functionalization chemistries e.g., sulfonium salts, phosphonium salts, ammonium salts, used by those well-versed in the state of the art. (3) Zwitterionic ionic functionality and amphoteric functionality practiced by those well-versed in the state of the art. (4) Maleation functionalization and the associated reactions known by those well-versed in the state of the art. (5) Controlled oxidation e.g., peroxides, high temperature oxygen plasma etching, ozone, and the like. (6) Chemical vapor deposition methodologies and associated chemistries. (7) Corona discharge approaches to surface functionalization used by those well-versed in the state of the art.

A wide variety of methods are available for deposition of metal and/or inorganic barrier coatings. One of the factors that may influence the selection of deposition method is the internal pressure of the compressible object. For instance, if little or no initial internal gas pressure is contained within the compressible objects, then a low permeability metal, metal alloy or inorganic coating may be utilized through various low pressure physical and chemical deposition methods to uniformly coat the non-planar geometry of the compressible objects. If the compressible object's internal pressure and the wall permeability is such that the low pressure environment (i.e., typically $<1\times10^{-3}$ mm of Hg) required for low pressure physical and chemical deposition methods is not maintainable, deposition methods compatible with the internal gas pressure and relatively high wall gas permeability may be used. In this example, the compressible objects may be maintained in a high pressure gas or liquid environment to prevent loss of internal pressure through the wall of the compressible object during storage and coating. For a high pressure liquid environment, the coating of the wall surface may be accomplished, for example, by electro or electro-less plating using methods familiar to those skilled in the art. For the high pressure gas environment, the coating of the wall surface may be accomplished by, for example, chemical vapor deposition (CVD) or ultraviolet chemical vapor deposition (UV-CVD) deposition.

Alternatively, the internal gas pressure inside the compressible objects may be reduced to a level that allows application of a range of commercial low pressure physical and chemical deposition methods available for an un-pressurized object or polymer sheet. In this example, a gas, which may be condensed by lowering the temperature of the compressible object, may be utilized for the internal pressurization of the compressible object. For instance, if the gas internal to the compressible object is oxygen (O) at a pressure of 10 mPa, subsequent cooling the compressible objects to the temperature of liquid nitrogen ($LN_2$) at atmospheric pressure may reduce the internal pressure to less than or equal to $1\times10^{-3}$ mm of Hg.

Similar considerations for a hollow polymer load bearing wall may be applied for internally pressurized compressible objects having a load bearing wall of polymer and/or elastomer foam and gas barrier wall of a metal and/or non-metal permeation barrier, or for a polymer and/or elastomer ultra thin hollow shell or a polymer and/or elastomer foam used as a template for deposition of a load bearing metal and/or metal alloy wall, as noted above. In the latter example, an ultra thin polymer shell or polymer foam may be utilized as a template for the deposition of a relatively thick metal and/or metal alloy load bearing wall. The metal or metal alloy load bearing wall in this example may have a thickness from about 5 microns to 50 microns. The ultra thin polymer shell or polymer foam may include any polymer and/or elastomer with or without reinforcement and surface treatments to enhance the uniformity and continuity of the metal and/or metal alloy load bearing wall. In this example, the thickness of the ultra thin polymer shell and/or the mechanical strength of the foam need only be sufficient to maintain the desired shape of the particle during the deposition process.

Fabrication of Compressible Objects

As discussed in block 612 of FIG. 6, once the structure and wall materials are selected for compressible objects, various fabrication techniques may be utilized to create the compressible objects. These fabrication techniques may include various processes, such as patterning, deposition, thermo-mechanical processing and other similar fabrication processes. The patterning processes, which are processes that shape material into another form, such as compressible objects, may include chemical etching, mechanical etching and the like. The etching processes are processes that remove material from a base material. The deposition processes, which are processes that coat or transfer a material onto another material, may include physical vapor deposition, chemical vapor deposition, electrochemical and/or electro-less deposition, metallization, sputtering, evaporation, molecular beam epitaxy and the like. The thermo-mechanical processes, which are processes that form or change a materials shape and microstructure, may include cold rolling, hot rolling, swaging, drawing, cutting, tempering, solution annealing and the like.

The fabrication of compressible objects may use various techniques that are combined to provide desirable properties of the compressible objects, as described above. The fabrication route of the compressible objects may be determined based on certain desirable properties of the compressible objects. For example, low gas permeability, object flexibility, mechanical integrity, low cost, relative ease of object fabrication, commercial availability of materials, and/or environmentally acceptable materials properties are some of the properties that may be considered. Other properties may include, desirable range of compressible object sizes, size distributions, and aspect ratios, potential surface functionalization approaches to enhance polymer/metal adhesion, ability to incorporate "excess" blowing agent(s) to produce a hollow object containing a high pressure gas interior (e.g., the use blowing agent to internally pressurize hollow objects, fill with high pressure gas and the like) among other features.

Figure 8A:
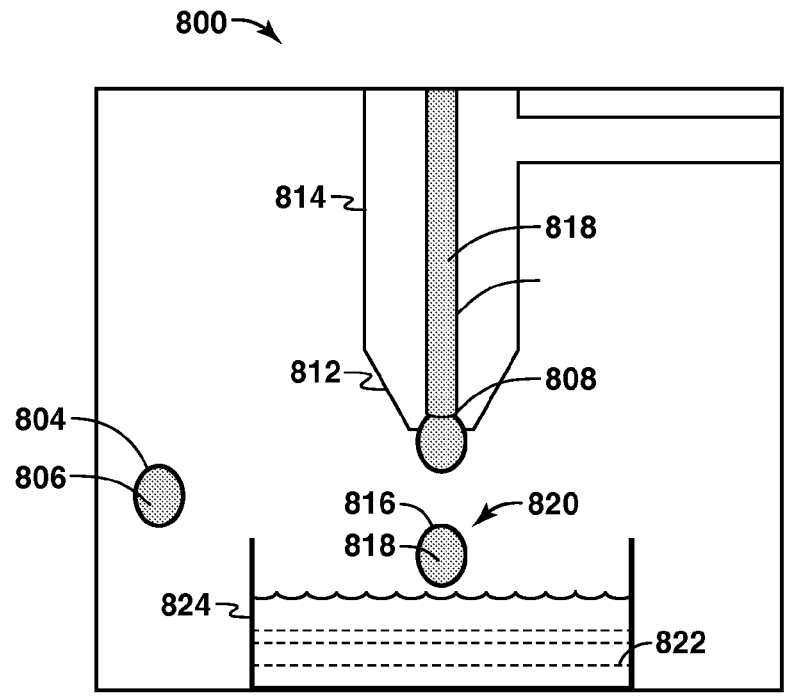
FIGS. 8A-8B are exemplary embodiments of fabrication processes utilized in the flow chart of FIG. 6 in accordance with certain aspects of the present techniques.
Figure 8B:
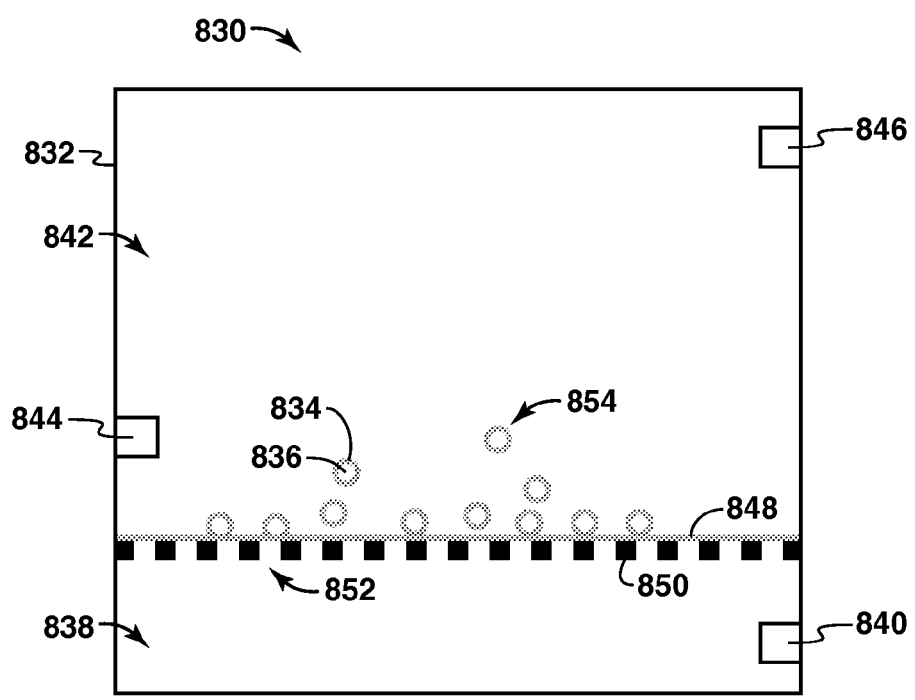

Accordingly, the fabrication processes may be configured to create compressible objects that are gas filled polymer objects including internal structures being either hollow or at least partially filled with foam. For instance, FIGS. 8A-8B are exemplary embodiments of fabrication processes that create compressible objects having hollow interiors. Similarly, FIGS. 9, 10 and 11A-11B are embodiments of fabrication processes that create compressible objects having foam interiors or based upon foam templates.

A. Fabrication of Compressible Objects as Hollow Objects

The fabrication processes described below relate to the fabrication of compressible objects that are formed as hollow objects, which may or may not be gas filled. These fabrication processes may be utilized to form compressible objects that each has a shell enclosing an interior region, each of the compressible object has (a) an internal pressure (i) greater than about 200 psi at atmospheric pressure, 500 psi at atmospheric pressure 1500 psi at atmospheric pressure or 2000 psi at atmospheric pressure and (ii) selected for a predetermined external pressure, wherein external pressures that exceed the internal pressure reduce the volume of the compressible object; (b) the shell configured to experience less strain when the external pressure is about equal to the internal pressure than when the external pressure is greater than the internal pressure or less than the internal pressure or the shell that experiences less strain when the external pressure is about equal to the internal pressure than when the external pressure is above or below a predetermined compression interval of the compressible object; and/or (c) the shell is at least partially filled with a foam. While a variety of fabrication processes are described, FIGS. 8A-8B are exemplary embodiments of fabrication processes that create compressible objects having hollow interiors.

FIGS. 8A-8B are exemplary embodiments of fabrication processes utilized in the flow chart of FIG. 6 in accordance with certain aspects of the present techniques. In FIG. 8A, an exemplary embodiment of an apparatus for creating compressible objects in accordance with the present techniques is shown. In this embodiment 800, compressible objects, such as hollow polymer shells or polymer foam structures, may be fabricated in a pressurized environment formed by a pressurized chamber 802. For exemplary purposes, the compressible objects are shown as hollow polymer shells 804 with a gas interior 806, but may include polymer foam structures and other compressible objects discussed above.

In this fabrication process example, a coaxial bubble blowing orifice 808 at the end of the center tube 810 is enclosed in a coaxial tube 812 in a pressurized chamber 802. Sufficient differential pressure is independently applied within the annulus formed between the center tube 810 and the coaxial tube 812 and within the center tube 810 of the orifice to shape the polymer material 814 into hollow polymer shells 816 that are filled with gas 818 from the center tube 810. In this manner, a gas 818 filled polymer bubble 820 is formed and subsequently detaches from the coaxial bubble blowing orifice 808. The pressurized chamber 802 may be filled with gas or liquid or a combination thereof and the separation in the case of bubble formation may be caused by surface tension, gravity, buoyancy, fluid flow or any combination thereof. Once the polymer bubble 820 detaches, the polymer bubble 820 may be dropped into a crosslinking bath 822 within a bath vessel 824 that promotes crosslinking of the polymer wall. The chemical nature of the crosslinking bath may be determined by the specific polymer chosen for the wall material and well known to those skilled in the art of polymer synthesis. Following the hardening bath, the hollow polymer shells 804 with a gas interior 806 is formed and may then be removed by transfer to a pressure interlock chamber (not shown) where the crosslinking fluid is separated from the pressurized compressible objects and the compressible objects are transferred to a container for storage.

Further, during or after polymerization and/or separation of the hollow polymer shells 804, the pressure surrounding the hollow polymer shells 804 may be lowered to expand the hollow polymer shells 804 into its final size and shape in the expanded state. This expanded state may be predetermined by wall thickness, material mechanical properties, object architecture and internal pressure before, during or after cooling of the walls. If the polymer wall is the load bearing member, expansion of the diameter following synthesis may be used to alter the mechanical properties of the polymer wall. For example, by strain re-orientation of the polymer chains and/or re-orientation of the reinforcement in the polymer wall of the hollow polymer shells 804.

Specific adjustments may be incorporated for the fabrication process based on the materials utilized. For instance, if the polymer material 814 is a polymer melt with or without reinforcement, the orifice 808 may be heated to reduce the melt viscosity to achieve the desired flow properties of the polymer melt. Also, if the polymer material 814 is a polymer monomer or a mixture of monomers with or without reinforcement and with or without an initiator, the polymerization of the walls of the polymer bubble 820 after separation from the orifice 808 may be accomplished by a variety of processes, such as ultra violet polymerization, free radical polymerization, thermo-chemical polymerization, etc., which are familiar to those skilled in the area of polymer synthesis.

In FIG. 8B, another exemplary embodiment 830 of an apparatus for creating compressible objects in accordance with the present techniques is shown. In this embodiment 830, compressible objects, such as hollow polymer shells or polymer foam structures, may be fabricated in a pressurized environment formed in a pressurized chamber 832. The pressurized chamber 832 is divided into a lower chamber 838 having a gas inlet 840 and an upper chamber 842 having a fluid inlet 844 and a fluid outlet 846. For exemplary purposes, the compressible objects are shown as hollow polymer shells 834 with a gas interior 836, but may include polymer foam structures and other compressible objects discussed above.

In this fabrication process example, a thin film 848 of a suitable polymer melt or polymer precursor may be formed on a plate 850 perforated by a large number of orifices or holes 852. The size and spacing of the holes 852 may be arranged to cause the continuous formation of gas filled bubbles 854, which have a hollow polymer shell 834 with a gas interior 836, that separate and float off the plate 850 and into a pressurized fluid filling the upper chamber 842 when the plate 850 is pressurized from below at a desired differential pressure between the upper and lower chambers 838 and 842. It should be noted that a variety of alternative geometries of holes may be utilized to form internally pressurized hollow compressible objects from a thin film of polymer precursor and/or polymer melt. The gas filled bubbles may exit the upper chamber 842 through the fluid outlet 846 and may be separated from the fluid by density difference and subsequently transferred to a container for storage.

As an alternative exemplary method for creating compressible objects, metal, metal alloy and/or polymer tubes may be utilized to form the compressible objects. In this fabrication process, compressible objects are formed from a tube material by cutting the tube material into desired lengths and closing the ends of the tube material using mechanical, chemical or thermal methods. The internal pressure of the resulting compressible objects, which may be formed in the shape of a pillow, sphere, oblate spheroid, ellipsoid of revolution or any other desirable shape may be controlled by closing the cut ends of the tube and forming the desired shape in a controlled pressure environment. The pressurized environment may be a pressurized chamber, which is similar to the pressurized chambers discussed above. In addition, the compressible objects may be formed either before or after metallization of the polymer wall of the tube material from a polymer and/or elastomer tube with or without reinforcement.

As another alternative example method for creating compressible objects, preformed sheets may be utilized to form the compressible objects. In this method, mechanical, thermal or chemical joining of preformed sheets may be utilized to fabricate compressible objects. The preformed sheets may include a layered composite structure, which may include two embodiments. One embodiment may be a relatively thick structural load bearing polymer wall combined with a relatively thin continuous metal, metal alloy and/or non-metal permeation barrier layer. In particular, the structural load bearing polymer wall may have a wall thickness between about 5 micron and 50 microns, while the continuous metal or metal alloy permeation barrier layer may have a wall thickness that is less than about 500 Angstrom. The second embodiment being a thin polymer sheet as a template for the deposition of a relatively thick metal or metal alloy layer that serves as both a structural wall and a barrier to gas permeation. For instance, the thin polymer sheet may be less than about 5 micron, while the metal or metal alloy layer may have a wall thickness between about 5 micron and 50 microns. Any combination of layered or multiply layered embodiments with polymer thickness and metal or metal alloy thickness within these limits may be utilized for other embodiments.

To fabricate these compressible objects, the one or more layered pre-formed sheets may be fabricated flat and subsequently molded into a pre-formed object component using any of a variety of polymer sheet and/or film forming methods familiar to those practiced in the art. Examples include metalized polymer sheet for food packaging, metalized Mylar sheet for party balloons, decorative metal coatings on polymers films and metalized polyimide film for aerospace thermal barriers. If the pre-formed object components are to be joined to form the compressible objects, the joining of the preformed object components may be accomplished by a variety of methods familiar to those practiced in the art of polymer film joining. Examples include but are not limited to, thermal bonding, adhesive bonding, mechanical joining and the like.

In this exemplary fabrication method, the metal or metal alloy layer may be formed on the interior or exterior of the compressible object using the same range of physical and/or chemical methods described above and known in the field for deposition of the metal, metal alloy and/or non-metal coatings. For instance, the metal or metal alloy layer may be applied to the exterior and/or the interior surface in a manner similar to the methods described for deposition on co-axially blown bubbles or bubbles formed by dispersion polymerization above. The coated polymer wall may then be thermo-mechanically molded into the pre-form to have the metal or metal alloy layer on the interior surface, the exterior surface or both. In this embodiment, the reinforcement, surface treatment for improved continuity and adhesion and the reorientation of the reinforcement and/or the polymer chains by mechanical stress may also apply to the fabrication of the flat preformed sheets and may be performed in a manner similar to the co-axial blowing or dispersion polymerization.

As an additional fabrication technique, the method of composite sheet fabrication outlined above may also be used to fabricate free standing relatively thick metal and metal alloy sheet suitable for mechanical forming into the components of compressible or collapsible objects or particles. This approach to the fabrication of free standing metal or metal alloy sheet is particularly useful when thin metallic sheet is difficult to fabricate by conventional thermo-mechanical methods used in the fabrication of metal sheet. In particular, the metal and metal alloy sheet may have a thickness between about 5 micron and 50 micron. To form a free standing metallic sheet, the polymer template may be removed from the thin metallic sheet following deposition of the metal or metal alloy before or after any additional thermo-mechanical treatment required to consolidate the deposited thin sheet. Removal of the polymer template may be accomplished by a variety of mechanical, chemical and/or thermal methods known to those of ordinary skill in the art. Alternatively, the polymer template sheet may be pre-formed in the components of the compressible objects prior to deposition of the metal or metal alloy thin film to form a free standing metal or metal alloy pre-form.

As another fabrication technique, hollow compressible objects may be formed by physical and/or chemical vapor deposition (as described above) of the chemical constituents of a thermoset polymer onto thermally depolymerizable hollow polymer template or polymer foam. Subsequent to deposition, the thermoset polymer constituents may be partially reacted together by raising the temperature to form a self supporting thermoset polymer preform layer on the surface of the depolymerizable hollow polymer shell or polymer foam template. Subsequent to the formation of the self supporting thermoset polymer preform layer, the temperature may be further increased to depolymerize the hollow and/or foam template and the depolymerization products removed from the resulting hollow self supporting object by diffusion through the thermoset preform wall. Finally, the partially cured self supporting hollow preform thermoset objects may be placed into a high pressure vessel and the pressure inside the hollow objects equilibrated by diffusion through the thermoset preform wall with a high gas pressure established inside the vessel. Subsequently, the temperature may be raised further in the high pressure gas environment to fully cure the thermoset polymer in order to lower the gas permeability of the wall and to achieve the optimum mechanical properties of the wall material. As before, metallization of the exterior surface of the fully cured and pressurized hollow thermoset polymer shell may be accomplished by the methods described above for the coaxially blown pressurized hollow polymer shells.

Further, as another embodiment, the compressible objects may be mechanically conditioned during fabrication to strengthen the structural wall of the compressible objects by reorientation of the micro and/or nano-fiber reinforcement and/or the polymer chains including the wall material by mechanical stresses. This mechanical conditioning may include, but is not limited to, expansion of the compressible object to its final size and shape.

B. Fabrication of Compressible Objects Using a Foam Template

In addition to the fabrication of hollow objects, fabrication processes may utilize a foam template to create a specific shape in the fabrication of the compressible objects. These fabrication processes may form compressible objects having a shell that encloses an internal region and (a) an internal pressure (i) greater than about 200 psi at atmospheric pressure, 500 psi at atmospheric pressure, 1500 psi at atmospheric pressure or 2000 psi at atmospheric pressure and (ii) selected for a predetermined external pressure, wherein external pressures that exceed the internal pressure reduce the volume of the compressible object; (b) the shell at least partially filled with a foam; and/or (c) wherein the shell is configured to experience or experiences less strain when the external pressure is about equal to the internal pressure than when the external pressure is greater than the internal pressure or less than the internal pressure or wherein the shell experiences less strain when the external pressure is about equal to the internal pressure than when the external pressure is above or below a predetermined compression interval of the compressible object. The foam template may include homopolymers, polymer blends, copolymers, interpenetrating networks, block copolymers, thermosets, thermoplastics, amorphous polymers, crystalline polymers, chemically crosslinked copolymers, thermoplastic elastomers, rubbers, liquid crystal polymers, and the like. The foam template may be formed into different predetermined shapes, such as, but not limited to, a sphere, rod, lamella, oblate or prolate spheroids, ellipsoids of revolution and/or any combination of these geometries. Further, the foam templates used in the fabrication of the compressible objects, such as rods, lamellae and the like may be structured to internally contain a wide range of pore structure (i.e., closed and/or open pores), pore wall thickness, and pore density. These various constructions may be useful for producing hollow objects spanning a wide range of mechanical performance.

Foam pre-forms may be produced via molding procedures, cutting procedures, and coating procedures, which may be similar to techniques related to using foams for forming insulation and/or packaging. The cutting procedures may involve cutting slabstock foam into various shapes and sizes. The molding techniques, which may include extrusion, blow molding, compression molding and the like, may involve molding the foam into a desired intricate shape, which may reduce or eliminate labor-intensive cutting and waste produced from that technique. In addition, molding techniques may produce foams having multiple zones of hardness and with filler reinforcements. The coating methods described previously may also be applied to coating of the foam pre-form, which methods may include electroplating, electroless plating, physical vapor deposition, chemical vapor deposition, ultra-violet chemical vapor deposition, and the like, and may be used to form a relatively thin metal or metal alloy layer over the foam template. The coating of metal or metal alloy layer in this embodiment is utilized to enhance the impermeability of the compressible objects, which may include a gas (or mixture of gases) under pressure. Alternatively, the polymer template may be used for the deposition of a relatively thick metal and/or metal alloy load bearing wall using a molded or mechanically shaped internally pressurized or un-pressurized polymer foam. The metal load bearing wall may have a wall thickness of about 5 micron to 50 micron and an internal pressure above about 200 psi at atmospheric pressure or greater depending on the desired application.

As a first embodiment, blowing agents may be utilized to form the foam template for the compressible objects. Typically, the use of physical blowing agents results in closed-cell foam template, which may be formed from various materials. For instance, polyurethane (PU), polystyrene (PS) and polyvinyl chloride (PVC) are materials utilized in manufacturing polymer foams. Typically, PU foams are prepared by in situ generation of carbon dioxide ($CO_2$), while PS and PVC foams are prepared using physical blowing agents like nitrogen ($N_2$) and $CO_2$. The use of physical blowing agents reduces any contaminating solvents from hindering the process. The use of $CO_2$ and $N_2$ has a number of benefits, such as chemical inertness, non-combustibility, natural occurrence, low cost, ready availability, environmental acceptability (no ozone depletion) and low human toxicity.

Each of the polymer foaming techniques that use physical blowing agents rely on the similar principles. These principles are (1) saturation of the polymer with a gaseous penetrant (blowing agent) at high pressure; (2) quenching of the polymer/gas mixture into a super-saturated stage either by reduced pressure or increased temperature; and (3) nucleation and growth of gas cells dispersed throughout the polymer matrix. Upon quenching of the polymer/gas mixture, the solubility of the gas in the polymer template decreases, which results in clustering of gas molecules in the form of nuclei. As gas diffuses into the forming cells, the free energy of polymer template is lowered. The cell nucleation process governs the cell morphology of the polymer material and properties of the polymer material. Also, this process may occur homogeneously throughout the material or heterogeneously at high-energy regions, such as phase boundaries. In the high energy regions, the free energy to nucleate a stable void is less compared to homogeneous nucleation. As a result, preferential nucleation of voids occurs at the interface.

In semicrystalline polymers, the crystalline domains may serve as heterogeneous nucleation points to generate gas bubbles. In general, cell growth is controlled by the time that the gas has to diffuse into the cells before the quenching, the temperature of the fabrication process, the degree of supersaturation, the rate of gas diffusion into the cells, the hydrostatic pressure or stress applied to the polymer matrix, the interfacial energy and the visco-elastic properties of the polymer/gas mixture. The stiffness of the polymer template is typically controlled by the foaming temperature. It should be noted that a reduction in average cell size generally increases stiffness. The work necessary to expand the gas cell has to overcome the additional stress resulting from the increased stiffness. By increasing the saturation pressure, the free energy barrier for the formation of stable nuclei is decreased and additional nucleation sites are formed due to matrix swelling, free volume changes, and/or the formation of crystalline interfaces. This results in an increased cell density and consequently a decreased average cell diameter. Semicrystalline polymers exhibit considerably higher cell densities than amorphous polymers, which are attributed to the contribution of heterogeneous nucleation at the amorphous/crystalline interfacial regions. Because the gas does not dissolve in crystallites, the nucleation is nonhomogeneous, which makes it difficult to control the cellular structure of semi-crystalline foams. As a result, polymers with a low crystallinity afford foams with an almost uniform structure. As the crystallinity of the polymer is increased, less desirable non-uniform foams with irregular cell sizes are obtained.

Because the foaming methods using physical blowing agents is versatile, this technique may be used to fabricate closed-cell polymer foam templates for the compressible objects. For instance, amorphous as well as semi-crystalline polymers may be processed within a range of temperatures close to the glass transition temperature (Tg) up to temperatures just below the melting point of the material. For exemplary purposes, a fabrication process for forming foam templates and coating of the foam templates is discussed below in FIG. 9.

Figure 9:
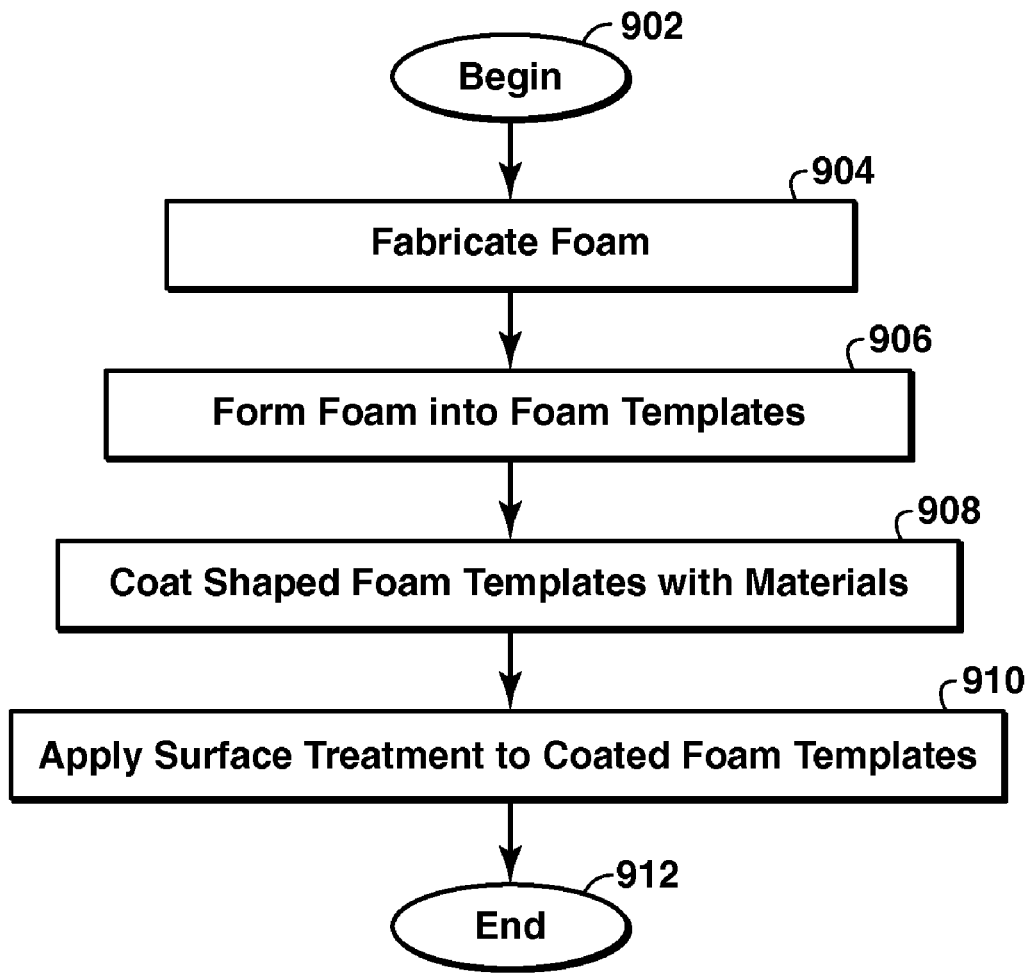
FIG. 9 is an exemplary flow chart for a fabrication process utilized in the flow chart of FIG. 6 with compressible objects having a foam template in accordance with certain aspects of the present techniques.

FIG. 9 is an exemplary flow chart for fabricating the compressible objects in FIG. 6 that use a foam template in accordance with certain aspects of the present techniques. This flow chart, which is referred to by reference numeral 900, may be best understood by concurrently viewing FIGS. 1 and 6. In this flow chart 900, a process for fabricating compressible objects having a foam interior is described.

The flow chart begins at block 902. At block 904, the foam may be fabricated. The foam may be formed from the various processes, which are discussed above. The foam may include polymeric materials, such as moderate to highly crosslinked elastomers with and without reinforcement; such as macro, meso to nano-fibers, nanotubes, exfoliated inorganic fillers (e.g. clays); and polymeric blends with and without reinforcement, such as macro, meso to nano-fibers, nanotubes, exfoliated inorganic fillers (e.g. clays) and the like. At block 906, the foam may be formed into foam templates. The foam templates may include the various shapes, such as cubes, rectangles, rods, squares and other regular or irregular shapes, which are discussed above. To form the foam templates, the foam or polymeric material may be shaped into different geometries and sizes by cutting or other suitable processes. Then, at block 908, the shaped foam templates may be coated with a material. The material may include a thin metal or non-metal coating to reduce gas permeability that is applied through any suitable deposition technique as discussed above. The coatings may include a wide range of compositions including pure metals, metal alloys and/or layers of different metals or metal alloys either alone or in combination with non-metallic layers among others. At block 910, the coated foam templates may be further treated by surface treatments to enhance the adhesion with and promote the continuity of these coatings with the surface of the polymer foam template. These surface treatments may be similar to the surface treatments discussed above. The process ends at block 912.

Figure 10:
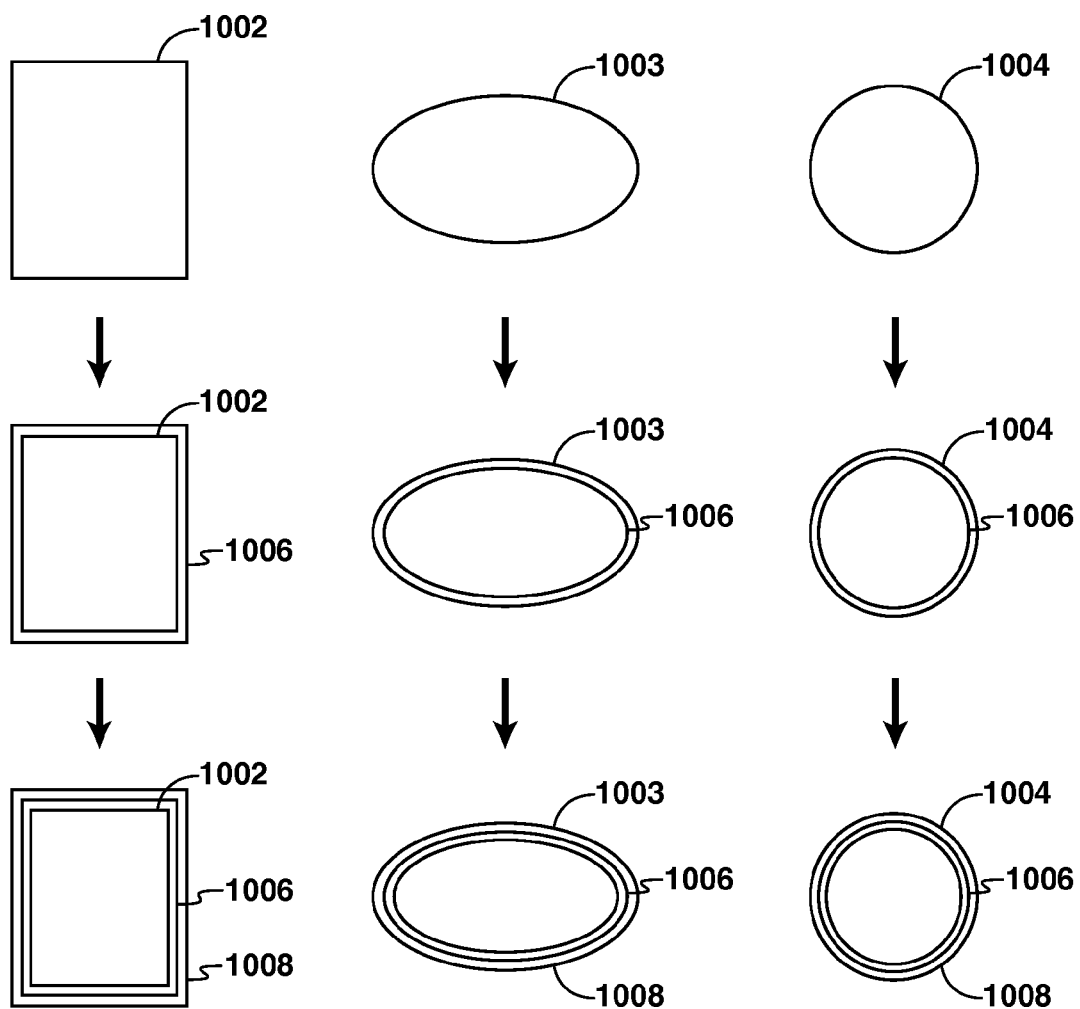
FIG. 10 are exemplary embodiments of compressible objects fabricated from the flow chart in FIG. 9 in accordance with certain aspects of the present techniques.

The coating of these different shaped foam templates is shown in FIG. 10. In FIG. 10, various foam templates, such as a pillow object 1002, an elliptical object 1003 and a spherical object 1004 are shown. These foam template objects 1002-1004 are formed into various shapes as discussed in block 906. Then, the foam template objects 1002-1004 may be coated by a metal layer 1006, as discussed in block 908. In particular, the foam template objects 1002-1004 may be coated with a thin metal coating (e.g., copper) through an electroless plating technique. Once coated, the foam template objects 1002-1004 may be further coated by a surface treatment layer 1008, as discussed in block 910.

As a specific example of this fabrication process, a first foam template and a second foam template are described. The first foam template may be an air filled foam microcapsule having cells of about 1000 μm (micro-meter) to 1500 μm in diameter, while the second foam template may be an air filled foam microcapsule having cells of about 250 μm to 500 μm in diameter. These foam templates may be cut into different geometries and sizes, as noted above. Then, the shaped foam templates may be subsequently coated with a thin metal coating (e.g., copper) through an electroless plating technique. The metal coatings may include a wide range of compositions including pure metals, blends of metals, alloys, shaped memory alloys among others.

Further, it should be noted that the surface treatments may be adjusted for different foam templates. For instance, if polystyrene is the foam template, it is highly non-polar and chemically reactive polymer. The degree of functionalization, i.e., sulfonation, may be controlled via a number of parameters such as: solvent, sulfuric acid concentration, reaction temperature, reaction time, catalyst, and catalyst concentration. As such, it should be noted that the surface functionalization chemistry and subsequent procedures may be modified to accommodate the surface chemistry and structure of the material, such as nylon, polyesters, polyurethanes among many other polymeric materials. The surface functionalization and etching may include acid treatment, base treatment, oxidation, nitration, sulfonation, phosphonation among many other chemistries. See J. March, "Advanced Organic Chemistry: Reactions, Mechanisms, and Structure", Third Ed., John Wiley & Sons, New York (1985), sections relating to sulfonation, mild oxidation, esterification, carboxylation, free radical addition reactions, free radical graphing reactions, and quaternization, and the like.

As a first specific example, foam templates may be coated uniformly by a process, such as electroless copper plating, to form the rod-like foamed object. The foam template may be an air-filled foam microcapsule having cells of about 1000 μm (micro-meter) to 1500 μm in diameter. If this foam template is polystyrene, the fabrication process may include functionalization of the polystyrene rod by exposure to a 30% solution of $H_2SO_4$ for a period of 21 hours. The surface of the functionalized polymer can be activated using a tin-palladium (Sn—Pd) activation process, otherwise known as seeding. This seeding process is familiar to those skilled in the art. The process involves successive immersions of the polystyrene rod in acidic tin-chloride ($SnCl_2$) (0.01M) followed by acidic palladium-chloride ($PdCl_2$) (0.01M) solution with rinsing in distilled water between the baths. A 0.01M Hydrogen-Chloride (HCl) is used after the $PdCl_2$ to remove the remaining Sn compounds from the surface. Each of the baths are performed at room temperature. See B. Ceylan Akis, "Preparation of Pd—Ag/PSS Composite Membranes for Hydrogen Separations", *A Thesis, Worcester Polytechnic Institute*, (May 2004). The functionalized, Pd seeded polystyrene rod can be placed in a bath flowing at the rate of 73 cc/min (cubic centimeters/minute) containing a copper (Cu) plating solution of $CuSO_4 \cdot 5H_2O$, ethylenediaminetetraacetic acid disodium salt dihydrate, NaOH, ethylenediamine, and triethanolamine activated with formic acid. See Y. Lin and S. Yen, *Applied Surface Science*, 178, 116 (2001); W. Lin, H. Chang, *Surface and Coatings Technology*, 107, 48 (1998); Shu et. al., *Ind. Eng. Chem. Res.* 36, 1632 (1997); Hanna et al. *Materials Letters*, 58, 104 (2003). Cu can be plated onto the functionalized, Pd seeded polystyrene rod at 40° C. over a period of 90 minutes followed by a distilled water wash. The majority of the surface can be coated with Cu having a thickness that ranges from 0.3-0.6 μm.

Alternatively, if the foam template is an air-filled foam microcapsule having cells of about 250 μm to 500 μm in diameter and a spherical shape, the fabrication process may include functionalization and Pd seeding of the polystyrene sphere, as described above. Using the same Cu plating solution and flow rate, the functionalized Pd seeded polystyrene sphere can be plated at 40° C. for a period of 10 minutes followed by a distilled water wash. As a result, the surface can be coated with a 0.1-0.2 μm thick Cu film that follows the contours of the foam surface.

As another example, the fabrication process for a solid Nylon 6/6 ball having the diameter of ⅛ inch may include functionalizing and Pd seeding the solid ball as described above using 0.01M HCl for 10 minutes for the functionalization process. Also, the Nylon ball can be reacted in the flowing solution at 40° C. for 4 hours 5 minutes followed by a distilled water wash, which may be the same Cu plating solution with activator discussed above. The resulting Cu plated film can be 10-25 μm thick over the Nylon ball.

Figure 11A:
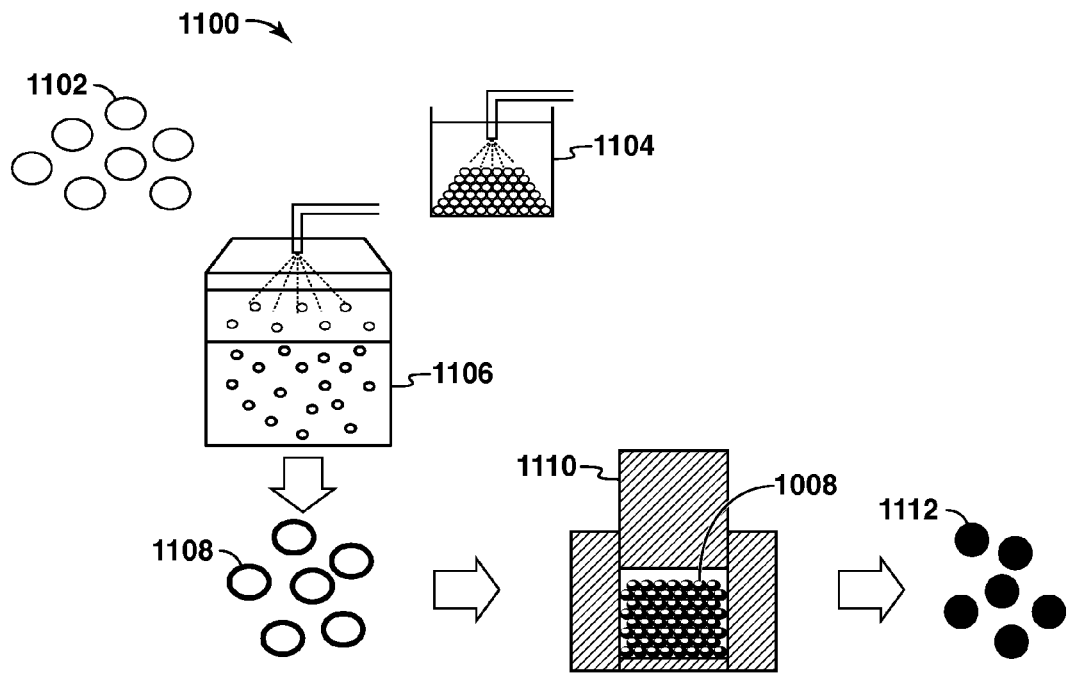
FIGS. 11A-11B are exemplary embodiments of fabrication processes utilized in the flow chart of FIG. 6 in accordance with certain aspects of the present techniques.

As another exemplary fabrication technique, a hollow gas filled metallic shell may be fabricated by utilizing the Fraunhofer method for producing hollow metallic objects, as shown in FIG. 11A. See, for example, O. Andersen, U. Waag, L. Schneider, G. Stephani, B. Kieback, "Novel Metallic Hollow Sphere Structures", *Advanced Engineering Materials* 2000, vol 2, (April 2000), pp. 192-195. In this embodiment 1100, foam templates 1102, which may be Styrofoam templates or any of the polymer foam templates described above, may be coated with a metallic material 1104, which may comprise a metal or metal alloy powder and binder. The coating of the foam templates 1102 by metallic material and binder 1104 may be accomplished by fluidized bed coating methods in a vessel 1106. The resulting polymer foam templates coated with a metal or metal alloy powder and binder layer 1108 may then be subjected to a furnace 1110 for annealing. In the furnace, the polymer foam template may be thermally decomposed or reacted to volatile reaction products which are removed by diffusion through the partially sintered metal or metal alloy wall. Subsequently, the temperature may be raised to drive off the remaining binder and the metal material is sintered to obtain a dense metal or metal alloy shell. The resulting compressible objects 1112 may be utilized as part of the variable density drilling mud once it has cooled.

Figure 11B:
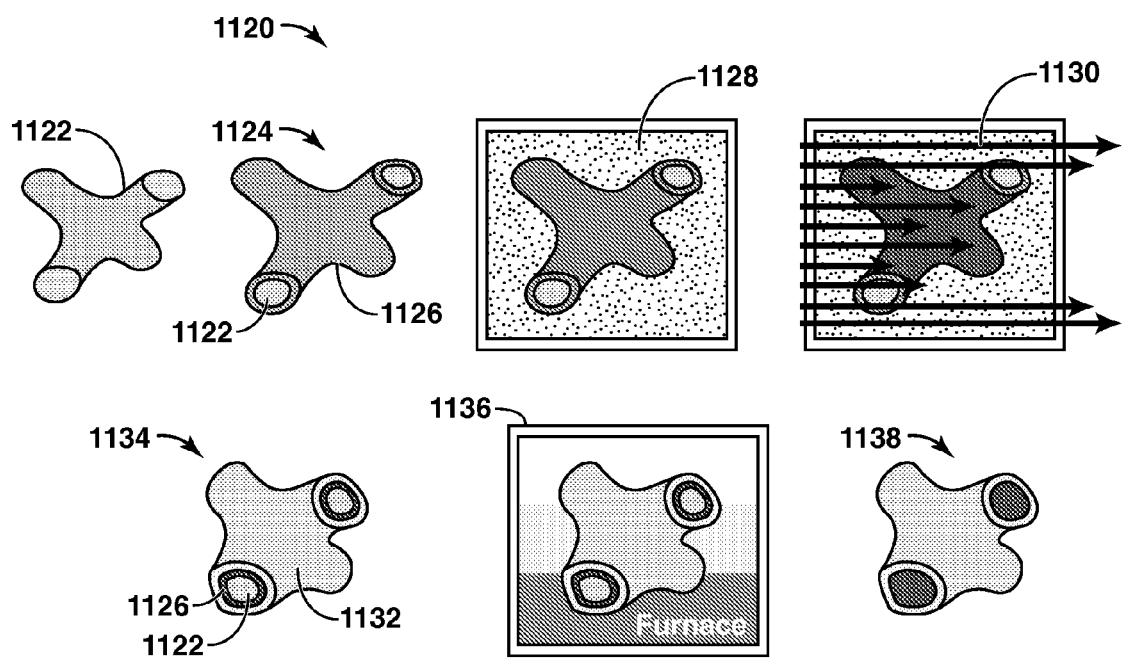

An alternative fabrication method is described in FIG. 11B. In FIG. 11B, either regular or irregularly-shaped metal or metal alloy hollow objects may be fabricated by forming a metal or metal alloy layer such as a nickel layer on a foam template by deposition from the gas phase onto a disposable foam template. In this embodiment 1120, a foam template 1122, which may be closed-cell polymer foam template, is provided. The foam template 1122 is coated with pigment 1124, such as carbon black or other pigments that absorb infrared radiation, to form a coated foam template 1126. The coated foam template 1126 is then placed into a vessel that is filled with a gas 1128, such as nickel carbonyl gas. The coated foam template 1126 is then subjected to infrared radiation 1130, which heats the coated surface of the coated foam template 1126. As a result of the infrared radiation 1130, a coating of carbonyl decomposes at the surface of the coated foam template 1126 to form a metallic coating 1132, such as nickel over the foam template 1134. The metallic coated foam template 1134 is then sintered in a furnace 1136 at a temperature high enough to make the foam template decompose and the decomposition products are removed by diffusion through the metal layer during the sintering process. As a result, a compressible object 1138 is formed with a hollow interior.

Modification to the Compressible Objects to Address Localized Strain

As an additional embodiment, the architecture of the compressible objects may be modified to distribute the localized strain experienced in the expanded and compressed states. For instance, FEA modeling demonstrates in the case of ellipsoids of revolution discussed above, that the severity of the cap buckling instability increases as the wall thickness increases and the initial aspect ratio decreases, while the severity of the equatorial buckling instability increases as the wall thickness decreases and the aspect ratio increases. To expand the design window of the compressible object architecture, the wall thickness of the compressible object may be varied with the wall thinner at the poles and thicker at the equator. This adjustment of the wall thickness may provide support in each of the embodiments to address the localization of strain in the different regions of the compressible objects. The variation of the wall thickness from the pole to the equator may be performed in a manner that is consistent with certain fabrication techniques, which are discussed above.

Figure 12A:
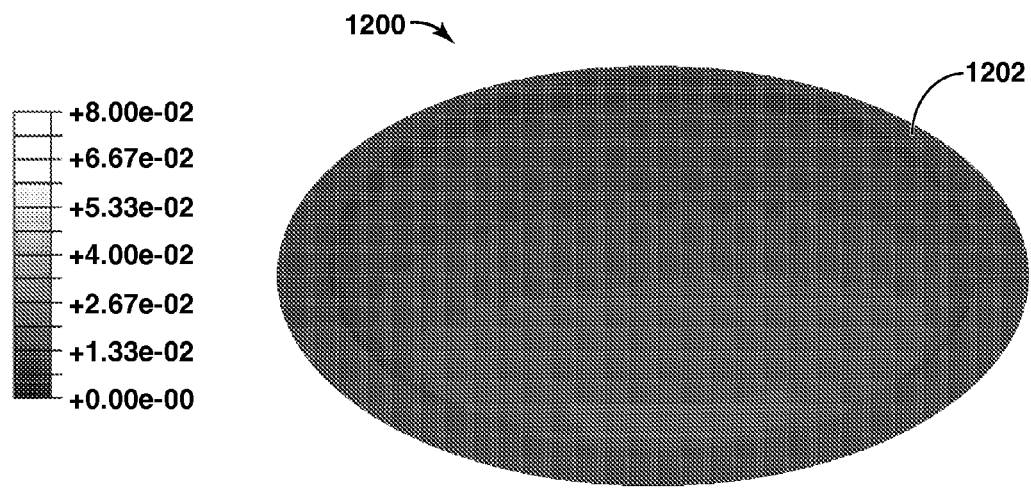
FIGS. 12A-12C are embodiments of a compressible object having a flange in accordance with aspects of the present techniques.
Figure 12B:
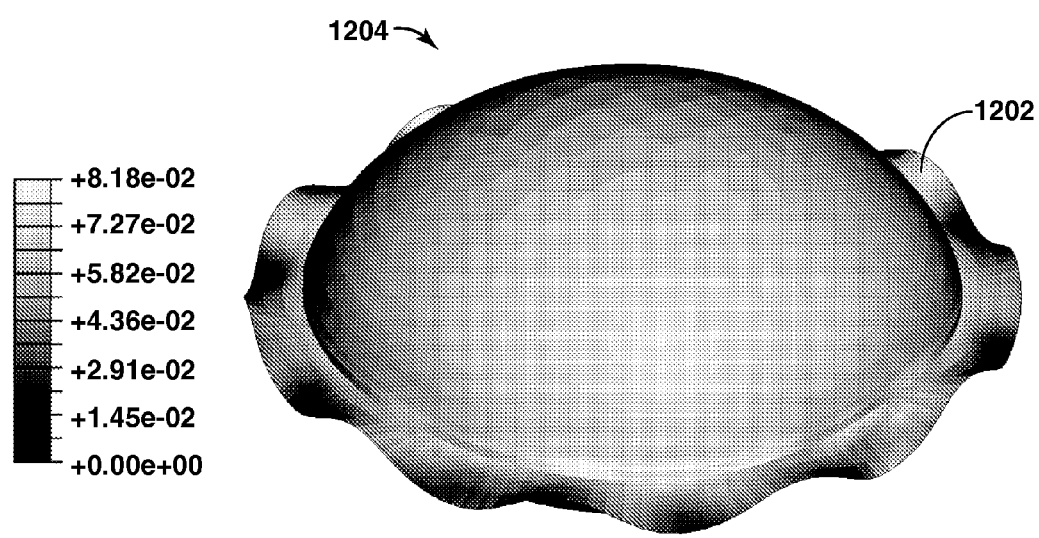
Figure 12C:
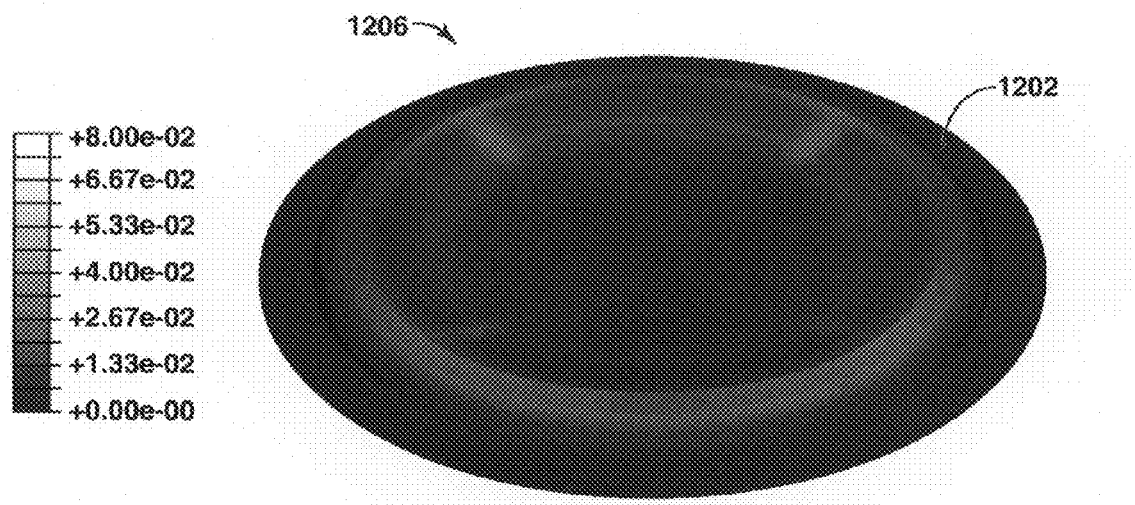

Alternatively, one or more structural members, such as a flange, may be added to the compressible objects. These structural members, such as a flange, may reduce localized strain for the shell of the compressible object. For instance, if the structural member is a flange, it may be added to the equator of the compressible object to support the equatorial belt against buckling. This flange may distribute the deformation force along the equator of the compressible object to spread the strain from a localized area. For instance, as shown in FIGS. 12A-12C, the effect of adding a flange 1202 to a 10 micron wall thickness elliptical object is shown in various states. In this example, the elliptical object may have an inflated internal pressure of 1500 psig in this example and formed from a pseudo-elastic material of shape memory alloy, such as NiTi alloy with an austenite to martensite transformation temperature about 0° C. In FIG. 12A, the compressible object, which is an elliptical compressible object having a flange 1202 in the initial state 1200. The elliptical object is shown in the expanded state 1204 in FIG. 12B and the compressed state 1206 in FIG. 12C. As shown in the FIGS. 12A-12C, the flange 1202 distributes the localized strain to lower the maximum strain experienced by the elliptical object. The benefits from the addition of the flange are discussed further in FIG. 13.

Figure 13:
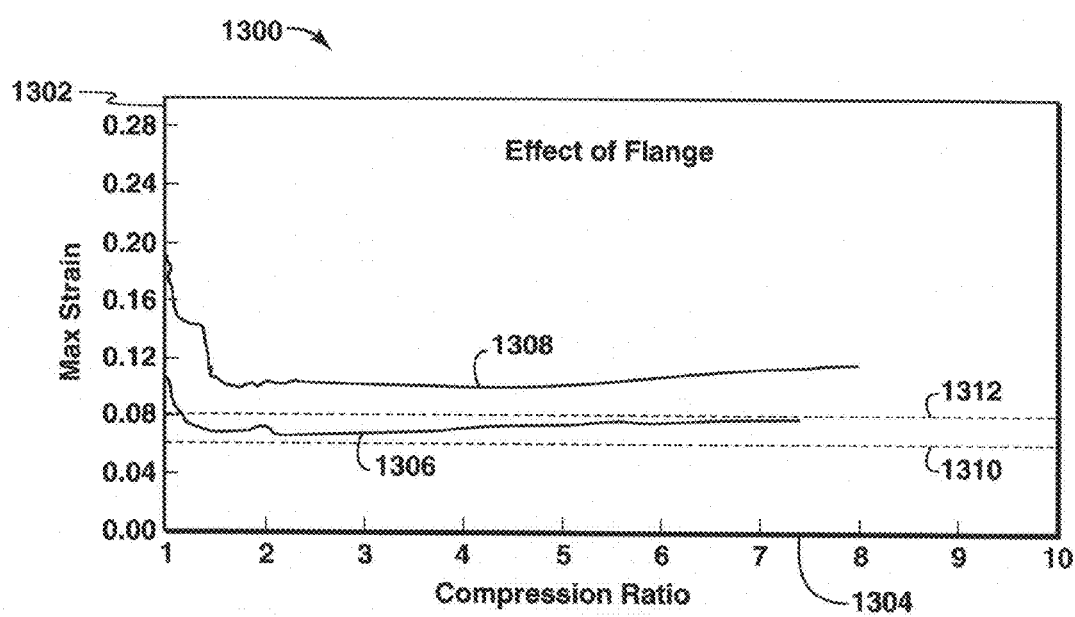
FIG. 13 is an exemplary chart relating to the addition of a flange to the compressible object in accordance with certain aspects of the present techniques.

FIG. 13 is an exemplary chart relating to the addition of a flange to the compressible object in accordance with certain aspects of the present techniques. In FIG. 13, FEA modeling is utilized to generate a chart 1300 of the maximum strain 1302 versus compression ratio 1304 for a first compressible object having a flange and a second compressible object with no flange. The chart 1300 includes a first response curve 1306 for the first compressible object having a wall thickness of 10 microns and a flange width of 125 microns, which may be the elliptical object of FIGS. 12A-12C, and a second response curve 1308 for the second compressible object having a wall thickness of 10 microns with no flange. In the chart 1300, the line 1310 indicates the approximate maximum recoverable strain for the NiTi alloy and the line 1312 the approximate maximum allowable strain required to achieve the desired fatigue life of the object which is discussed above.

As shown in the chart 1300, the addition of the flange reduces the maximum strain experienced by elliptical objects having the same structure and wall thickness. As such, the equatorial flange may be utilized to expand the design window for compressible objects, which is below the permanent deformation limits.

The addition of the equatorial flange may be performed in a manner that is consistent with certain fabrication techniques, which are discussed above. As an example, the fabrication of the compressible objects from a metal alloy sheet and subsequent joining at the equatorial flange may be adjusted to provide a flange of a specific width by modifying existing fabrication processes.

Use of Weighting Agents and Other Fluids to Achieve the Determined Variable Density Drilling Mud As noted above, the variable density drilling mud 118 (FIG. 1) may include compressible objects along with the drilling fluid. The selection of drilling fluid may involve choosing the primary liquid phase component from a number of available fluids. These fluids include water, oil or combinations of water and oil. The liquid phase is chosen after considering several factors including cost, compatibility with subterranean formations, environmental impact and the like. Weighting agents are added to adjust the drilling fluid density. Viscosifiers are added to provide suspension of the weighting agents and drilled formation cuttings. Other additives provide filtration control to prevent liquid phase migration into the formation or help emulsify free water into an oil phase.

To compensate for the compressible objects, drilling fluids may include weighting agents and other fluid to manage the density of the variable density drilling mud within the wellbore. The weighting agents may include barite (barium sulfate), hematite (ferric oxide), galena (lead sulfide) and other suitable materials, while the other blending agents may include formates, such as sodium, potassium and cesium, and other suitable materials.

The weighting agents are added to the drilling fluids to increase the drilling fluid density to be greater than that of the aqueous (water) or non-aqueous (oil or synthetic) base fluids. For instance, the weighting agents may include barite (barium sulfate), hematite (ferric oxide), galena (lead sulfide) and other suitable materials. These weighting agents are utilized to achieve the desired composite mud density profile from surface to target depth (TD). Because the pressure within the wellbore generally increases with depth, the low density compressible objects, such as compressible objects, are in an uncompressed state near the surface and in the compressed state toward the bottom of the wellbore. When the compressible objects are in the compressed state from the downhole pressures, the composite density of the variable density drilling mud may be maintained to prevent fluid influxes from the formation and limited to not exceed the formation fracture gradient. When the compressible objects are in the uncompressed state at shallower depths, the formation may be exposed to the variable density drilling mud with the rock layers not being as strong and the formation fluid pressure being typically lower. As such, uncompressed state of the compressible objects may be utilized to lower mud density of the variable density drilling mud. Accordingly, the various weighting agents may be utilized in the drilling fluid to increase the density in the shallower sections of the wellbore to compensate for the expansion of the compressible objects.

For example, barite (barium sulfate) may be used to increase the density of the variable density drilling mud 118. The advantage to using barite as a weighting agent in drilling fluid is the low cost and high availability of this material. Barite has a density in the purest form of 4.5 g/cc (gram/cubic centimeter) with drilling grade barite being at least 4.2 g/cc to carry the American Petroleum Institute brand. To provide high drilling mud densities, a large concentration of barite mud may be suspended in the drilling fluid. For instance, drilling fluid with a density of up to 19 ppg (pounds per gallon) (2.3 g/cc) may contain approximately 40% by volume barite. As the volume percentage of solids increases, the viscosity of the drilling fluid, particularly at high shear rates, becomes very high and frictional pressure drop through the circulating or wellbore system becomes very high. Accordingly, the drilling fluid with barite may be combined with the compressible objects with up to 40% by volume at surface conditions. The result of this combination provides higher viscosities where the compressible objects are uncompressed (at the surface and at shallow depths).

Similar densities of variable density drilling mud may be achieved with lower volume % weighting material by using material with higher density, such as hematite (ferric oxide) or galena (lead sulfide). Hematite has a minimum API density of 5.05 g/cc and may increase drilling fluid density with a lower total solids concentration than barite. However, drilling fluids with hematite may be more abrasive than drilling fluids with barite, which may lead to premature damage or wear to equipment, such as mud pumps, surface equipment, drill string piping and downhole tools (i.e. motors), logging and measurement equipment, for example. Galena (lead sulfide) has a density of 7.5 g/cc and may be used to achieve high density with about 40% less solids volume than barite. Galena is a relatively soft mineral and does not prematurely wear equipment.

In an alternative embodiment, blending agents may be utilized with the compressible objects instead of or in addition to the weighting agents. These blending agents may include formates, such as sodium, potassium and cesium. For example, a solution of cesium formate in water may yield a solids-free (weighting agent-free) density of about 2.4 g/cc. The density of the cesium formate solution is nearly equal to that of typical rock or rock cuttings. As a result, the rock cuttings do not tend to settle in drilling fluid with this blending agent. When the cesium formate solution is blended with compressible objects, the variable density drilling mud may provide high density at high pressures where the compressible objects are in the compressed state (i.e. deep in the wellbore). However, at shallower depths where the compressible objects are in the expanded state, the density of the variable density drilling fluid is reduced. With this fluid, the increased volume % of expanded compressible objects naturally increases the bulk viscosity and assists in the transport of rock cuttings.

Additional viscosity may be provided through the addition of viscosifying agents, such as naturally occurring bentonite clay or synthetic polymers, to reduce the rate at which the cuttings and compressible objects tend to settle due to density differences between the cuttings/compressible objects and the drilling fluid. These types of viscosifiers aid cuttings transport, while the drilling fluid is circulating and promote gelation of the drilling fluid when flow is ceased thus reducing the cuttings settling velocity and the compressible objects settling velocity. The compressible objects may tend to rise or fall within the drilling fluid depending on their state of compression, and compressible object density within the wellbore. At external pressures less than that required to compress the objects or particles, the compressible objects generally have a lower density than the drilling fluid. Here the compressible objects tend to rise within the fluid unless the viscosity is sufficient to prevent movement. When external pressures are high enough to provide sufficient object compression, the compressible object density may approach or exceed that of the drilling fluid. In this environment, the compressible objects may not move relative to the fluid or may even tend to fall within the fluid unless the viscosity is sufficient to prevent movement.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. A method associated with drilling a wellbore comprising:
determining a pore pressure gradient and a fracture pressure gradient at a selected depth within the wellbore,
selecting reusable compressible objects having a shell that encloses an interior region, wherein the compressible objects have an internal pressure at atmospheric external pressure that is in between the pore pressure gradient and fracture pressure gradient at the selected depth and greater than 250 psi, wherein the shell is configured to experience less strain when the external pressure is about equal to the internal pressure than when the external pressure is both above and below the internal pressure of the compressible object, the reusable compressible objects comprising
(a) an initial aspect ratio between 3 and 4 in an initial state when an initial state pressure external to the compressible object is substantially equal to an initial state internal pressure in the interior region and the initial state internal pressure is greater than 200 psi and the initial state internal pressure is selected for the shell to compress and expand at a predetermined pressure range,
(b) a spherical or near spherical shape in an expanded state when the external pressure is substantially atmospheric pressure, and
(c) a compresses state aspect ratio that is higher than the initial aspect ratio when the external pressure is greater than the internal pressure;

selecting a drilling fluid;

introducing the compressible objects to the drilling fluid to form a variable density drilling mud, wherein the density of the variable density drilling mud varies in a non-linear fashion along at least a portion of the wellbore and the variable density drilling mud provides a density between a pore pressure gradient and a fracture pressure gradient for at least one interval as the variable density drilling mud circulates toward the surface of a well; and drilling the wellbore using the variable density drilling mud.

2. The method of claim 1 wherein the compressible objects have an initial state internal pressure above 500 pounds per square inch at atmospheric pressure.

3. The method of claim 1 wherein each of the compressible objects comprises a plurality of states, the plurality of states comprising a first state having a first volume, a second state within the wellbore having a second volume, and a third state within the wellbore having a third volume, wherein the third volume is less than the first volume and greater than the second volume and the internal pressure exhibits less strain on the shell of the compressible object in the third state than first state and second state.

4. The method of claim 1 further comprising blending weighting agents into the drilling fluid to control the density of the drilling fluid and compressible objects.

5. The method of claim 1 wherein the compressible object has an initial state internal pressure above about 1500 pounds per square inch at atmospheric pressure.

6. The method of claim 1 wherein each of the compressible objects has one or more structural members to reduce localized strain.

7. The method of claim 6 wherein the one or more structural members comprises a flange.

8. The method of claim 1 wherein the shell has an equivalent-diameter-to-wall-thickness ratio in an initial state, in a range from 20 to 200.

9. The method of claim 1 wherein the shell has an equivalent-diameter-to-wall-thickness ratio in an initial state in a range from 50 and 100.

10. The method of claim 1 wherein the shell comprises a gas permeation barrier layer and structural layer.

11. The method of claim 10 wherein the gas permeation barrier layer comprises a metal or metal alloy layer and the structural layer comprises a polymer layer.

12. The method of claim 1 further comprising combining weighting agents with the drilling fluid, wherein the weighting agents comprise one of barite, hematite, galena and any combination thereof.

13. The method of claim 12 further comprising combining formates with the drilling fluid to control the density of the drilling fluid and compressible objects in mud systems and minimize the addition of insoluble weighting agents that tend to raise viscosity of the drilling fluid and compressible objects.

14. The method of claim 1, further comprising:
producing hydrocarbons from the wellbore.

* * * * *